(12) United States Patent
Suetsuna et al.

(10) Patent No.: US 9,362,033 B2
(45) Date of Patent: Jun. 7, 2016

(54) MAGNETIC MATERIAL, METHOD FOR PRODUCING MAGNETIC MATERIAL, AND INDUCTOR ELEMENT

(71) Applicant: KABUSHIKI KAISHA TOSHIBA, Tokyo (JP)

(72) Inventors: Tomohiro Suetsuna, Kanagawa (JP); Seiichi Suenaga, Kanagawa (JP); Toshihide Takahashi, Kanagawa (JP); Tomoko Eguchi, Tokyo (JP); Koichi Harada, Tokyo (JP); Yasuyuki Hotta, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 91 days.

(21) Appl. No.: 14/330,686

(22) Filed: Jul. 14, 2014

(65) Prior Publication Data

US 2014/0319406 A1 Oct. 30, 2014

Related U.S. Application Data

(62) Division of application No. 13/597,885, filed on Aug. 29, 2012, now Pat. No. 8,840,800.

(30) Foreign Application Priority Data

Aug. 31, 2011 (JP) ................... 2011-189070

(51) Int. Cl.
*B22F 1/02* (2006.01)
*H01F 1/01* (2006.01)
(Continued)

(52) U.S. Cl.
CPC .. *H01F 1/01* (2013.01); *B22F 1/02* (2013.01); *C22C 29/12* (2013.01); *C22C 32/001* (2013.01);
(Continued)

(58) Field of Classification Search
CPC ................ B22F 1/02; B22F 1/00; H01F 1/01; H01F 1/33; H01F 1/24; H01F 1/153; H01F 41/02; C22C 29/12; C22C 32/00
See application file for complete search history.

(56) References Cited

U.S. PATENT DOCUMENTS

| 7,700,194 B2 | 4/2010 | Suetsuna et al. |
| 7,740,939 B2 * | 6/2010 | Harada ..................... B22F 1/02 264/603 |

(Continued)

FOREIGN PATENT DOCUMENTS

| JP | 2001-358493 | 12/2001 |
| JP | 2005-251647 | 9/2005 |

(Continued)

OTHER PUBLICATIONS

Office Action issued Jun. 16, 2015 in Japanese Patent Application No. 2014-011891 (English translation only).

(Continued)

*Primary Examiner* — Carol M Koslow
(74) *Attorney, Agent, or Firm* — Oblon, McClelland, Maier & Neustadt, L.L.P.

(57) ABSTRACT

A magnetic material is disclosed, which includes magnetic particles containing at least one magnetic metal selected from the group including Fe, Co and Ni, and at least one non-magnetic metal selected from Mg, Al, Si, Ca, Zr, Ti, Hf, Zn, Mn, rare earth elements, Ba and Sr; a first coating layer of a first oxide that covers at least a portion of the magnetic particles; oxide particles of a second oxide that is present between the magnetic particles and constitutes an eutectic reaction system with the first oxide; and an oxide phase that is present between the magnetic particles and has an eutectic structure of the first oxide and the second oxide.

17 Claims, 10 Drawing Sheets

(51) Int. Cl.
    *H01F 1/24*     (2006.01)
    *H01F 1/33*     (2006.01)
    *C22C 29/12*     (2006.01)
    *C22C 32/00*     (2006.01)
    *H01F 41/00*     (2006.01)
    *H01F 1/153*     (2006.01)
    *H01F 41/02*     (2006.01)
    *B22F 1/00*     (2006.01)
    *B82Y 25/00*     (2011.01)
    *B82Y 30/00*     (2011.01)
    *B82Y 40/00*     (2011.01)

(52) U.S. Cl.
    CPC .............. *H01F 1/15333* (2013.01); *H01F 1/24* (2013.01); *H01F 1/33* (2013.01); *H01F 41/005* (2013.01); *B22F 1/0018* (2013.01); *B22F 2998/10* (2013.01); *B82Y 25/00* (2013.01); *B82Y 30/00* (2013.01); *B82Y 40/00* (2013.01); *H01F 1/153* (2013.01); *H01F 41/0246* (2013.01); *Y10S 977/774* (2013.01); *Y10S 977/778* (2013.01); *Y10S 977/81* (2013.01); *Y10S 977/838* (2013.01); *Y10S 977/89* (2013.01); *Y10T 428/12181* (2015.01); *Y10T 428/2991* (2015.01); *Y10T 428/325* (2015.01)

(56) References Cited

U.S. PATENT DOCUMENTS

| | | | |
|---|---|---|---|
| 8,475,922 | B2 | 7/2013 | Suetsuna et al. |
| 2003/0190498 | A1 | 10/2003 | Fujieda et al. |
| 2008/0029300 | A1 | 2/2008 | Harada et al. |
| 2008/0220231 | A1 | 9/2008 | Suetsuna et al. |
| 2008/0267806 | A1 | 10/2008 | Suetsuna et al. |
| 2009/0242826 | A1 | 10/2009 | Harada et al. |
| 2010/0060538 | A1 | 3/2010 | Suetsuna et al. |
| 2010/0060539 | A1 | 3/2010 | Suetsuna et al. |
| 2010/0068512 | A1 | 3/2010 | Imaoka et al. |
| 2011/0017501 | A1 | 1/2011 | Ohmi et al. |
| 2011/0217543 | A1 | 9/2011 | Suetsuna et al. |
| 2012/0038532 | A1 | 2/2012 | Yonetsu et al. |
| 2012/0049100 | A1 | 3/2012 | Yonetsu et al. |

FOREIGN PATENT DOCUMENTS

| | | |
|---|---|---|
| JP | 2006-179621 | 7/2006 |
| JP | 2007-13069 | 1/2007 |
| JP | 2007-123703 | 5/2007 |
| WO | WO 2008/133172 A1 | 11/2008 |

OTHER PUBLICATIONS

Office Action issued Nov. 25, 2014 in Japanese Patent Application No. 2014-011891 (with English language translation).
Combined Office Action and Search Report issued Apr. 21, 2015 in Chinese Patent Application No. 201210320275.4 (with English translation).
Office Action issued Nov. 26, 2013, in Japanese Patent Application No. 2012-190873 with English translation.
Office Action issued May 27, 2014, in Japanese Patent Application No. 2012-190873 filed Aug. 31, 2012 (with English translation).
Office Action issued Nov. 24, 2015 in Japanese Patent Application No. 2014-011891 (with English language translation).

* cited by examiner

MAGNETIC MATERIAL, METHOD FOR PRODUCING MAGNETIC MATERIAL, AND INDUCTOR ELEMENT

CROSS-REFERENCE TO RELATED APPLICATION

This application is based upon and claims the benefit of priority from Japanese Patent Application No. 2011-189070, filed on Aug. 31, 2011, the entire contents of which are incorporated herein by reference.

FIELD

Embodiments described herein relate generally to a magnetic material, a method for producing a magnetic material, and an inductor element.

BACKGROUND

Currently, magnetic materials are applied to various devices such as inductor elements, electromagnetic wave absorbers, magnetic inks, and antenna apparatuses, and are considered as very important materials. These components utilize the characteristics of the real part of the magnetic permeability (real part of the relative permeability) or the imaginary part of the magnetic permeability (imaginary part of the relative permeability) $\mu"$ carried by magnetic materials, in accordance with the purpose. For example, inductance elements or antenna apparatuses utilize high $\mu'$ (and low $\mu"$), while electromagnetic wave absorbers utilize high $\mu"$. Accordingly, when such components are actually used as devices, the characteristics $\mu'$ and $\mu"$ should be controlled in accordance with the frequency band of use of the equipment.

In recent years, an adjustment of the frequency band of use of the equipment to higher frequencies is underway, and thus there is an urgent need for the development of a magnetic material having excellent characteristics with high $\mu'$ and low $\mu"$ at high frequencies.

DETAILED DESCRIPTION

Figure 1:
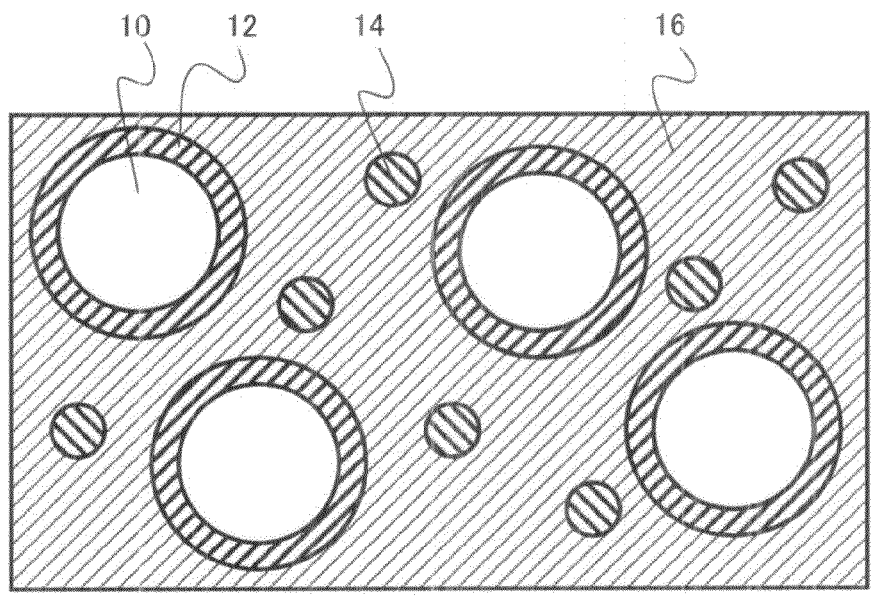
FIG. 1 is a schematic diagram of the magnetic material of a first embodiment.

The magnetic material of the embodiments includes magnetic particles containing at least one magnetic metal selected from a group consists of iron (Fe), cobalt (Co) and nickel (Ni), and at least one non-magnetic metal selected from the group including magnesium (Mg), aluminum (Al), silicon (Si), calcium (Ca), zirconium (Zr), titanium (Ti), hafnium (Hf), zinc (Zn), manganese (Mn), rare earth elements, barium (Ba) and strontium (Sr); a first coating layer of a first oxide that covers at least a portion of the magnetic particles; oxide particles of a second oxide that are present between the magnetic particles and constitute an eutectic reaction system with the first oxide; and an oxide phase that is present between the magnetic particles and has an eutectic structure of the first oxide and the second oxide.

Magnetic materials having high $\mu'$ and low $\mu"$ have recently attracted attention in connection with the application thereof to power inductance elements used in power semiconductors. In recent years, the importance of energy saving and environmental protection has been actively advocated, and a reduction of the $CO_2$ emission and a reduction of the dependency on fossil fuels have become indispensable.

As a result, the development of electric cars or hybrid cars to substitute gasoline cars is in active progress. Furthermore, the technologies for utilizing natural energies such as solar power generation and wind power generation are regarded as the key technologies for an energy-saving society, and various developed countries have actively promoted the development of technologies for utilizing natural energies. Furthermore, as an environment-friendly electric power saving system, the importance of establishment of home energy management systems (HEMS) and building and energy management systems (BEMS) that control the electric power generated by solar power generation, wind power generation and the like through smart grids, and supply the electric power to homes, offices and industrial plants at high efficiency, is being actively advocated.

In such a trend of energy savings, power semiconductors play an important role. Power semiconductors are semiconductors which control high electric power or energy with high efficiency, and include power discrete semiconductors such as insulated gate bipolar transistors (IGBTs), metal oxide semiconductor field-effect transistors (MOSFETs), power bipolar transistors, and power diodes, as well as power supply circuits such as linear regulators and switching regulators, and logic large-scale integration (LSI) for power management to control these devices.

Power semiconductors are widely used in all the equipment in the applications of electrical appliances, computers, automobiles, and rail transportation, and an increase in the supply of these applied instruments and an increase in the mounting ratio of power semiconductors in these instruments can be expected. Therefore, a rapid growth in the market for power semiconductors in the future is anticipated. For example, in the inverters that are mounted in many electrical appliances, power semiconductors are used to an extent that may be said to be almost the entirety, and extensive energy saving is made possible thereby.

Currently, silicon (Si) constitutes the mainstream of power semiconductors; however, for the purpose of increasing the efficiency or miniaturizing instruments, it is believed to be effective to use SiC and GaN. SiC or GaN has a large band gap or a large dielectric breakdown electric field and can increase the withstand voltage, and thus, SiC and GaN can decrease the thickness of elements. Therefore, the on-resistance of semiconductors can be decreased, and the substances are effective in reducing losses and increasing efficiency. Also, since SiC or GaN has a high degree of carrier mobility, the switching frequency can be increased to high frequencies, and it is effective in the miniaturization of elements. Particularly, since SiC has higher heat conductivity than Si does, SiC has high heat dissipation capacity and enables operation at high temperatures. Thus, the cooling mechanism can be simplified, and miniaturization is effectively achieved.

From the viewpoints described above, the development of SiC and GaN power semiconductors is in active progress. However, in order to realize the development, the development of power inductor elements that are used together with power semiconductors, that is, the development of high-permeability magnetic materials (high $\mu'$ and low $\mu''$), is indispensable. At this time, the characteristics required in magnetic materials include high magnetic permeability in the driving frequency band, low magnetic loss, as well as high saturation magnetization capable of coping with large currents. If the saturation magnetization is high, even if a high magnetic field is applied, magnetic saturation does not easily occur, and an effective decrease in the inductance value can be suppressed. Thereby, the direct current superimposition characteristics of devices are enhanced, and the efficiency of systems is enhanced.

Examples of a magnetic material for systems in the several kW class at 10 kHz to 100 kHz include Sendust (Fe—Si—Al), nanocrystalline Finemet (Fe—Si—B—Cu—Nb), ribbons and compressed powders of Fe group/Co group amorphous glass, and MnZn-based ferrite materials. However, all of them do not completely satisfy characteristics such as high magnetic permeability, low loss, high saturation magnetization, high thermal stability, and high oxidation resistance, and are therefore not satisfactory.

Furthermore, it is ascertained that the driving frequency of systems will be further adjusted to higher frequencies in the future, along with the popularization of SiC and GaN semiconductors, and characteristics such as high magnetic permeability and low loss in the megaherz (MHz) range of 100 kHz or higher are required. However, no such magnetic material exists for now. Therefore, the development of a magnetic material which satisfies high magnetic permeability and low loss in the MHz range of 100 kHz or higher, while satisfying high saturation magnetization, high thermal stability, and high oxidation resistance, is indispensable.

Furthermore, a magnetic material having high $\mu'$ and low $\mu''$ at high frequencies is expected to be applicable to the devices of high frequency communication equipment, such as antenna apparatuses. As a method of reducing the size of antennas and saving more electric power, there is available a method of dragging electromagnetic waves that reach an electronic component or a substrate in communication equipment from an antenna by using an insulating substrate having high magnetic permeability (high $\mu'$ and low $\mu''$) as an antenna substrate, and achieving transmission and reception of electromagnetic waves without causing the electromagnetic waves to reach the electronic component or substrate. Thereby, miniaturization of antennas and electric power savings are enabled, and at the same time, broadbanding the resonance frequency of antennas is also enabled, which is preferable.

Even in such applications, in the event that a magnetic material for power inductor elements described above has been developed, the magnetic material can be applied, and therefore, it is preferable.

Furthermore, in electromagnetic wave absorbers, the noise generated from electronic equipment is absorbed, and inconveniences such as malfunctions of electronic equipment is reduced, by utilizing high $\mu''$. Examples of the electronic equipment include semiconductor elements such as integrated circuit (IC) chips, and various communication instruments. Such electronic equipment is used in various frequency bands, and thus, high $\mu''$ at a predetermined frequency band is demanded. In general, a magnetic material has high $\mu''$ near a ferromagnetic resonance frequency. However, if various magnetic losses other than a ferromagnetic resonance loss, for example, an eddy current loss, a domain wall resonance loss and the like can be suppressed, $\mu''$ can be decreased while $\mu'$ can be increased in a frequency band sufficiently lower than the ferromagnetic resonance frequency.

That is, even a single material can be used as a high-permeability component or can be used as an electromagnetic wave absorber, by changing the frequency band of use. Therefore, in the event that a magnetic material for power inductors described above has been developed, even in an application for electromagnetic wave absorbers utilizing p", there is a possibility that the magnetic material can be applied by adjusting the ferromagnetic resonance frequency to the frequency band of use.

On the other hand, a material that is developed as an electromagnetic wave absorber is usually designed to maximize $\mu''$ by summing up various magnetic losses such as the ferromagnetic resonance loss, the eddy current loss, and the domain wall resonance loss. For this reason, it is difficult to use a material that is developed as an electromagnetic wave absorber, in high-permeability components for inductor elements or antenna apparatuses (high $\mu'$ and low $\mu''$) at any of all frequency bands.

Meanwhile, electromagnetic wave absorbers are conventionally produced according to a binder molding method of mixing ferrite particles, carbonyl iron particles, FeAlSi flakes, FeCrAl flakes and the like with a resin. However, all of these materials have extremely low $\mu'$ and $\mu''$ in high frequency bands, and do not necessarily give satisfactory characteristics. In addition, materials that are synthesized by a mechanical alloying method or the like have a problem that the long-term thermal stability is insufficient, and the product yield is low.

As discussed above, various materials have been suggested hitherto as the magnetic materials used in power inductor elements, antennas, and electromagnetic wave absorbers, but all of the materials do not satisfy the required material characteristics.

Hereinafter, the embodiments will be explained using the attached drawings. Identical or similar symbols have been assigned to the identical or similar parts in the drawings.

(First Embodiment)

The magnetic material of the current embodiment contains magnetic particles containing at least one magnetic metal selected from a group consists of Fe, Co and Ni, and at least one non-magnetic metal selected from Mg, Al, Si, Ca, Zr, Ti, Hf, Zn, Mn, rare earth elements, Ba and Sr; a first coating layer of a first oxide that covers at least a portion of these magnetic particles; oxide particles of a second oxide that are present between the magnetic particles and constitute an eutectic reaction system with the first oxide; and an oxide phase that is present between the magnetic particles and contains an eutectic structure of the first oxide and the second oxide.

The magnetic material of the current embodiment realizes high magnetic permeability and low loss in the MHz range of 100 kHz or higher, by having the constitution described above. Furthermore, the magnetic material also makes it possible to realize high saturation magnetization, high thermal stability, and high oxidation resistance.

FIG. 1 is a schematic diagram of the magnetic material of the current embodiment. The magnetic material of the current embodiment is composed of magnetic particles 10; a first coating layer 12 of a first oxide that covers these magnetic particles 10; oxide particles 14 of a second oxide that are present between the magnetic particles 10; and an oxide phase 16 formed from an eutectic structure of the first oxide and the second oxide.

The magnetic particles 10 contains at least one magnetic metal selected from a group consists of Fe (iron), Co (cobalt) and Ni (nickel), and at least one non-magnetic metal selected from Mg, Al, Si, Ca, Zr, Ti, Hf, Zn, Mn, rare earth elements, Ba and Sr. The magnetic particles 10 are formed from an alloy containing, for example, Fe, Co and Al (aluminum), or an alloy containing Fe, Ni, or Si (silicon).

The first oxide and the second oxide constitute an eutectic reaction system. That is, the first oxide and the second oxide produce an eutectic crystal. The first oxide is, for example, Si (silicon)-system oxide, and the second oxide is, for example, B (boron)-system oxide.

The first coating layer 12 that covers at least a portion of the magnetic particles 10 is formed of a first oxide. Furthermore, the oxide particles 14 that are present between the magnetic particles 10 are formed of a second oxide.

The oxide phase 16 that is present between the magnetic particles 10 is formed from the first oxide and the second oxide, and has an eutectic structure of the first oxide and the second oxide. The eutectic structure as used herein is a solidification structure produced by an eutectic reaction, and is a structure based on a layered (lamellar) eutectic structure in which two kinds of crystals are alternately arranged in layers, a rod-shaped eutectic structure in which crystals are arranged in a rod shape, or a helical eutectic structure in which crystals are arranged in a helical shape. At this time, for example, the spacing between the individual layers (or rods) of the layered structure, rod-shaped structure and helical structure is dependent on the eutectic composition, or the solidification conditions such as solidification rate.

According to the current embodiment, when the magnetic particles 10 are surrounded by the oxide phase 16 having an eutectic structure, aggregation of the magnetic particles 10 is suppressed, and thus a magnetic material which is thermally stable and has high oxidation resistance is realized. Therefore, deterioration of magnetic characteristics is suppressed.

Furthermore, the oxide phase 16 having an eutectic structure also has high mechanical strength. For this reason, cracking or damage does not easily occur when the material is subjected to a thermal cycle or under load, and the thermal stability or oxidation resistance of the magnetic material can be enhanced.

Furthermore, since the oxide phase 16 can be formed by an eutectic reaction between the first oxide and the second oxide, an oxide phase 16 having high strength at a relatively low temperature can be formed. Therefore, the magnetic material of the current embodiment can be produced by a process at a relatively low temperature. Therefore, according to the current embodiment, oxidation, modification or the like of the magnetic particles 10 during the production process can be suppressed.

According to the current embodiment, thermal stability and oxidation resistance can be further enhanced by leaving a first oxide which has a high melting point in a simple form, as the first coating layer 12, and leaving a second oxide which has a high melting point, as the oxide particles, between the magnetic particles 10, in addition to the oxide phase 16.

The magnetic particles 10 are such that when the particles are spherical, the average particle size is preferably from 50 nm to 50 μm. If the particle size of the magnetic particles 10 is too large, the coercive force decreases, which is preferable. On the other hand, when the electrical resistivity of the magnetic particles 10 is small, if the particle size is too large, the eddy current loss becomes large, which is not preferable. On the contrary, if the particle size of the magnetic particles 10 is too small, the eddy current loss becomes small, which is preferable; however, the coercive force becomes large, and it is not preferable.

Meanwhile, the magnetic loss of the magnetic material is mainly composed of three components such as an eddy current loss, a hysteresis loss, and a ferromagnetic resonance loss, and it is preferable that all the three components be low. Among these, the hysteresis loss is a loss attributable to the coercive force of the magnetic material, and if the coercive force increases, the hysteresis loss increases when the magnetic field applied to the magnetic material is increased, which is not preferable. The discussion on the average particle size as described above is a discussion concerning the optimum particle size for minimizing the sum of the eddy current loss and the hysteresis loss, and the optimum particle size range varies with the frequency band used. The optimum average particle size for minimizing the sum of the eddy current loss and the hysteresis loss in the MHz range of 100 kHz or higher, is from 50 nm to 50 μm.

Furthermore, the magnetic particles 10 may be spherical, but it is more preferable that the magnetic particles have a flat shape or a rod shape, which has a large aspect ratio. The rod shape also includes spheroid.

Here, the "aspect ratio" means the ratio of the dimension of a particle in a direction in which the length of the particle is the longest (long dimension) and the dimension of the particle in a direction that is perpendicular to the above-described direction, in which the length of the particle is the shortest (short dimension), that is, the ratio of "long dimension/short dimension". Therefore, the aspect ratio is always 1 or greater. In the case of a perfect sphere, the long dimension and the short dimension are both identical to the diameter of the sphere, and therefore, the aspect ratio is 1. The aspect ratio of a flat-shaped particle is the diameter (long dimension)/height (short dimension). The aspect ratio of a rod shape is the length of the rod (long dimension)/the diameter of the bottom of the rod (short dimension). However, the aspect ratio of a spheroid is the major axis (long dimension)/minor axis (short dimension). When the aspect ratio is increased, shape magnetic anisotropy can be added, and by aligning the directions of the axes of easy magnetization into one direction, the magnetic permeability and the high frequency characteristics of magnetic permeability can be enhanced. Meanwhile, the value obtained by averaging the aspect ratios of plural particles is called an "average aspect ratio." Furthermore, the values obtained by averaging the long dimensions and short dimensions in plural particles are called an "average long dimension" and an "average short dimension."

Meanwhile, if the aspect ratio is large, shape-induced magnetic anisotropy is added. Therefore, when a desired magnetic material is produced by integrating the magnetic particles 10, the magnetic particles can be easily oriented by the magnetic field. Also, when the aspect ratio is increased, in the case where a desired magnetic material is produced by integrating the magnetic particles 10, the packing ratio of the magnetic particles 10 can be increased as compared with the case of integrating spherical magnetic particles. Therefore, the saturation magnetization of the magnetic material per weight or the saturation magnetization per volume can be increased, and as a result, the magnetic permeability can also be increased.

Meanwhile, in the cases of flat-shaped and rod-shaped particles, it is preferable that the average height (in the case of a rod shape, the average diameter) be from 10 nm to 2 μm, and more preferably, it is preferable that the average height (in the case of a rod shape, the average diameter) be from 10 nm to 100 nm. A larger average aspect ratio is more preferable, and the average aspect ratio is preferably 5 or greater, and more preferably 10 or greater. These are sizes appropriate for minimizing the sum of the eddy current loss and the hysteresis loss in the MHz range of 100 kHz or greater.

It is desirable that the volume ratio of the magnetic particles 10 in the magnetic material occupy a volume ratio of from 10% to 70% relative to the total volume of the magnetic material. If the volume ratio exceeds 70%, the electrical resistivity of the magnetic material is small, the eddy current loss increases, and there is a risk that the high frequency magnetic properties would deteriorate. If the volume ratio is adjusted to less than 10%, when the volume fraction of the magnetic metal is lowered, the saturation magnetization of the magnetic material is decreased, and there is a risk that the magnetic permeability would be decreased thereby.

The magnetic metal contained in the magnetic particles 10 includes at least one selected from the group including Fe, Co, and Ni, and particularly, Fe-based alloys, Co-based alloys, FeCo-based alloys, and FeNi-based alloys are preferred because these alloys can realize high saturation magnetization. Fe-based alloys contain Ni, Mn, Cu and the like as a second component, and examples thereof include FeNi alloys, FeMn alloys, and FeCu alloy. Co-based alloys contain Ni, Mn, Cu and the like as a second component, and examples thereof include CoNi alloys, CoMn alloys, and CoCu alloys. FeCo-based alloys include Ni, Mn, Cu and the like as a second component.

These second components are components that are effective in enhancing the high-frequency magnetic properties of the magnetic particles 10. Since FeNi-based alloys have small magnetic anisotropy, these are materials advantageous for obtaining high magnetic permeability. Particularly, a FeNi alloy having Fe in a proportion of from 40 atom % to 60 atom % has high saturation magnetization and has low anisotropy, and therefore, this alloy is preferred.

Among the magnetic metals, it is preferable to use a FeCo-based alloy. The amount of Co in FeCo is preferably adjusted to an amount of from 10 atom % to 50 atom %, from the viewpoint of satisfying thermal stability, oxidation resistance, and a saturation magnetization of 2 teslas or greater. A more preferred amount of Co in FeCo is in the range of from 20 atom % to 40 atom %, from the viewpoint of further increasing the saturation magnetization.

The magnetic particles 10 preferably contain a non-magnetic metal as in the case of the current embodiment. In this case, it is preferable that the magnetic metal and the non-magnetic metal contained in the magnetic particles 10 form a solid solution with each other. By forming a solid solution, mechanical strength, thermal stability and oxidation resistance can be increased.

The non-magnetic material is at least one metal selected from Mg, Al, Si, Ca, Zr, Ti, Hf, Zn, Mn, rare earth elements, Ba, and Sr. These non-magnetic metals can increase the electrical resistivity of the magnetic particles 10, and can enhance thermal stability and oxidation resistance. Among them, Al and Si are preferred because these elements can easily form solid solutions with Fe, Co and Ni, which are the main components of metal nanoparticles, and contribute to an enhancement of thermal stability of the magnetic particles.

In regard to the amount of the non-magnetic metal, it is preferable that the magnetic material contain the non-magnetic metal in an amount of from 0.001 atom % to 20 atom % based on the magnetic metal. If the content of the non-magnetic metal is greater than 20 atom %, there is a risk that the saturation magnetization of the magnetic particles be decreased. A more preferred amount from the viewpoints of high saturation magnetization and solid solution properties is in the range of from 0.001 atom % to 5 atom %, and even more preferably from 0.01 atom % to 5 atom %.

Particularly, it is preferable that in the magnetic particles 10 containing a FeCo-based alloy as a magnetic metal and at least one element selected from Al and Si as a non-magnetic metal, the at least one element selected from Al and Si (if co-present, the sum of the respective contents) be incorporated in an amount in the range of from 0.001 atom % to 5 atom %, and more preferably from 0.01 atom % to 5 atom %, with reference to FeCo. Thereby, saturation magnetization, thermal stability and oxidation resistance in particular can be maintained at a satisfactory level.

As the crystal structure of the magnetic particles 10, a body-centered cubic lattice structure (bcc), a face-centered cubic lattice structure (fcc), and a hexagonal close-packed structure (hcp) can be considered, and each of them has unique features. The bcc structure is advantageous in that since a composition having a large proportion of a Fe-based alloy has the bcc structure, the bcc structure can be easily synthesized in a wide variety. The fcc structure is advantageous in that since the diffusion coefficient of the magnetic metal can be made smaller as compared to that of the bcc structure, thermal stability or oxidation resistance can be made relatively larger. The hcp structure (hexagonal structure) is advantageous in that the magnetic characteristics of the magnetic material can be made to exhibit in-plane uniaxial anisotropy. Since a magnetic metal having the hcp structure generally has high magnetic anisotropy, it is easy to orient the magnetic metal, and the magnetic permeability can be made large. Particularly, Co-based alloys easily acquire the hcp structure and are preferred. In the case of a Co-based alloy, since the alloy can stabilize the hcp structure by containing Cr or Al, it is preferable.

Meanwhile, in a magnetic material having in-plane uniaxial anisotropy, the in-plane uniaxial anisotropic magnetic field is preferably from 1 Oe to 500 Oe, and more preferably from 10 Oe to 500 Oe. This is a preferred range to maintain low loss and high magnetic permeability in the MHz range of 100 kHz or higher. If anisotropy is too low, the ferromagnetic resonance frequency occurs at a low frequency, and a large loss occurs in the MHz range, which is not preferable.

On the other hand, if anisotropy is high, the ferromagnetic resonance frequency is high, and a low loss can be realized; however, the magnetic permeability becomes small. The range of an anisotropic magnetic field which can achieve a balance between high magnetic permeability and low loss is from 1 Oe to 500 Oe, and more preferably from 10 Oe to 500 Oe.

Meanwhile, in order to induce in-plane uniaxial anisotropy in a magnetic material, there is a method of orienting magnetic particles having the hcp structure, as well as a method of inducing magnetic anisotropy in any one direction in the plane by means of a magnetic field or strain, by making the crystallinity of the magnetic particles 10 amorphous as much as possible. For this reason, it is preferable to employ a composition which can make the magnetic particles amorphous as easily as possible.

From such a viewpoint, it is preferable that the magnetic metal contained in the magnetic particles 10 include at least one additive metal selected from B, Si, C, Ti, Zr, Hf, Nb, Ta, Mo, Cr, Cu and W, which are different from the non-magnetic metal, altogether in an amount of from 0.001 atom % to 25 atom % relative to the total amount of the magnetic metal, non-magnetic metal and additive metal, and that at least two of the magnetic metal, the non-magnetic metal, and the additive metal form a solid solution with each other.

Examples of the combination of the first oxide and the second oxide (first oxide-second oxide, or second oxide-first oxide) according to the current embodiment include $B_2O_3$—$SiO_2$, $B_2O_3$—$Cr_2O_3$, $B_2O_3$—$MoO_3$, $B_2O_3$—$Nb_2O_5$, $B_2O_3$—$Li_2O_3$, $B_2O_3$—$BaO$, $B_2O_3$—$ZnO$, $B_2O_3$—$La_2O_3$, $B_2O_3$—$P_2O_5$, $B_2O_3$—$Al_2O_3$, $B_2O_3$—$GeO_2$, $B_2O_3$—$WO_3$, $B_2O_3$—$Cs_2O$, $B_2O_3$—$K_2O$, $Na_2O$—$SiO_2$, $Na_2O$—$B_2O_3$, $Na_2O$—$P_2O_5$, $Na_2O$—$Nb_2O_5$, $Na_2O$—$WO_3$, $Na_2O$—$MoO_3$, $Na_2O$—$GeO_2$, $Na_2O$—$TiO_2$, $Na_2O$—$As_2O_5$, $Li_2O$—$MoO_3$, $Li_2O$—$SiO_2$, $Li_2O$—$GeO_2$, $Li_2O$—$WO_3$, $Li_2O$—$V_2O_5$, $K_2O$—$SiO_2$, $K_2O$—$P_2O_5$, $K_2O$—$TiO_2$, $K_2O$—$As_2O_5$, $K_2O$—$WO_3$, $K_2O$—$MoO_3$, $K_2O$—$V_2O_5$, $K_2O$—$Nb_2O_5$, $K_2O$—$GeO_2$, $K_2O$—$Ta_2O_5$, $Cs_2O$—$MoO_3$, $Cs_2O$—$V_2O_5$, $Cs_2O$—$Nb_2O_5$, $Cs_2O$—$SiO_2$, $CaO$—$P_2O_5$, $CaO$—$B_2O_3$, $CaO$—$V_2O_5$, $ZnO$—$V_2O_5$, $BaO$—$V_2O_5$, $BaO$—$WO_3$, $Cr_2O_3$—$V_2O_5$, $PbO$—$SiO_2$, and $MoO_3$—$WO_3$.

Among them, $B_2O_3$—$SiO_2$, $B_2O_3$—$Cr_2O_3$, $B_2O_3$—$MoO_3$, $B_2O_3$—$Nb_2O_5$, $B_2O_3$—$Li_2O_3$, $B_2O_3$—$BaO$, $B_2O_3$—$ZnO$, $B_2O_3$—$La_2O_3$, $B_2O_3$—$P_2O_5$, $B_2O_3$—$Al_2O_3$, $B_2O_3$—$GeO_2$, $B_2O_3$—$WO_3$, $Na_2O$—$SiO_2$, $Na_2O$—$B_2O_3$, $Na_2O$—$P_2O_5$, $Na_2O$—$Nb_2O_5$, $Na_2O$—$WO_3$, $Na_2O$—$MoO_3$, $Na_2O$—$GeO_2$, $Na_2O$—$TiO_2$, $Na_2O$—$As_2O_5$, $Li_2O$—$MoO_3$, $Li_2O$—$SiO_2$, $Li_2O$—$GeO_2$, $Li_2O$—$WO_3$, $Li_2O$—$V_2O_5$, $CaO$—$P_2O_5$, $CaO$—$B_2O_3$, $CaO$—$V_2O_5$, $ZnO$—$V_2O_5$, $BaO$—$V_2O_5$, $BaO$—$WO_3$, $Cr_2O_3$—$V_2O_5$, and $MoO_3$—$WO_3$ are preferred. The oxides of these combinations have relatively low eutectic points, and produce eutectic crystals relative easily. Therefore, these combinations are preferred.

Particularly, a combination having an eutectic point of 1000° C. or lower is preferred. Furthermore, in regard to the combination of oxides, combinations of two or more oxides may also be employed, and preferable examples include $Na_2O$—$CaO$—$SiO_2$, $K_2O$—$CaO$—$SiO_2$, $Na_2O$—$B_2O_3$—$SiO_2$, $K_2O$—$PbO$—$SiO_2$, $BaO$—$SiO_2$—$B_2O_3$, $PbO$—$B_2O_3$—$SiO_2$, and $Y_2O_3$—$Al_2O_3$—$SiO_2$.

Other preferable examples include La—Si—O—N, Ca—Al—Si—O—N, Y—Al—Si—O—N, Na—Si—O—N, Na—La—Si—O—N, Mg—Al—Si—O—N, Si—O—N, and Li—K—Al—Si—O—N.

An eutectic structure formed from such combinations of oxides as described above is preferable because the structure forms a fine structure and gives a material that is strong in strength.

Figure 2:
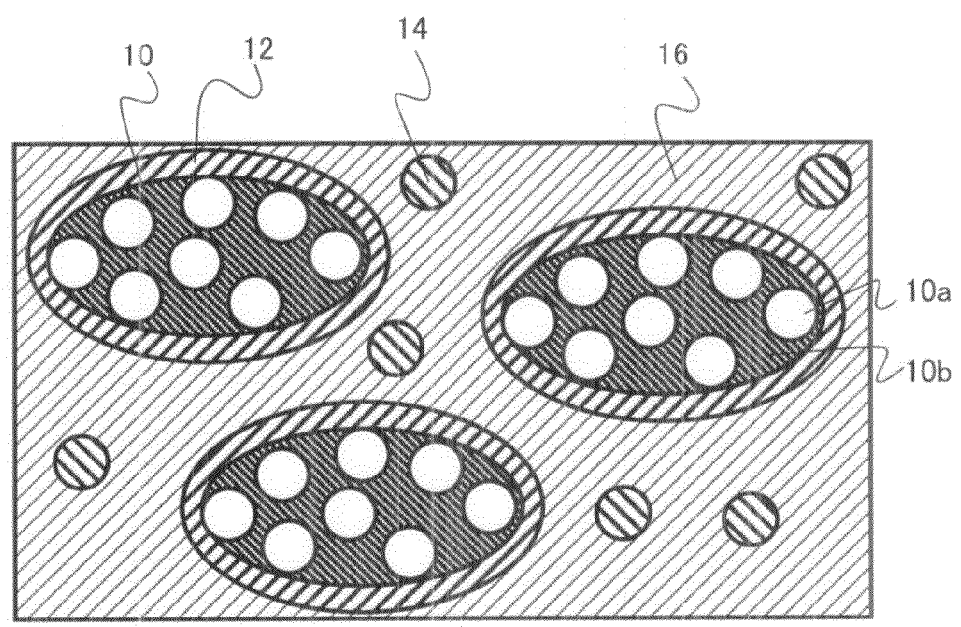
FIG. 2 is a schematic diagram of the magnetic material of a first modification of the first embodiment.

FIG. 2 is a schematic diagram of a first modification of the current embodiment. The magnetic particles 10 are particle aggregates which have metal nanoparticles 10a having an average particle size of from 10 nm to 20 nm and containing at least one magnetic metal selected from the group including Fe, Co and Ni, and have a shape in which the average short dimension of from 10 nm to 2 μm and an average aspect ratio of 5 or greater. Furthermore, the magnetic particles 10 contains an intermediate phase 10b which is present between the metal nanoparticles 10a and contains at least one non-magnetic metal selected from magnesium (Mg), aluminum (Al), silicon (Si), calcium (Ca), zirconium (Zr), titanium (Ti), hafnium (Hf), zinc (Zn), manganese (Mn), barium (Ba), strontium (Sr), chromium (Cr), molybdenum (Mo), silver (Ag), gadolinium (Gd), scandium (Sc), vanadium (V), yttrium (Y), niobium (Nb), lead (Pb), copper (Cu), indium (In), tin (Sn), and rare earth elements, and any one of oxygen (O), nitrogen (N) and carbon (C). The intermediate phase 10b may contain fluorine (F). The intermediate phase 10b is, for example, a metal, a semiconductor, an oxide, a nitride, a carbide, or a fluoride. Also, the intermediate phase 10b has higher electrical resistivity than the magnetic particles 10.

In the current modification, the magnetic material is composed of particle aggregates having a nanogranular structure. A structure in which the intermediate phase 10b fills the space between the metal nanoparticles 10a, is established.

In such particle aggregates, the metal nanoparticles 10a are likely to magnetically bind to each other, and behave as a single aggregate magnetically. On the other hand, since the intermediate phase 10b having high electrical resistivity, for example, an oxide, is present between the particles of the metal nanoparticles 10a, the electrical resistivity of the magnetic particles 10 can be increased. Therefore, an eddy current loss can be suppressed while high magnetic permeability is maintained.

The metal nanoparticles 10a preferably have an average particle size of from 1 nm to 20 nm. More preferably, the average particle size is from 1 nm to 10 nm. If the average particle size is less than 1 nm, superparamagnetism occurs, and there is a risk that the amount of magnetic flux may decrease. On the other hand, if the average particle size is larger than 20 nm, magnetic interaction is weakened, and it is not preferable. In order to enhance the magnetic interaction between the particles while maintaining a sufficient amount of magnetic flux, the particle size is preferably in the range of from 1 nm to 20 nm, and more preferably in the range of from 1 nm to 10 nm.

The metal nanoparticles 10a may be either polycrystalline or single crystal, but the single crystal is preferred. In the case of single crystal metal nanoparticles, alignment of the axes of easy magnetization is easily achieved, and magnetic anisotropy can be controlled. Therefore, the high frequency characteristics can be enhanced as compared with the case of polycrystalline magnetic metal nanoparticles.

Furthermore, the metal nanoparticles 10a may be spherical, but may also be flat-shaped or rod-shaped, both of which have large aspect ratios. Particularly, it is preferable that the average of the aspect ratio be 2 or greater, and more preferably 5 or greater.

In the case of metal nanoparticles 10a having a large aspect ratio, it is more preferable to coincide the long-side direction of individual metal nanoparticles 10a (in the case of a plate shape, the width direction; in the case of an oblate ellipsoid, the diameter direction; in the case of a rod shape, the rod length direction, and in the case of an ellipsoid of revolution, the major axis direction) with the long-side direction of the magnetic particles (particle aggregates) 10 (in the case of a plate shape, the width direction; in the case of an oblate ellipsoid, the diameter direction; in the case of a rod shape, the rod length direction, and in the case of an ellipsoid of revolution, the major axis direction). Thereby, the directions of the axes of easy magnetization can be aligned into one direction, and the magnetic permeability and the high frequency characteristics of magnetic permeability can be enhanced.

The magnetic metal contained in the metal nanoparticles 10a is the same as the magnetic metal contained in the magnetic particles 10 described above. Since the description is redundant, the explanation of the magnetic metal will not be repeated here. It is preferable that the metal nanoparticles 10a contain at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. These non-magnetic metals can enhance the electrical resistivity of the metal nanoparticles 10a, and can enhance thermal stability and oxidation resistance, which is preferable. Among them, Al and Si are preferred because these elements can easily form solid solutions with Fe, Co and Ni, which are used as the main component of the metal nanoparticles 10a, and contribute to an enhancement of the thermal stability of the metal nanoparticles 10a.

In regard to the amount of the non-magnetic metal, it is preferable that the metal nanoparticles contain the non-magnetic metal in an amount of from 0.001 atom % to 20 atom % relative to the amount of the magnetic metal. If the respective contents of the non-magnetic metals exceed 20 atom %, there is a risk that the saturation magnetization of the magnetic metal nanoparticles may be decreased. A more preferred amount from the viewpoints of high saturation magnetization and solid solubilization is in the range of from 0.001 atom % to 5 atom %, and more preferably in the range of from 0.01 atom % to 5 atom %.

At least a portion of the surfaces of the metal nanoparticles 10a may be covered with a coating layer. The coating layer is preferably formed from an oxide, a composite oxide, a nitride, a carbide or a fluoride, which contains at least one magnetic metal which is a constituent component of the metal nanoparticles 10a. When the coating layer contains at least one magnetic metal which is a constituent component of the metal nanoparticles 10a, the adhesiveness between the metal nanoparticle 10a and the coating layer increases, and thermal stability and oxidation resistance are enhanced.

Furthermore, the coating layer is more preferably formed from an oxide, a composite oxide, a nitride, a carbide or a fluoride, which contains at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. When the metal nanoparticles 10a contain at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer be composed of an oxide, a composite oxide, a nitride, a carbide or a fluoride, which contains at least non-magnetic metal that is the same as the non-magnetic metal which is one of the constituent components of the metal nanoparticles 10a. Thereby, the adhesiveness between the metal nanoparticle 10a and the coating layer can be enhanced, and also, the thermal stability and oxidation resistance of the magnetic material can be enhanced.

Meanwhile, it is more preferable that the constitution of the coating layer as described above include an oxide or a composite oxide in particular, among an oxide, a composite oxide, a nitride, a carbide or a fluoride. This is because an oxide or a composite oxide is preferable from the viewpoints of the ease of the formation of a coating layer, oxidation resistance, and thermal stability.

Furthermore, the oxide or composite oxide coating layer is an oxide or a composite oxide containing at least one of the magnetic metal which is a constituent component of the metal nanoparticles 10a, and is more preferably an oxide or a composite oxide containing at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements.

This non-magnetic metal is an element which has small standard Gibbs energy of formation of the oxide and is easily oxidized, and the non-magnetic metal can easily form a stable oxide. The oxide coating layer that is formed from an oxide or a composite oxide containing at least one or more of these non-magnetic metals can have enhanced adhesiveness and bindability to the metal nanoparticles 10a, and can also enhance the thermal stability and oxidation resistance of the metal nanoparticles 10a.

Among the non-magnetic metals, Al and Si are preferred because these elements can easily form solid solutions with Fe, Co and Ni, which are used as the main component of the magnetic metal particles, and contribute to an enhancement of the thermal stability of the metal nanoparticles 10a. A composite oxide which contains plural kinds of non-magnetic metals also encompasses a solid solution form. The coating layer that covers at least a portion of the surfaces of the metal nanoparticles 10a not only enhances oxidation resistance of the metal nanoparticles 10a in the interior, but also can enhance the electrical resistivity of the magnetic particles. By increasing the electrical resistivity, the eddy current loss at high frequencies can be suppressed, and the high frequency properties of magnetic permeability can be improved. For this reason, the coating layer preferably has high electrical resistivity, and for example, it is preferable that the coating layer have an electrical resistivity of 1 mΩ·cm or higher.

As the coating layer is thicker, the electrical resistivity of the magnetic particles 10 increases, and the thermal stability and oxidation resistance of the metal nanoparticles 10a also increase. However, if the coating layer is too thick, the magnetic interaction between the metal nanoparticles 10a is easily broken, and individual metal nanoparticles 10a are likely to behave magnetically independently. This is not preferable from the viewpoints of the magnetic permeability and the high frequency properties of magnetic permeability. Furthermore, when the coating layer is thickened, the proportion of the magnetic components contained in the magnetic particles 10 decreases. Accordingly, the saturation magnetization of the magnetic particles 10 is lowered, and the magnetic permeability is decreased, which is not preferable. In order for the coating layer to have appropriately large electrical resistivity, to have individual metal nanoparticles 10a magnetically bound, and to increase the saturation magnetization of the magnetic particles 10, it is more preferable that the coating layer have an average thickness of from 0.1 nm to 5 nm.

Meanwhile, in the current modification, the case in which the intermediate phase 10b is present between the metal nanoparticles 10a was described as an example; however, when the metal nanoparticles 10a has the coating layer described above, the coating layer can increase the electrical resistivity between the metal nanoparticles 10a, and also the electrical resistivity of the magnetic particles 10. Therefore, it is also possible to employ a configuration in which the intermediate phase 10b is omitted.

Also, it is preferable that the intermediate phase 10b that is present between the metal nanoparticles 10a and contains at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and any one of oxygen (O), nitrogen (N) and carbon (C), have a electrical resistivity of 1 mΩ·cm or higher.

These non-magnetic metals are elements which have small standard Gibbs energy of formation of the oxide and are easily oxidized, and are metals that can easily form stable oxides, which is preferable. When the metal, semiconductor, oxide, nitride, carbide or fluoride, which contains such a non-magnetic metal is present as the intermediate phase 10b between the metal nanoparticles 10a, it is preferable because the electrical insulation properties between the metal nanoparticles 10a can be further enhanced, and the thermal stability of the metal nanoparticles can be enhanced.

Furthermore, it is preferable that the intermediate phase 10b of a metal, a semiconductor, an oxide, a nitride, a carbide or a fluoride contain at least one of the magnetic metals described, which are contained in the metal nanoparticles 10a. When the metal, semiconductor, oxide, nitride, carbide or fluoride contains at least one of the metals that are the same as the magnetic metals contained in the metal nanoparticles 10a, thermal stability and oxidation resistance are enhanced. Furthermore, when a ferromagnetic component is present between the metal nanoparticles 10a, the magnetic interaction between the magnetic metal nanoparticles is strengthened and the metal nanoparticles 10a and the intermediate phase 10b can behave as aggregates magnetically. Thus, it is preferable from the viewpoint of enhancing the magnetic permeability and the high frequency properties of magnetic permeability.

Furthermore, similarly, when the intermediate phase 10b of a metal, a semiconductor, an oxide, a nitride, a carbide or a fluoride contains at least one of the same non-magnetic metals as the non-magnetic metals contained in the metal nanoparticles 10a, it is preferable because thermal stability and oxidation resistance are enhanced.

Among the metal, semiconductor, oxide, nitride, carbide and fluoride, it is more preferable that the intermediate phase contain an oxide from the viewpoint of thermal stability.

Meanwhile, when the intermediate phase contains at least one magnetic metal and at least one non-magnetic metal that are contained in the metal nanoparticles, it is preferable that the atomic ratio of the non-magnetic metal/magnetic metal in the intermediate phase be larger than the atomic ratio of the non-magnetic metal/magnetic metal contained in the metal nanoparticles. This is because the metal nanoparticles can be blocked with an "intermediate phase having a large ratio of non-magnetic metal/magnetic metal," which has high oxidation resistance and high thermal stability, and thus the oxidation resistance and thermal stability of the metal nanoparticles can be effectively increased. Furthermore, it is preferable that the content of oxygen contained in the intermediate phase be larger than the content of oxygen contained in the metal nanoparticles. This is because the metal nanoparticles can be blocked with an "intermediate phase having a large oxygen, concentration and having high oxidation resistance and high thermal stability," and the oxidation resistance and thermal stability of the metal nanoparticles can be effectively increased.

It is preferable that the intermediate phase 10b of a metal, an oxide, a nitride, a carbide or a fluoride be composed of particles having a smaller particle size than the metal nanoparticles 10a. At this time, the particles may be oxide particles, may be nitride particles, may be carbide particles, or may be fluoride particles. However, from the viewpoint of thermal stability, it is more preferable that the intermediate phase be composed of oxide particles. In the following descriptions, the case in which the intermediate phase 10b be composed of oxide particles will be taken as an example in all cases.

Meanwhile, a more preferred state of existence of the oxide particles is a state in which the oxide particles are uniformly and homogeneously dispersed between the metal nanoparticles 10a. Thereby, more uniform magnetic properties and dielectric properties can be expected. These oxide particles not only enhance the oxidation resistance and the suppression of the aggregation of the metal nanoparticles 10a, that is, thermal stability of the metal nanoparticles 10a, but also electrically separate the metal nanoparticles 10a. Thus, the oxide particles can increase the electrical resistivity of the magnetic particles 10 and the magnetic material. When the electrical resistivity of the magnetic material is increased, the eddy current loss at high frequencies is suppressed, and the high frequency properties of magnetic permeability can be enhanced. Accordingly, it is preferable that the oxide particles have high electrical resistivity, and it is preferable that the oxide particles have an electrical resistivity of 1 mΩ·cm or higher.

The oxide particles contains at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. These non-magnetic metals are elements which have small standard Gibbs energy of formation of the oxide and are easily oxidized, and these non-magnetic metals can easily form stable oxides.

Further, when the metal nanoparticles 10a include a coating layer, it is preferable that the ratio of non-magnetic metal/magnetic metal (atomic ratio) in these oxide particles be larger than the ratio of non-magnetic metal/magnetic metal (atomic ratio) in the coating layer that covers the metal nanoparticles 10a. As such, since the proportion of the non-magnetic metal is high, the oxide particles are thermally more stable than the coating layer.

Accordingly, when such oxide particles are present in at least a portion of the space between the metal nanoparticles 10a, the electrical insulation properties between the metal nanoparticles 10a can be further enhanced, and the thermal stability of the magnetic metal nanoparticles can be enhanced.

Meanwhile, the oxide particles may not contain a magnetic metal, but it is more preferable that the oxide particles contain a magnetic metal. A preferred amount of the magnetic metal that is contained in the oxide particles is such that the proportion of the magnetic metal is 0.001 atom % or more, and preferably 0.01 atom % or more, with respect to the non-magnetic metal. This is because, if the oxide particles do not contain a magnetic metal at all, the constituent components of the coating layer that covers the surfaces of the metal nanoparticles 10a and the oxide particles completely differ from each other, and it is not so preferable in view of adhesiveness or strength, and there is a possibility that thermal stability may be rather deteriorated. Also, if the oxide particles that are present between the metal nanoparticles do not contain a magnetic metal at all, it is difficult for the metal nanoparticles to magnetically interact with each other, and it is not preferable from the viewpoints of the magnetic permeability and the high frequency characteristics of magnetic permeability.

Therefore, more preferably, the oxide particles are a constituent component of the metal nanoparticles 10a, and it is preferable that the oxide particles contain at least one magnetic metal that is a constituent component of the oxide coating layer, while it is more preferable that the ratio of non-magnetic metal/magnetic metal (atomic ratio) in the oxide particles be larger than the ratio of non-magnetic metal/magnetic metal (atomic ratio) in the oxide coating layer.

Meanwhile, the oxide particles are more preferably oxide particles that contain a non-magnetic metal that is of the same kind as the non-magnetic metal contained in the metal nanoparticles 10a, and of the same kind as the non-magnetic metal contained in the oxide coating layer. It is because when the oxide particles are oxide particles containing a non-magnetic metal of the same kind, the thermal stability and oxidation resistance of the magnetic metal nanoparticles are further enhanced.

Meanwhile, the thermal stability enhancing effect, the electrical insulation effect, and the adhesiveness and strength enhancing effect of the oxide particles as described above are exhibited particularly when the average particle size of the metal nanoparticles 10a is small, and it is particularly effective when the particle size of the oxide particles is smaller than the particle size of the metal nanoparticles 10a.

Furthermore, the volume filling ratio of the metal nanoparticles 10a is preferably from 30 vol % to 80 vol % relative to the total volume of the magnetic particles 10 which are particle aggregates. The volume filling ratio is more preferably from 40 vol % to 80 vol %, and even more preferably from 50 vol % to 80 vol %.

When the volume filling ratio of the metal nanoparticles 10a is increased, the distances between the metal nanoparticles 10a that are contained in the magnetic particles 10 are inevitably shortened. Therefore, the metal nanoparticles 10a magnetically strongly interact with each other, and behave as particle aggregates magnetically, so that the magnetic permeability can be increased. Since the metal nanoparticles 10a are not physically perfectly connected, the microscopic eddy current loss can be reduced, and the high frequency properties of magnetic permeability can be enhanced.

In order to exhibit this effect more effectively, the average interparticle distance of the metal nanoparticles 10a contained in the magnetic particles 10 is preferably from 0.1 nm to 10 nm, and more preferably from 0.1 nm to 5 nm. The interparticle distance as used herein means the distance of the gap between two metal nanoparticles 10a, along a line connecting the center of one metal nanoparticle 10a and the center of another metal nanoparticle 10a. When the surface of the metal nanoparticles 10a is covered by a coating layer, the interparticle distance refers to the distance of the gap between the outermost surface of the surface coating layer of one metal nanoparticle 10a and the outermost surface of the surface coating layer of another metal nanoparticle 10a.

When the interparticle distance is adjusted to a desired distance, the metal nanoparticles 10a magnetically interact with each other, and behave as particle aggregates (composite magnetic particles) magnetically, so that the magnetic permeability can be increased. Furthermore, since the metal nanoparticles 10a are not physically perfectly connected, the microscopic eddy current loss can be reduced, and the high frequency properties of magnetic permeability can be enhanced.

In this specification, such a particle aggregate of the metal nanoparticles 10a is regarded as one magnetic particle 10, but there are occasions in which two or more particle aggregates join together in the process of forming particle aggregates. Even in such cases, when a boundary line is drawn between particle aggregates, and the average particle size of one particle aggregate segregated by this boundary line is from 50 nm to 50 µm, the segregated particle aggregate is acceptable as a particle aggregate, in the case of spherical aggregates. Furthermore, in the case of flat-shaped or rod-shaped particle aggregates, when the average height (in the case of a rod shape, the average diameter) is from 10 nm to 2 µm, and more preferably, when the average height is from 10 nm to 100 nm, and the aspect ratio is 5 or greater, and more preferably 10 or greater, the segregated particle aggregate is acceptable as a particle aggregate.

Furthermore, there are also occasions in which a portion of one particle aggregate is bound to another particle aggregate. Even in this case, when a boundary line is drawn between the one particle aggregate and the portion of the other particle aggregate, if the conditions such as described above are satisfied, the divided particle aggregate is acceptable as a particle aggregate having a shape in which a portion of one particle aggregate is bound to another particle aggregate.

Furthermore, there are also occasions in which particle aggregates having a distorted shape other than a plate shape, an oblate ellipsoid, a rod shape, or an ellipsoid of revolution, are obtained. When the ratio of the long dimension and the short dimension, that is, the aspect ratio is 5 or greater, and more preferably 10 or greater, and the length (height) in the direction perpendicular to the longest diameter is from 10 nm to 2 µm, and more preferably, the short dimension is from 10 nm to 100 nm, the particle aggregate is acceptable as a particle aggregate having a distorted shape.

Furthermore, when a material other than the metal nanoparticles 10a, which is contained in the particle aggregates, and the material surrounding the particle aggregates are the same, the outer periphery of the particle aggregates is ambiguous and not easily recognizable. Even in such a case, if it can be confirmed by structural observation by TEM or SEM that the metal nanoparticles 10a aggregate and segregate in a certain material, and particle aggregates are formed having an average short dimension of from 10 nm to 2 µm, and an average aspect ratio of 5 or greater, the particle aggregate is acceptable as a particle aggregate. As discussed above, when the distance between the metal nanoparticles 10a contained in the particle aggregates is 10 nm or less, the effect offered by the current modification is enhanced. Therefore, the distance between aggregated and unevenly distributed metal nanoparticles is preferably 10 nm or less.

Furthermore, when a portion of one particle aggregate is bound to another particle aggregate, and also in the case of a particle aggregate having a distorted shape other than a plate shape, an oblate ellipsoid, a rod shape, or an ellipsoid of revolution, if the height and aspect ratio described above are satisfied when a boundary line is drawn, the particle aggregate is acceptable as a particle aggregate. As one of the methods of drawing boundary lines, a method of drawing a boundary line at a site where the average value of the interparticle distance between one metal nanoparticle 10a and another metal nanoparticle 10a present in the vicinity is 10 nm or greater, and preferably 100 nm or greater, may be used.

Meanwhile, this is just one of possible methods after all, and in reality, it is preferable to determine, by structural observation by TEM or SEM to an extent based on common sense, a region in which there are relatively more metal nanoparticles 10a as compared with the surroundings, and to draw a boundary line as one particle aggregate. Furthermore, it is preferable that the magnetic particles 10 have a shape with a large aspect ratio, from the viewpoints of high magnetic permeability and satisfactory high frequency magnetic properties.

Flat-shaped and rod-shaped magnetic particles are preferred, and the average height (in the case of a rod shape, the average diameter) is preferably from 10 nm to 2 µm, more preferably from 10 nm to 2 µm, and even more preferably from 10 nm to 100 nm. A larger average aspect ratio is more preferred, and an average aspect ratio of 5 or greater is preferred. The average aspect ratio is more preferably 10 or greater. These are appropriate sizes for minimizing the sum of the eddy current loss and the hysteresis loss in the MHz range of 100 kHz or higher.

Furthermore, a higher electrical resistivity of the magnetic particles is more preferred; however, even if the intermediate phase 10b of the metal, semiconductor, oxide, nitride, carbide or fluoride that is contained in the magnetic particles 10 has higher resistivity, generally as the volume proportion of the metal nanoparticles 10a increases, the electrical resistivity of the magnetic particles 10 decreases. This is because in reality, the metal nanoparticles 10a do not isolate themselves, but partially form a network or aggregate. Such an effect becomes conspicuous as the particle size of the metal nanoparticles 10a is smaller, and the volume proportion is larger.

On the other hand, if the volume ratio of the metal nanoparticles 10a is decreased, the content of the magnetic component contained in the magnetic particles 10 decreases. Therefore, a decrease in the saturation magnetization is caused, and it is not preferable. As such, the electrical resistivity and saturation magnetization of the magnetic particles 10 are in a trade-off relationship to some extent.

Ideally, when the volume ratio of the metal nanoparticles in the magnetic particles is from 30 vol % to 80 vol %, more preferably from 40 vol % to 80 vol %, and even more preferably from 50 vol % to 80 vol %, it is preferable if the electrical resistivity of the magnetic particles 10 can be maximized. The electrical resistivity is preferably from 100 µΩ·cm to 100 mΩ·cm.

That is, a preferred range of electrical resistivity in which a balance is achieved between high saturation magnetization and high electrical resistivity is from 100 µΩ·cm to 100 mΩ·cm. Meanwhile, such magnetic particles 10 are capable of inducing in-plane uniaxial anisotropy by means of the magnetic field or strain, which is preferable. As discussed above, in a magnetic material having in-plane uniaxial anisotropy, the anisotropic magnetic field in an easy magnetization plane is preferably from 1 Oe to 500 Oe, and more preferably from 10 Oe to 500 Oe. This is an appropriate range to maintain low loss and high magnetic permeability in the MHz range of 100 kHz or higher.

The composition of the magnetic particles 10 or the like can be easily analyzed by using a transmission electron microscope-energy dispersive X-ray spectrometer (TEM-EDX). According to the TEM-EDX, the approximate composition of the particles can be checked by irradiating the particles with EDX and determining the composition semi-quantitatively. At this time, even the approximate composition of nanoparticles can be checked by narrowing the beam diameter. Also, techniques such as inductively coupled plasma (ICP) atomic emission spectrometry, X-ray photoelectron spectroscopy (XPS), and secondary ion mass spectrometry (SIMS) can also be utilized. According to ICP atomic emission spectrometry, the composition of metals and oxides can be quantitatively determined by selecting the types of acids and alkalis for dissolving the components. That is, a metal dissolved in a weak acid, and an oxide dissolved in an alkali or a strong acid can be separated and quantified. Furthermore, according to XPS, the binding state of various elements that constitute the particles can be investigated.

The average particle size of the magnetic particles 10 can be determined by TEM observation or SEM observation, and in the case where the particles are spherical, the average particle size can be determined by defining the average of the longest diagonal and the shortest diagonal of individual particles as the particle diameters, and calculating the average of the particle diameters of plural particles, for example, 50 particles. Meanwhile, when the average particle size of the magnetic particles is as small as 50 nm or less, and it is difficult to distinguish the particle size by TEM, the crystal grain size that can be determined by X-ray diffraction (XRD) measurement can be used as a substitute. That is, for the maximum peak among the peaks attributable to the magnetic particles, the crystal grain size can be determined by XRD using Scherrer's formula from the diffraction angle and the half-width. Scherer's formula is represented by $D=0.9\lambda/(\beta \cos\theta)$, wherein D represents the crystal grain size, $\lambda$ represents the wavelength of the X-ray for measurement, $\beta$ represents the half-width, and $\theta$ represents Bragg diffraction angle. Even for flat-shaped or rod-shaped particles having large aspect ratios, the respective long dimensions (in the case of a flat shape, the diameter; and in the case of a rod shape, the length of the rod), or the respective short dimensions (in the case of a flat shape, the height; and in the case of a rod shape, the diameter of the bottom surface of the rod) can be determined by the same technique. The aspect ratio is determined by analyze an image by TEM or SEM to analyze plural magnetic particles, and calculating the average value. Furthermore, the volume ratio or the volume filling ratio of the magnetic particles can be simply calculated by making TEM observation or SEM observation, and determining the average particle size, the average aspect ratio, and the number proportion.

Whether the magnetic metal and the non-magnetic metal contained in the magnetic particles 10 form a solid solution can be determined from the lattice constant measured by XRD. For example, when Fe as a magnetic metal and Al as a non-magnetic metal, which are contained in the magnetic particles 10, form a solid solution, the lattice constant of Fe varies with the amount of solid solution. In the case of bcc-Fe in which no solid solution is formed, the lattice constant is ideally approximately 2.86. However, when Fe and Al form a solid solution, the lattice constant increases, and a solid solution of about 5 atom % of Al increases the lattice constant by about 0.005 to 0.01. In a solid solution of about 10 atom % of Al, the lattice constant increases by about 0.01 to 0.02. As such, by performing an XRD measurement of the magnetic particles 10, the lattice constant of the magnetic metal can be determined, and based on the magnitude, it can be easily determined whether the metals have formed a solid solution, and to what extent the solid solution has been formed. Furthermore, whether a solid solution has been formed can be confirmed from a diffraction pattern of the particles by TEM or a high resolution TEM photograph. In addition, the crystal structure of the magnetic metal is slightly distorted when the particle size of the magnetic particles 10 decreases, and particularly when the particle size is in the nanometer order. Also, the crystal structure is also slightly distorted when a core-shell structure composed of a magnetic particle 10 and a coating layer is adopted. This is because when the size of the magnetic metal at the core decreases or a core-shell structure is adopted, strain occurs at the interface of the core and the shell. In regard to the lattice constant, it is necessary to comprehensively determine the value in consideration of such effects.

Figure 3:
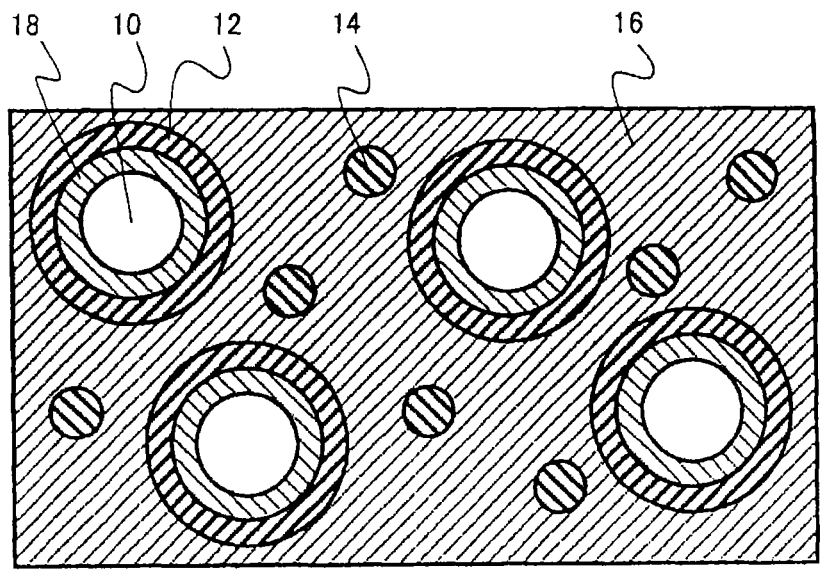
FIG. 3 is a schematic diagram of the magnetic material of a second modification of the first embodiment.

FIG. 3 is a schematic diagram of a second modification of the current embodiment. The magnetic material is the same as the magnetic material illustrated in FIG. 1, except that a second coating layer 18 of a third oxide which coats at least a portion of a magnetic particle 10 and contains at least one each of the magnetic metals and the non-magnetic metals contained in the magnetic particle 10 is included between the magnetic particle 10 and the coating layer 12.

As illustrated in FIG. 3, it is preferable that the magnetic particles 10 have at least a portion of the surfaces covered by a third oxide containing at least one each of the non-magnetic metals and the magnetic metals which are the constituent components of the magnetic particles 10. It is because when a portion of the surfaces of the magnetic particles 10 is covered by a third oxide, the aggregation of the magnetic particles 10 can be effectively suppressed.

At this time, when the third oxide contains at least one each of the non-magnetic metals and the magnetic metals which are the constituent components of the magnetic particles 10, the adhesiveness between the magnetic particle 10 and the second coating layer 18 can be strengthened. Thus, high strength, high thermal stability, and high oxidation resistance characteristics can be realized while the aggregation of the magnetic particles 10 is suppressed.

Meanwhile, at this time, it is preferable that the first oxide described above and the third oxide, and the second oxide described above and the third oxide be respectively a combination that does not have an eutectic point at or below 1000° C. Thereby, the aggregation of the magnetic particles is suppressed even in a high temperature environment, and the thermal stability can be enhanced. Furthermore, the proportion of the non-magnetic metal/magnetic metal contained in the third oxide is preferably larger than the proportion of the non-magnetic metal/magnetic metal contained in the magnetic particles 10. Thereby, the oxidation resistance and thermal stability of the magnetic particles 10 can be effectively increased by employing the third oxide.

Furthermore, the magnetic material of the current embodiment preferably contains intermediate particles. These intermediate particles are particles of an oxide, a nitride, a carbide or a fluoride, which contains at least one non-magnetic metal selected from Mg, Al, Si, Ca, Zr, Ti, Hf, Zn, Mn, rare earth elements, Ba, and Sr, and the particles preferably have a resistivity of 1 mΩ·cm or higher.

Furthermore, these intermediate particles may have the same composition as that of the third oxide, if the second coating layer 18 is provided. The intermediate particles have an average particle size of from 1 nm to 100 nm, and it is preferable that the average particle size of the intermediate particles be smaller than the average particle size of the magnetic particles 10. Such intermediate particles are preferable because the intermediate particles can further enhance the electrical insulation properties between the magnetic particles by existing between the magnetic particles, and also can enhance thermal stability of the magnetic particles.

The three components of the third oxide, the eutectic structure and the intermediate particles are desirably such that the total volume of the three components is from 10 vol % to 90 vol % relative to the volume of the entirety of the magnetic material. When the total volume is in such a range, the electrical insulation properties of the magnetic material are enhanced, the eddy current loss is effectively suppressed, and the high frequency magnetic properties can be enhanced. Furthermore, the thermal stability and oxidation resistance of the magnetic particles can also be effectively enhanced, and thus it is desirable.

Furthermore, the magnetic material of the current embodiment may include voids, but since voids decrease the volume fraction of the magnetic particles 10 and also deteriorate the strength, thermal stability, and oxidation resistance of the magnetic material. Thus, voids are not very preferable. Therefore, it is preferable that there be as few voids as possible.

In the current embodiment, it is preferable that the third oxide, the eutectic structure and the intermediate particles all have high electrical resistivity, and for example, they preferably have an electrical resistivity of 1 mΩ·cm or higher.

Thereby, the electrical resistivity of the magnetic material can be increased, and the eddy current loss can be effectively suppressed.

Furthermore, the second coating layer 18 of the third oxide is such that as the second coating layer is thicker, the electrical resistivity of the magnetic material increases, and the thermal stability and oxidation resistance of the magnetic particles are also enhanced. However, if the second coating layer 18 is made too thick, the volume fraction of the magnetic particles decreases, and saturation magnetization is also decreased, which is not preferable. Also, a thick second coating layer causes a decrease in the magnetic permeability, and it is not preferable. For this reason, it is more preferable that the second coating layer 18 have an average thickness of from 0.1 nm to 5 nm.

The composition analysis of the third oxide, the eutectic structure formed from the first oxide and the second oxide, and the intermediate particles can be easily carried out by techniques such as TEM-EDX, XPS, and SIMS, similarly to the analysis of the magnetic particles as described above. Particularly, when TEM-EDX is used, the composition of each of the structures can be easily checked by irradiating EDX to each structure by adjusting the beam, and determining the composition in a semi-quantitative manner. Also, the size or volume proportion of the first oxide, the second oxide, the eutectic structure and the intermediate particles can be determined by a TEM-EDX analysis or a SEM-EDX analysis, and the volume proportion can be simply calculated by making a TEM observation or a SEM observation, and performing an image analysis.

Examples of morphologies of the magnetic material of the current embodiment include a bulk form (a pellet shape, a ring shape, a rectangular shape, or the like), a film form including sheets, and a powder form.

By having configurations such as described above, the magnetic material of the current embodiment has a high real part of the magnetic permeability ($\mu'$) and a low imaginary part of the magnetic permeability ($\mu''$) in the MHz range of 100 kHz or higher, and can realize high strength, high saturation magnetization, high thermal stability and high oxidation resistance.

(Second Embodiment)

The magnetic material of the current embodiment includes magnetic particles containing at least one magnetic metal selected from the group including Fe, Co and Ni, and at least one non-magnetic metal selected from Mg, Al, Si, Ca, Zr, Ti, Hf, Zn, Mn, rare earth elements, Ba and Sr; a first coating layer of a first oxide that covers at least a portion of the magnetic particles; and oxide particles of a second oxide that are present between the magnetic particles and constitute an eutectic reaction system with the first oxide.

The second embodiment is the same as the first embodiment, except that an oxide phase containing an eutectic structure of the first oxide and the second oxide is not present. Therefore, further descriptions on the matters that overlap with the first embodiment will not be repeated.

Figure 4:
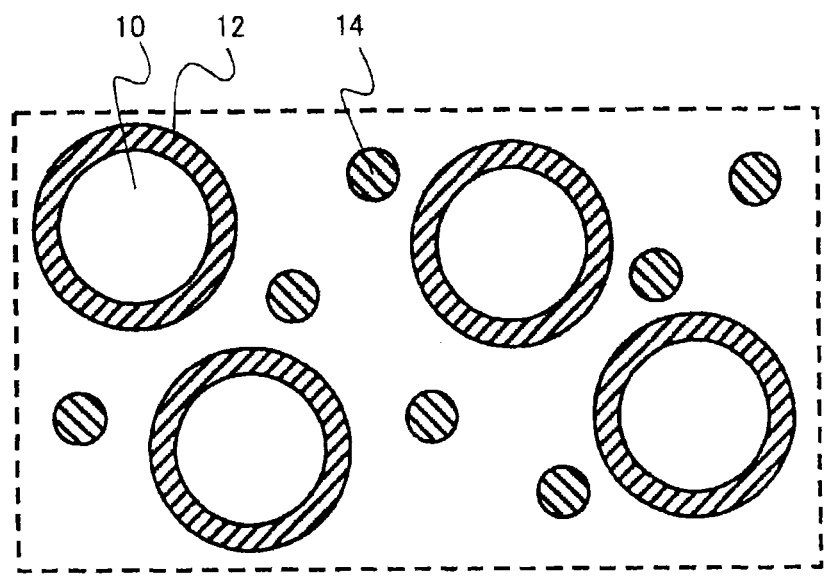
FIG. 4 is a schematic diagram of the magnetic material of a second embodiment.

FIG. 4 is a schematic diagram of the magnetic material of the current embodiment. The magnetic material of the current embodiment is composed of magnetic particles 10, a first coating layer 12 of a first oxide that cover these magnetic particles 10, and oxide particles 14 of a second oxide that are present between the magnetic particles 10.

The first oxide and the second oxide constitute an eutectic reaction system. That is, the first oxide and the second oxide produce eutectic crystals. The first oxide is, for example, an oxide of Si (silicon), and the second oxide is, for example, an oxide of B (boron).

The magnetic material of the current embodiment is a so-called precursor for producing the magnetic material of the first embodiment. When the magnetic material of the current embodiment is used, the magnetic material of the first embodiment can be easily produced.

Furthermore, the magnetic material of the current embodiment realizes high magnetic permeability, low loss, and high saturation magnetization in the MHz range of 100 kHz or higher, by having the configuration described above.

Meanwhile, the space between the magnetic particles 10 and the oxide particles 14 may be, for example, hollow, or may be filled with a resin or the like.

(Third Embodiment)

The method for producing a magnetic material of the current embodiment includes a step of synthesizing magnetic particles containing at least one magnetic metal selected from the group including Fe, Co and Ni, and at least one non-magnetic metal selected from Mg, Al, Si, Ca, Zr, Ti, Hf, Zn, Mn, rare earth elements, Ba and Sr; a step of forming a first coating layer of a first oxide that covers at least a portion of the magnetic particles; and a step of mixing oxide particles of a second oxide that constitutes an eutectic reaction system with the first oxide, with the magnetic particles.

The method for producing a magnetic material of the current embodiment is a method for producing the magnetic material of the second embodiment. Therefore, further descriptions on the matters that overlap with the second embodiment will not be repeated.

First, the production method includes a step of synthesizing magnetic particles containing at least one magnetic metal selected from the group including Fe, Co and Ni, and at least one non-magnetic metal selected from Mg, Al, Si, Ca, Zr, Ti, Hf, Zn, Mn, rare earth elements, Ba and Sr. At this time, the step of synthesizing magnetic particles is not particularly limited, and the synthesis is carried out by, for example, a water atomization method, a gas atomization method, a heat plasma method, a CVD method, a laser abrasion method, an in-liquid dispersion method, or the like.

Meanwhile, as disclosed in the first modification of the first embodiment, in the case of synthesizing particle aggregates including, as magnetic particles, metal nanoparticles that have an average particle size of from 1 nm to 20 nm and contain at least one magnetic metal selected from the group including Fe, Co and Ni; and an intermediate phase that is present between the metal nanoparticles, and contains a metal, a semiconductor, an oxide, a nitride, a carbide or a fluoride, which contains at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and at least one magnetic metal mentioned above, it is preferable to select a method such as described below.

That is, first, a magnetic metal powder having an average particle size of several micrometers and a non-magnetic metal powder, which are raw materials, are sprayed together with a carrier gas into a plasma generated in a chamber of a high frequency induction heat plasma apparatus. Thereby, magnetic metal nanoparticles having a size in the nanometer order can be synthesized.

At this time, metal nanoparticles having the surfaces coated with a non-magnetic metal oxide can be synthesized by appropriately controlling the synthesis conditions, and thus, it is preferable. That is, it is preferable because a two-phase separated structure of metals and oxides at a nanoscale level can be realized.

Thereafter, magnetic particles that are obtained by rapidly cooling the synthesis product are subjected to a composite integration treatment by using a high-power mill apparatus. Thereby, the particle aggregates described above can be obtained relatively easily.

The high-power mill apparatus is not limited in the selection of the type, as long as it is an apparatus capable of applying strong gravitational acceleration, but for example, a high-power planetary mill apparatus which is capable of applying a gravitational acceleration of several ten G's, or the like is preferred. If possible, it is preferable to apply a gravitational acceleration of 50 G or greater, and more preferably 100 G or greater.

Furthermore, when a high-power mill apparatus is used, it is preferable to perform the process in an inert gas atmosphere in order to suppress oxidation of the metal nanoparticles as much as possible. Also, if a powder is subjected to a composite integration treatment in a dry mode, the composite integration treatment can be easily carried out; however, the structure is likely to become coarse, and collection of the particles is difficult. In order to suppress coarsening of the structure, a wet type composite integration treatment using a liquid solvent is preferred. A more preferred method is to perform a treatment of suppressing the coarsening of the structure, while accelerating composite integration, by carrying out the treatment both in a dry mode and in a wet mode.

By using such a method, particle aggregates can be easily synthesized as magnetic particles. Depending on the synthesis conditions, shaping the particle aggregates into a flat shape with a large aspect ratio can be readily realized, and thus, it is preferable. When the particle aggregates are prepared into composite particles having a large aspect ratio, shape-induced magnetic anisotropy can be imparted, and as the directions of the axes of easy magnetization are aligned into one direction, the magnetic permeability and the high frequency properties of magnetic permeability can be enhanced, which is preferable. Meanwhile, even if the particles undergo slight oxidation, the particles can be reduced by subjecting the particles to a heat treatment in a reducing atmosphere.

Furthermore, as disclosed in the second modification of the first embodiment, when the magnetic particles are synthesized, it is preferable to synthesize magnetic particles in which at least a portion of the surface is covered with a third oxide. In this case, the method of forming a coating layer of the third oxide (second coating layer) is not particularly limited, but examples include methods based on liquid phase coating or partial oxidation.

A partial oxidation method is a method of synthesizing magnetic particles containing a magnetic metal and a non-magnetic metal, subsequently subjecting the magnetic particles to partial oxidation under appropriate oxidation conditions, and thereby precipitating an oxide containing the non-magnetic metal on the surface of the magnetic particles to form a coating layer. This technique is based on causing the precipitation of an oxide through diffusion, and when compared with a liquid phase coating method, the magnetic particles and the interface between the magnetic particles and the oxide coating layer strongly adhere to each other, so that the thermal stability and oxidation resistance of the magnetic particles are enhanced, which is preferable. There are no particular limitations on the conditions for partial oxidation, but it is preferable to oxidize the magnetic particles in an oxidative atmosphere of $O_2$, $CO_2$ or the like, at an adjusted oxygen concentration and at a temperature in the range of room temperature to 1,000° C.

Next, a coating layer of a first oxide (first coating layer) is formed on at least a portion of the surfaces of the magnetic particles thus synthesized. In the present step, there are no particular limitations on the technique of forming the first coating layer of the first oxide, but examples include a CVD method and an in-liquid sol-gel method in particular.

Next, the oxide particles of the second oxide that constitutes an eutectic reaction system with the first oxide are mixed with the magnetic particles. The present step is a step of mixing two kinds of particles, and as long as uniform mixing can be achieved, the method of mixing is not particularly limited. For example, mixing can be achieved by using a rotary ball mill, a vibratory ball mill, a stirring ball mill, a planetary mill, a jet mill, and mortar mixing. In all cases, it is desirable that the magnetic particles including the first coating layer of the first oxide and the oxide particles of the second oxide be uniformly mixed.

Meanwhile, after each process, it is desirable to control the various process conditions, so as to prevent the magnetic particles from being oxidized, and to prevent a reduction in the saturation magnetization. Depending on the cases, magnetic particles that have undergone oxidation and a reduction in the saturation magnetization may be reduced, and the saturation magnetization may be restored, after each process. In regard to the conditions for reducing, it is preferable to subject the magnetic particles to a heat treatment at a temperature in the range of 100° C. to 1,000° C. in a reducing atmosphere of $H_2$, CO, $CH_4$ or the like. At this time, it is preferable to select conditions in which aggregation and necking of the magnetic particles can hardly occur.

Examples of morphologies of the magnetic material include a bulk form (a pellet shape, a ring shape, a rectangular shape, or the like), a film form including sheets, and a powder. There are no particular limitations on the technique of making the magnetic material in a bulk form, but uniaxial press molding, hot press molding, cold isostatic pressing (CIP), hot isostatic pressing (HIP), spark plasma sintering (SPS), and the like may be used. Particularly, in the case of molding while heating, such as in the case of hot press molding, HIP, and SPS, it is preferable to carry out the process in an atmosphere at a low oxygen concentration. A vacuum atmosphere, or a reducing atmosphere of $H_2$, CO, $CH_4$ or the like is preferred. This is to prevent the magnetic particles from being oxidized and deteriorating during the molding under heating.

Furthermore, there are no particular limitations on the method of producing a sheet, but for example, a sheet can be produced by mixing the mixed particles of magnetic particles and oxide particles thus synthesized, with a resin and a solvent to prepare a slurry, and applying and drying the slurry. Furthermore, a mixture of the mixed particles and a resin may also be pressed to be molded into a sheet form or a pellet form.

Furthermore, the mixed particles may also be dispersed in a solvent and deposited by an electrophoresis method or the like. When produced into a sheet, it is desirable to orient the mixed particles into one direction, that is, a direction in which the easy axes of individual magnetic particles are gathered. It is preferable because thereby, the magnetic permeability and the high frequency properties of magnetic permeability of the magnetic material sheet in which the magnetic particles have been assembled can be enhanced. Examples of techniques for orienting the particles include application and drying of the dispersion in a magnetic field, but there are no particular limitations on the technique.

A magnetic sheet may be formed into a laminate structure. When the sheet is formed into a laminate structure, the sheet can be easily thickened, and also, the high-frequency magnetic properties can be enhanced by alternately laminating the magnetic sheet with a non-magnetic insulating layer. That is, when a magnetic layer containing magnetic particles is formed into a sheet form having a thickness of 100 μm or less, this sheet-like magnetic layer is alternately laminated with a non-magnetic insulating oxide layer having a thickness of 100 μm or less to obtain a laminate structure, the high-frequency magnetic properties are enhanced. That is, by adjusting the thickness of a single magnetic layer to 100 μm or less, the effect of a demagnetizing field can be reduced when a high-frequency magnetic field is applied in the in-plane direction, so that not only the magnetic permeability can be increased, but also the high frequency properties of magnetic permeability are enhanced. There are no particular limitations on the method of lamination, but lamination can be carried out by stacking plural sheets of magnetic sheets, and pressing the sheets by a pressing method or the like, or heating and sintering the sheets.

The magnetic material produced by a production method such as described above has a high real part of magnetic permeability ($\mu'$) and a low imaginary part of magnetic permeability ($\mu''$) in the MHz range of 100 kHz or higher, and also has high strength, high saturation magnetization, high thermal stability, and high oxidation resistance. Furthermore, the magnetic material can also be used as a precursor for producing a magnetic material having such properties.

(Fourth Embodiment)

The method for producing a magnetic material of the current embodiment includes a step of synthesizing magnetic particles containing at least one magnetic metal selected from the group including Fe, Co and Ni, and at least one non-magnetic metal selected from Mg, Al, Si, Ca, Zr, Ti, Hf, Zn, Mn, rare earth elements, Ba and Sr; a step of forming a first coating layer of a first oxide that covers at least a portion of the magnetic particles; a step of mixing oxide particles of a second oxide that constitutes an eutectic reaction system with the first oxide, with the magnetic particles; and a step of subjecting the first coating layer and the oxide particles to eutectic melting and solidification by a heat treatment at or below 1,000° C. and cooling.

The method for producing a magnetic material of the current embodiment is a method for producing the magnetic material of the third embodiment. Therefore, further descriptions on the matters that overlap with the third embodiment will not be repeated. Furthermore, the production method is the same as the method for producing a magnetic material as described in the third embodiment, except that a step of subjecting the first coating layer and the oxide particles to eutectic melting and solidification by a heat treatment at or below 1,000° C. and cooling is included. Therefore, further descriptions on the matters that overlap with the third embodiment will not be repeated.

In the method for producing a magnetic material of the current embodiment includes a step of subjecting the mixed particles of magnetic particles having a first coating layer of a first oxide and oxide particles of a second oxide as produced in the third embodiment, to a heat treatment at a temperature of 1,000° C. or lower and cooling, to thereby subjecting the first coating layer and the oxide particles to eutectic melting and solidification. At this time, the heat treatment conditions are selected such that a portion of the first coating layer and a portion of the oxide particles remain unreacted.

The atmosphere for the heat treatment is preferably a vacuum atmosphere, or a reducing atmosphere of $H_2$, CO, $CH_4$ or the like. This is to prevent the magnetic particles from being oxidized and deteriorating during the molding under heating. Furthermore, in order to suppress aggregation and necking of the magnetic particles as much as possible, a lower heat treatment temperature is preferred. It is preferable to melt the magnetic particles at a temperature near the eutectic point of the first oxide and the second oxide. Therefore, it is preferable to select a combination of compositions having a low eutectic point of the first oxide and the second oxide.

The magnetic material produced by the production method such as described above has a high real part of magnetic permeability ($\mu'$) and a low imaginary part of magnetic permeability ($\mu''$) in the MHz range of 100 kHz or higher, and has high strength, high saturation magnetization, high thermal stability, and high oxidation resistance.

(Fifth Embodiment)

The magnetic material of the current embodiment includes magnetic particles which contain at least one magnetic metal selected from the group including Fe, Co and Ni, and at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and are particle aggregates having plural metal nanoparticles that have an average particle size of from 1 nm to 20 nm and contain at least one magnetic metal selected from the group including Fe, Co and Ni, and having a morphology with an average short dimension of from 10 nm to 2 µm and an average aspect ratio of 5 or greater; and an oxide phase that is present between the magnetic particles and has an eutectic structure of a first oxide and a second oxide that constitute an eutectic reaction system.

The current embodiment is the same as the first modification of the first embodiment, except that the magnetic material does not have the first coating layer 12 and the oxide particles 14 illustrated in FIG. 2. Therefore, further descriptions on any overlapping matters will not be repeated here.

Figure 5:
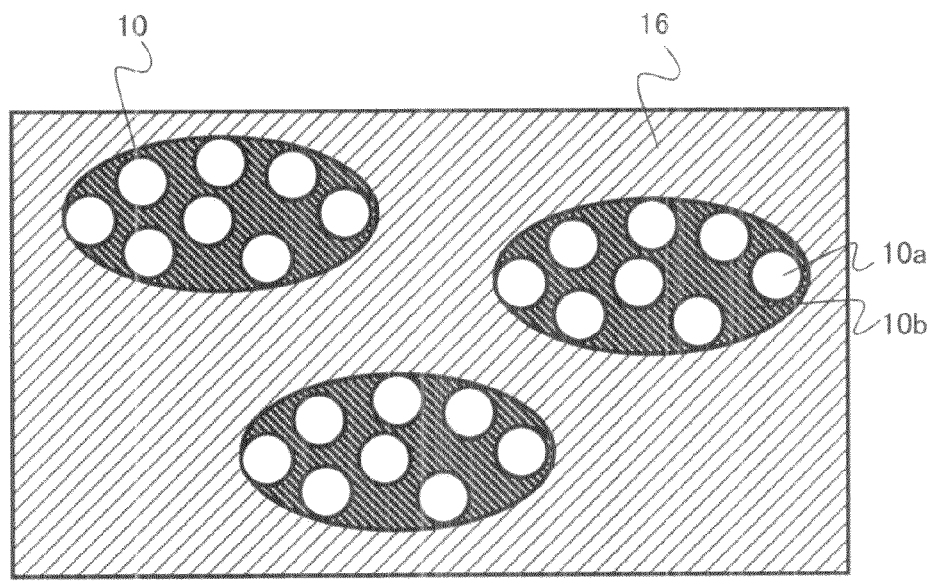
FIG. 5 is a schematic diagram of the magnetic material of a fifth embodiment.

FIG. 5 is a schematic diagram of the magnetic material of the current embodiment. The magnetic particles 10 includes an intermediate phase 10b that is present between metal nanoparticles 10a, and contains at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and any one of oxygen (O), nitrogen (N) and carbon (C). The intermediate phase 10b may also contain fluorine (F). The intermediate phase 10b is, for example, a metal, a semiconductor, an oxide, a nitride, a carbide, or a fluoride. Furthermore, the intermediate phase 10b has higher resistance than the magnetic particles 10.

The magnetic particles 10 are particle aggregates of the metal nanoparticles 10a having a morphology with an average short dimension of from 10 nm to 100 nm and an average aspect ratio of 10 or greater, and the intermediate phase 10b, and the volume filling ratio of the metal nanoparticles 10a is from 40 vol % to 80 vol % relative to the total volume of the particle aggregates. Such particle aggregates are also referred to as nanogranular type magnetic particles.

The magnetic material of FIG. 5 has a structure in which the intermediate phase 10b fills in between the metal nanoparticles 10a.

The magnetic material of the current embodiment realizes high magnetic permeability and low loss in the MHz range of 100 kHz or higher, by having the configuration described above. Furthermore, the magnetic material can also realize high saturation magnetization, high thermal stability, and high oxidation resistance.

(Sixth Embodiment)

The magnetic material of the current embodiment includes magnetic particles containing at least one magnetic metal selected from the group including Fe, Co and Ni, and at least one non-magnetic metal selected from Mg, Al, Si, Ca, Zr, Ti, Hf, Zn, Mn, rare earth elements, Ba and Sr; a second coating layer of a third oxide that covers at least a portion of the magnetic particles, and contains at least one each of the magnetic metals described above and the non-magnetic metals described above; and an oxide phase that is present between the magnetic particles, and has an eutectic structure of the first oxide and the second oxide constituting an eutectic reaction system.

The current embodiment is the same as the second modification of the first embodiment, except that the magnetic material does not have the first coating layer 12 and the oxide particles 14 illustrated in FIG. 3. Therefore, further descriptions on any overlapping matters will not be repeated here.

Figure 6:
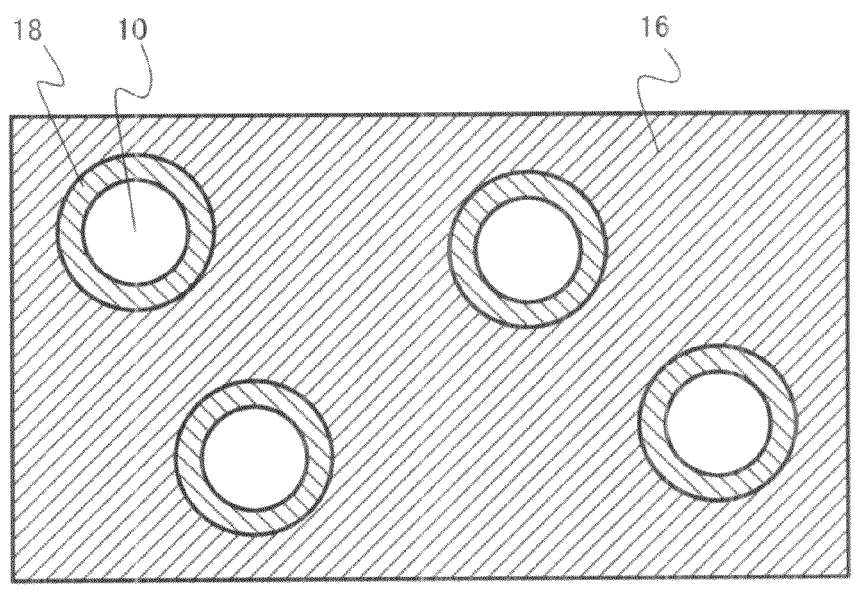
FIG. 6 is a schematic diagram of the magnetic material of a sixth embodiment.

FIG. 6 is a schematic diagram of the magnetic material of the current embodiment. The magnetic material includes magnetic particles 10 containing at least one magnetic metal selected from the group including Fe, Co and Ni, and at least one non-magnetic metal selected from Mg, Al, Si, Ca, Zr, Ti, Hf, Zn, Mn, rare earth elements, Ba and Sr; a second coating layer 18 of a third oxide that covers at least a portion of the magnetic particles 10, and contains at least one each of the magnetic metals described above and the non-magnetic metals described above; and an oxide phase 16 that is present between the magnetic particles 10, and has an eutectic structure of the first oxide and the second oxide constituting an eutectic reaction system.

The magnetic material of the current embodiment realizes high magnetic permeability and low loss in the MHz range of 100 kHz or higher, by having the configuration described above. Furthermore, the magnetic material can also realize high saturation magnetization, high thermal stability, and high oxidation resistance.

(Seventh Embodiment)

The magnetic material of the current embodiment includes magnetic particles which are particle aggregates containing metal nanoparticles that have an average particle size of from 1 nm to 10 nm, contain at least one magnetic metal selected from the group including Fe, Co and Ni, and also containing an intermediate phase of a metal, a semiconductor, an oxide, a nitride, a carbide or a fluoride, which is present between the metal nanoparticles and contains at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements and at least one magnetic metal described above, and have a morphology with an average short dimension of from 10 nm to 100 nm and an average aspect ratio of 10 or greater, in which the volume filling ratio of the metal nanoparticles is from 40 vol % to 80 vol % relative to the total volume of the particle aggregates.

In the magnetic material of the current embodiment, the average interparticle distance between the metal nanoparticles is more preferably from 0.1 nm to 5 nm.

Figure 7:
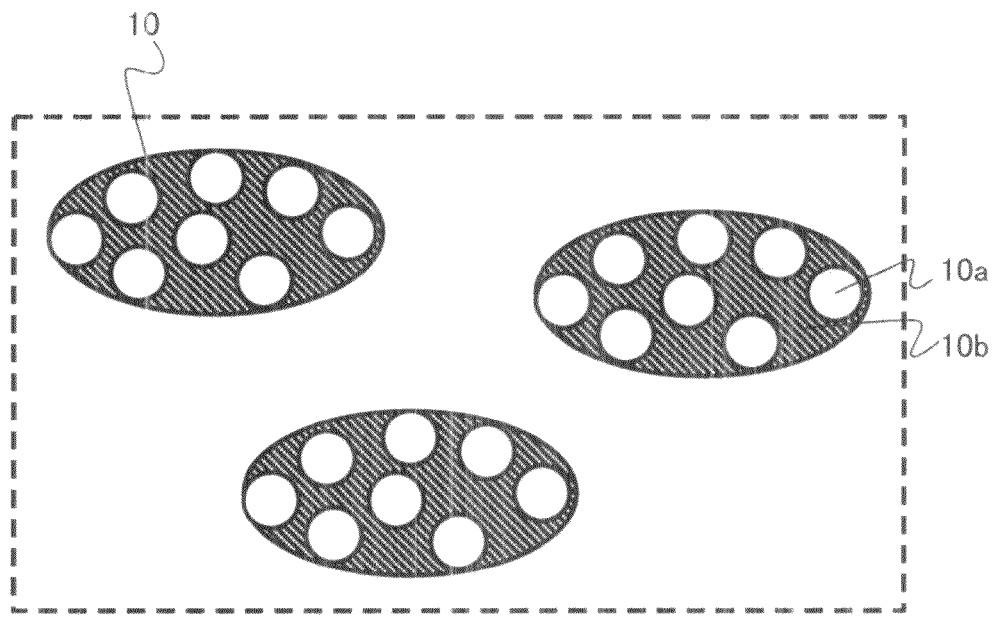
FIG. 7 is a schematic diagram of the magnetic material of a seventh embodiment.

FIG. 7 is a schematic diagram of the magnetic material of the current embodiment. The magnetic material of the current embodiment includes plural magnetic particles 10. The magnetic particle 10 includes metal nanoparticles 10a and an intermediate phase 10b. The metal nanoparticles 10a has an average particle size of from 1 nm to 20 nm, and more preferably of from 1 nm to 10 nm. The metal nanoparticles 10a contain at least one magnetic metal selected from the group including Fe, Co and Ni. The intermediate phase 10b that is present between the metal nanoparticles 10a, contains at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and any one of oxygen (O), nitrogen (N) and carbon (C). The intermediate phase 10b may also contain fluorine (F). The intermediate phase 10b is, for example, a metal, a semiconductor, an oxide, a nitride, a carbide, or a fluoride. Furthermore, the intermediate phase 10b has higher electrical resistivity than the magnetic particles 10.

Furthermore, the magnetic particles 10 are particle aggregates of the metal nanoparticles 10a having a morphology with an average short dimension of from 10 nm to 2 μm (more preferably from 10 nm to 100 nm) and an average aspect ratio of 5 or greater (more preferably of from 10 or greater), and the intermediate phase 10b, and the volume filling ratio of the metal nanoparticles 10a is from 40 vol % to 80 vol % relative to the total volume of the particle aggregates. Such particle aggregates are also referred to as nanogranular type magnetic particles.

The magnetic material of FIG. 7 has a structure in which the intermediate phase 10b fills in between the metal nanoparticles 10a.

In such particle aggregates, the metal nanoparticles 10a are likely to be magnetically bound to each other, and behave as one aggregate magnetically. On the other hand, since the intermediate phase 10b having high electrical resistivity, for example, an oxide, is present between the metal nanoparticles 10a, the electrical resistivity of the magnetic particles 10 can be made large. Therefore, the eddy current loss can be suppressed while high magnetic permeability is maintained, and thus it is preferable.

The metal nanoparticles 10a have an average particle size of from 1 nm to 20 nm, and more preferably of from 1 nm to 10 nm. If the average particle size is less than 1 nm, superparamagnetism occurs, and there is a risk that the amount of magnetic flux may decrease. On the other hand, if the average particle size is larger than 10 nm, magnetic bindability is weakened, and it is not preferable. A preferred range of particle size in order to enhance the magnetic interaction between the particles while maintaining a sufficient amount of magnetic flux is from 1 nm to 20 nm, and more preferably of from 1 nm to 10 nm.

The metal nanoparticles 10a may be polycrystalline or may be single crystal, but a single crystal is preferred. In the case of metal nanoparticles of single crystal, it is easy to align the axes of easy magnetization, and magnetic anisotropy can be controlled. For this reason, the high frequency properties can be enhanced as compared with the case of polycrystalline magnetic metal nanoparticles.

Furthermore, the metal nanoparticles 10a may be spherical in shape, but a flat shape or a rod shape, both of which have large aspect ratios, may also be used. Particularly, the average of the aspect ratio is desirably 2 or greater, and more preferably 5 or greater.

In the case of metal nanoparticles 10a having a large aspect ratio, it is more preferable to coincide the long-side direction of individual metal nanoparticles 10a (in the case of a plate shape, the width direction; in the case of an oblate ellipsoid, the diameter direction; in the case of a rod shape, the rod length direction, and in the case of an ellipsoid of revolution, the major axis direction) with the long-side direction of the magnetic particles (particle aggregates) 10 (in the case of a plate shape, the width direction; in the case of an oblate ellipsoid, the diameter direction; in the case of a rod shape, the rod length direction, and in the case of an ellipsoid of revolution, the major axis direction). Thereby, the directions of the axes of easy magnetization can be aligned into one direction, and the magnetic permeability and the high frequency properties of magnetic permeability can be enhanced.

The metal nanoparticles 10a contain at least one magnetic metal selected from the group including Fe (iron), Co (cobalt) and Ni (nickel). The metal nanoparticles 10a preferably contain at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. These non-magnetic metals can enhance the resistance of the metal nanoparticles 10a, and can enhance thermal stability and oxidation resistance, which is preferable. Among them, Al and Si are preferred because these elements can easily form solid solutions with Fe, Co and Ni, which are the main components of the metal nanoparticles 10a, and contribute to an enhancement of the thermal stability of the metal nanoparticles 10a.

The metal nanoparticles 10a is formed from, for example, an alloy containing Fe, Co or Al (aluminum), or an alloy containing Fe, Ni or Si (silicon).

The magnetic metal contained in the metal nanoparticles 10a includes at least one selected from the group including Fe, Co and Ni, and particularly, a Fe-based alloy, a Co-based alloy, a FeCo-based alloy, and a FeNi-based alloy are preferred because these alloys can realize high saturation magnetization. Fe-based alloys contain Ni, Mn, Cu and the like as a second component, and examples thereof include FeNi alloys, FeMn alloys, and FeCu alloys. Co-based alloys contain Ni, Mn, Cu and the like as a second component, and examples thereof include CoNi alloys, CoMn alloys, and CoCu alloys. FeCo-based alloys include alloys containing Ni, Mn, Cu and the like as a second component.

These second components are components that are effective for enhancing the high-frequency magnetic properties of the metal nanoparticles 10a. Since FeNi-based alloys have small magnetic anisotropy, these are materials advantageous for obtaining high magnetic permeability. Particularly, a FeNi alloy having Fe in a proportion of from 40 atom % to 60 atom % has high saturation magnetization and has low magnetic anisotropy, and therefore, this alloy is preferred.

Among the magnetic metals, it is particularly preferable to use a FeCo-based alloy. The amount of Co in FeCo is preferably adjusted to from 10 atom % to 50 atom %, from the viewpoint of satisfying thermal stability, oxidation resistance, and a saturation magnetization of 2 teslas or greater. A more preferred amount of Co in FeCo is in the range of from 20 atom % to 40 atom %, from the viewpoint of further increasing the saturation magnetization.

In regard to the amount of the non-magnetic metal, it is preferable that the metal nanoparticles contain the non-magnetic metal in an amount of from 0.001 atom % to 20 atom % relative to the amount of the magnetic metal. If the content of the non-magnetic metal exceeds 20 atom %, there is a risk that the saturation magnetization of the magnetic metal nanoparticles may be decreased. As a more preferred amount from the viewpoints of high saturation magnetization and solid solubility, it is preferable to incorporate the non-magnetic metal in an amount in the range of from 0.001 atom % to 5 atom %, and more preferably from 0.01 atom % to 5 atom %.

As the crystal structure of the metal nanoparticles 10a, a body-centered cubic lattice structure (bcc), a face-centered cubic lattice structure (fcc), and a hexagonal close-packed structure (hcp) can be considered, and each of them has unique features. The bcc structure is advantageous in that since a composition having a large proportion of a Fe-based alloy has the bcc structure, the bcc structure can be easily synthesized in a wide variety. The fcc structure is advantageous in that since the diffusion coefficient of the magnetic metal can be made smaller as compared to that of the bcc structure, thermal stability or oxidation resistance can be made relatively larger.

The hcp structure (hexagonal structure) is advantageous in that the magnetic characteristics of the magnetic material can be made to exhibit in-plane uniaxial anisotropy. Since a magnetic metal having the hcp structure generally has high magnetic anisotropy, it is easy to orient the magnetic metal, and the magnetic permeability can be made large. Particularly, Co-based alloys easily acquire the hcp structure and are preferred. In the case of a Co-based alloy, since the alloy can stabilize the hcp structure by containing Cr or Al, it is preferable.

Meanwhile, in a magnetic material having in-plane uniaxial anisotropy, the anisotropic magnetic field in an easy magnetization face is preferably from 1 Oe to 500 Oe, and more preferably from 10 Oe to 500 Oe. This is a preferred range to maintain low loss and high magnetic permeability in the MHz range of 100 kHz or higher. If anisotropy is too low, the ferromagnetic resonance frequency occurs at a low frequency, and a large loss occurs in the MHz range, which is not preferable.

On the other hand, if anisotropy is high, the ferromagnetic resonance frequency is high, and a low loss can be realized. However, the magnetic permeability becomes small, and it is not preferable. The range of an anisotropic magnetic field which can achieve a balance between high magnetic permeability and low loss is from 1 Oe to 500 Oe, and more preferably from 10 Oe to 500 Oe.

Meanwhile, in order to induce in-plane uniaxial anisotropy in a magnetic material, there are available a method of orienting magnetic particles having the hcp structure, as well as a method of inducing magnetic anisotropy in any one direction in the plane by means of a magnetic field or strain, by making the crystallinity of the metal nanoparticles 10a as amorphous as possible. For this reason, it is preferable to employ a composition which can make the magnetic particles amorphous as easily as possible.

From such a viewpoint, it is preferable that the magnetic metal contained in the metal nanoparticles 10a include at least one additive metal selected from B, Si, C, Ti, Zr, Hf, Nb, Ta, Mo, Cr, Cu and W, which are different from the non-magnetic metal, altogether in an amount of from 0.001 atom % to 25 atom % relative to the total amount of the magnetic metal, non-magnetic metal and additive metal, and that at least two of the magnetic metal, the non-magnetic metal, and the additive metal form a solid solution with each other.

At least a portion of the surface of the metal nanoparticles 10a may be covered with a coating layer. The coating layer is preferably an oxide, a composite oxide, a nitride, a carbide or a fluoride, which contains at least one magnetic metal which is a constituent component of the metal nanoparticles 10a. When the coating layer contains at least one magnetic metal which is a constituent component of the metal nanoparticles 10a, the adhesiveness between the metal nanoparticles 10a and the coating layer is enhanced, and thermal stability and oxidation resistance are enhanced.

Furthermore, the coating layer is more preferably an oxide, a composite oxide, a nitride, a carbide or a fluoride, which contains at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. When the metal nanoparticles 10a contain at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, the coating layer is more preferably composed of an oxide, a composite oxide, a nitride, a carbide or a fluoride, which contains at least one of the same non-magnetic metals as the non-magnetic metals which is one constituent component of the metal nanoparticles 10a. Thereby, the adhesiveness between the metal nanoparticles 10a and the coating layer can be enhanced, and further, the thermal stability and oxidation resistance of the magnetic material can be enhanced.

Meanwhile, in the constitution of the coating layer such as described above, among an oxide, a composite oxide, a nitride, a carbide and a fluoride, particularly an oxide and a composite oxide are more preferred. This is based on the viewpoints of the ease of formation of the coating layer, oxidation resistance, and thermal stability.

Furthermore, the oxide or composite oxide coating layer is an oxide or composite oxide containing at least one magnetic metal, which is a constituent component of the metal nanoparticles 10a, and is more preferably an oxide or composite oxide containing at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements.

This non-magnetic metal is an element which has small standard Gibbs energy of formation of the oxide and is easily oxidized, and the non-magnetic metal can easily form a stable oxide. The oxide coating layer that is formed from an oxide or composite oxide containing at least one or more of these non-magnetic metals can have enhanced adhesiveness and bindability to the metal nanoparticles 10a, and can also enhance the thermal stability and oxidation resistance of the metal nanoparticles 10a.

Among the non-magnetic metals, Al and Si are preferred because these elements can easily form solid solutions with Fe, Co and Ni, which are main components of the magnetic metal particles, and contribute to an enhancement of the thermal stability of the metal nanoparticles 10a. A composite oxide containing plural kinds of non-magnetic metals also encompasses a solid solution form. The coating layer that covers at least a portion of the surfaces of the metal nanoparticles 10a not only enhances oxidation resistance of the metal nanoparticles 10a in the interior, but also can enhance the electrical resistivity of the composite magnetic particles. By increasing the electrical resistivity, the eddy current loss at high frequencies can be suppressed, and the high frequency properties of magnetic permeability can be enhanced. For this reason, the coating layer preferably has high electrical resistivity, and for example, it is preferable that the coating layer have a resistance value of 1 mΩ·cm or higher.

As the coating layer is thicker, the electrical resistivity of the magnetic particles 10 increases, and the thermal stability and oxidation resistance of the metal nanoparticles 10a are also increased. However, if the coating layer is made too thick, the magnetic interaction between the metal nanoparticles 10a is easily broken, and individual metal nanoparticles 10a are likely to behave magnetically independently. This is not preferable from the viewpoints of the magnetic permeability and the high frequency properties of magnetic permeability. Furthermore, when the coating layer is thickened, the proportion of the magnetic components contained in the magnetic particles 10 decreases. Accordingly, the saturation magnetization of the magnetic particles 10 is lowered, and the magnetic permeability is decreased, which is not preferable. In order for the coating layer to have appropriately large electrical resistivity, to have individual metal nanoparticles 10a magnetically interacted, and to increase the saturation magnetization of the magnetic particles 10, it is more preferable that the coating layer have an average thickness of from 0.1 nm to 5 nm.

Furthermore, the intermediate phase 10b that is present between the metal nanoparticles 10a and contains at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and any one of oxygen (O), nitrogen (N) and carbon (C), preferably has an electrical resistivity of 1 mΩ·cm or higher.

These non-magnetic metals are preferably elements which have small standard Gibbs energy of formation of the oxide and are easily oxidized, and are preferably metals that can easily form stable oxides. When a metal, a semiconductor, an oxide, a nitride, a carbide or a fluoride, which contains such a non-magnetic metal, is present between the metal nanoparticles 10a, it is preferable because the electrical insulation properties between the metal nanoparticles 10a can be further enhanced, and the thermal stability of the metal nanoparticles can be enhanced.

Furthermore, it is preferable that the intermediate phase 10b of a metal, a semiconductor, an oxide, a nitride, a carbide or a fluoride contain at least one of the magnetic metals described above. When the metal, semiconductor, oxide, nitride, carbide or fluoride contains at least one of the same metals as the magnetic metals contained in the metal nanoparticles 10a, the thermal stability and oxidation resistance are enhanced. Furthermore, when a ferromagnetic component is present between the metal nanoparticles 10a, the magnetic interaction between the magnetic metal nanoparticles is strengthened. For this reason, the metal nanoparticles 10a and the intermediate phase 10b can behave as an aggregate magnetically, and the magnetic permeability and the high frequency properties of magnetic permeability can be enhanced.

Furthermore, similarly, when the intermediate phase 10b of a metal, a semiconductor, an oxide, a nitride, a carbide or a fluoride contains at least one of the same non-magnetic metals as the non-magnetic metals contained in the metal nanoparticles 10a, thermal stability and oxidation resistance are enhanced. Therefore, it is preferable.

Meanwhile, when the intermediate phase contains at least one each of the magnetic metals and the non-magnetic metals that are contained in the metal nanoparticles, it is preferable that the atomic ratio of non-magnetic metal/magnetic metal in the intermediate phase be larger than the atomic ratio of non-magnetic metal/magnetic metal contained in the metal nanoparticles. This is because the metal nanoparticles can be blocked by an "intermediate phase having a large ratio of non-magnetic metal/magnetic metal," which has high oxidation resistance and thermal stability, and the oxidation resistance and thermal stability of the metal nanoparticles can be effectively increased. Furthermore, it is preferable that the content of oxygen contained in the intermediate phase be larger than the content of oxygen of the metal nanoparticles. This is because the metal nanoparticles can be blocked by an "intermediate phase having a high oxygen concentration and having high oxidation resistance and thermal stability," and the oxidation resistance and thermal stability of the metal nanoparticles can be effectively increased.

Among a metal, a semiconductor, an oxide, a nitride, a carbide and a fluoride, an oxide is more preferred from the viewpoint of thermal stability.

Figure 8:
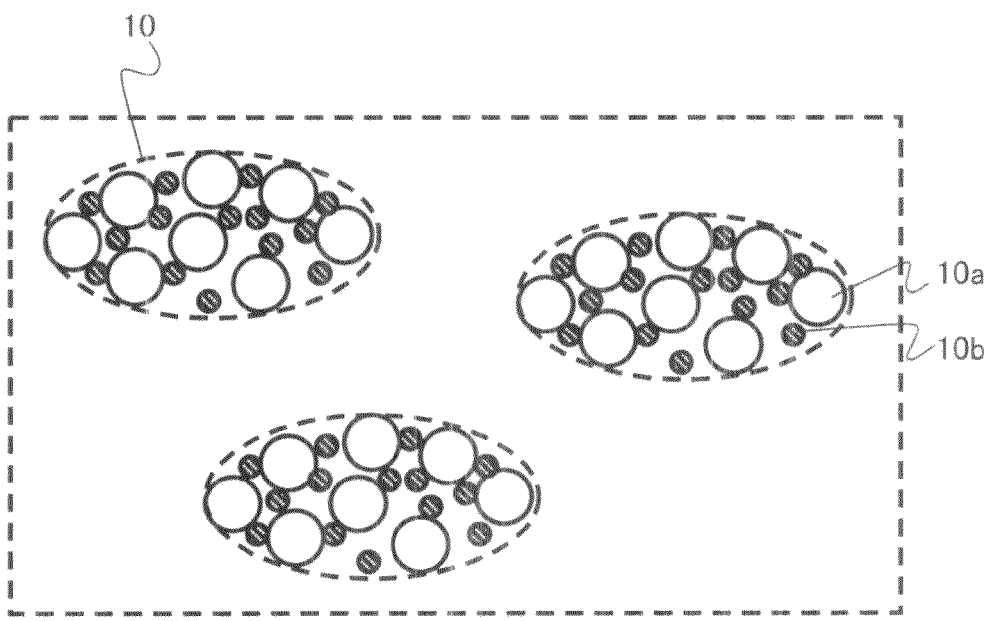
FIG. 8 is a schematic diagram of the magnetic material of a first modification of the seventh embodiment.

FIG. 8 is a schematic diagram of the magnetic material of a first modification of the current embodiment. The intermediate phase 10b of a metal, an oxide, a nitride, a carbide or a fluoride may be in the form of particles, as illustrated in FIG. 8.

According to the current modification, the material surrounding the magnetic particles 10 is not particularly limited, and the material may be, for example, air, an oxide or a resin. Also, in the current modification, the space between the metal nanoparticles 10a and the intermediate phase 10b of the particles is filled with the same material as the material surrounding the magnetic particles 10.

Figure 9:
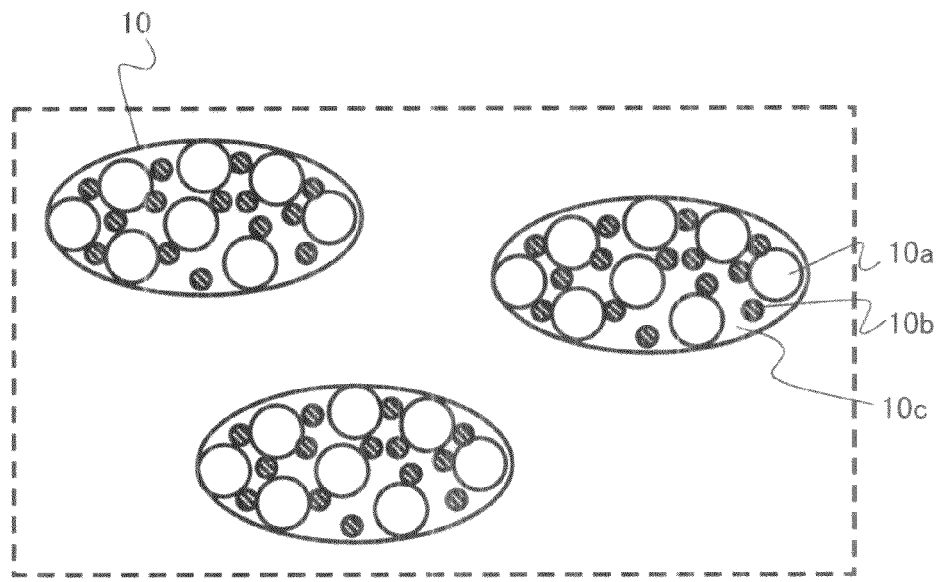
FIG. 9 is a schematic diagram of the magnetic material of a second modification of the seventh embodiment.

FIG. 9 is a schematic diagram of the magnetic material of a second modification of the current embodiment. In the current modification, the space between the metal nanoparticles 10a and the intermediate phase 10b of the particles is filled with another intermediate phase 10c of a material that is different from any of the intermediate phase 10b and the material surrounding the magnetic particles 10. The combination of the material of the intermediate phase 10c and the material surrounding the magnetic particles 10 is not particularly limited.

The intermediate phase 10b that is in the form of particles is preferably such that the particles have a smaller particle size than the particle size of the metal nanoparticles 10a. At this time, the particles may be oxide particles, may be nitride particles, may be carbide particles, or may be fluoride particles. However, from the viewpoint of thermal stability, the particles are more preferably oxide particles. In the following descriptions, the case in which the intermediate phase 10b is oxide particles will be taken as an example in all cases.

Meanwhile, a more preferred state of existence of the oxide particles is a state in which the oxide particles are uniformly and homogeneously dispersed between the metal nanoparticles 10a. Thereby, more uniform magnetic characteristics and dielectric characteristics can be expected. These oxide particles not only enhance the oxidation resistance and the suppression of the aggregation of the metal nanoparticles 10a, that is, the thermal stability of the metal nanoparticles 10a, but also electrically separate the metal nanoparticles 10a, so that the electrical resistivity of the magnetic particles 10 and the magnetic material can be increased. When the electrical resistivity of the magnetic material is increased, the eddy current loss at high frequencies can be suppressed, and the high frequency properties of magnetic permeability can be enhanced. For this reason, the oxide particles preferably have high electrical resistivity, and for example, it is preferable that the oxide particles have an electrical resistivity of 1 mΩ·cm or higher.

The oxide particles contain at least one non-magnetic metal selected from the group including Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. These non-magnetic metals are elements which have small standard Gibbs energy of formation of the oxide and are easily oxidized, and the non-magnetic metals can easily form stable oxides.

Further, the when the metal nanoparticles 10a include a coating layer, it is preferable that the ratio of non-magnetic metal/magnetic metal (atomic ratio) in these oxide particles be larger than the ratio of non-magnetic metal/magnetic metal (atomic ratio) in the coating layer that covers the metal nanoparticles 10a. As such, since the proportion of the non-magnetic metal is large, the oxide particles are more thermally stable than the coating layer.

For this reason, when such oxide particles are present in at least some part between the metal nanoparticles 10a, the electrical insulation properties between the metal nanoparticles 10a can be further enhanced, and the thermal stability of the magnetic metal nanoparticles can be enhanced.

Meanwhile, the oxide particles may not contain a magnetic metal, but more preferably, the oxide particles contain a magnetic metal. A preferred amount of the magnetic metal to be included is 0.001 atom % or more, and more preferably 0.01 atom % or more, relative to the amount of the non-magnetic metal. This is because if the oxide particles do not contain any magnetic metal at all, the constituent components of the coating layer that covers the surfaces of the metal nanoparticles 10a and the oxide particles completely differ from each other, and it is not much preferable from the viewpoints of adhesiveness and strength. Furthermore, there is also a possibility that thermal stability may rather deteriorate. Furthermore, if the oxide particles that are present between the metal nanoparticles do not contain the magnetic metal at all, it is difficult for the metal nanoparticles to magnetically interact with each other, and it is not preferable from the viewpoints of the magnetic permeability and the high frequency properties of magnetic permeability.

Therefore, the oxide particles are more preferably a constituent component of the metal nanoparticles 10a, and preferably contain at least one magnetic metal, which is a constituent component of the oxide coating layer. More preferably, it is preferable that the ratio of non-magnetic metal/magnetic metal (atomic ratio) in the oxide particles be larger than the ratio of non-magnetic metal/magnetic metal (atomic ratio) in the oxide coating layer.

Meanwhile, the oxide particles are more preferably oxide particles which contain a non-magnetic metal that is of the same type as the non-magnetic metal contained in the metal nanoparticles 10a, and of the same type as the non-magnetic metal contained in the oxide coating layer. It is because when the oxide particles are oxide particles containing a non-magnetic metal of the same type, the thermal stability and oxidation resistance of the magnetic metal nanoparticles are further enhanced.

Meanwhile, the thermal stability enhancing effect, the electrical insulation effect, and the adhesiveness and strength enhancing effect of the oxide particles as described above are exhibited particularly when the average particle size of the metal nanoparticles 10a is small, and it is particularly effective when the particle size of the oxide particles is smaller than the particle size of the metal nanoparticles 10a.

Furthermore, the volume filling ratio of the metal nanoparticles 10a is preferably from 30 vol % to 80 vol % relative to the total volume of the magnetic particles 10 which are particle aggregates. The volume filling ratio is more preferably from 40 vol % to 80 vol %, and even more preferably from 50 vol % to 80 vol %.

Thereby, the distance between the metal nanoparticles 10a that are contained in the magnetic particles 10 is inevitably shortened, and the metal nanoparticles 10a magnetically strongly interact with each other and behave as particle aggregates magnetically. Thus, the magnetic permeability can be made large. Furthermore, since the metal nanoparticles 10a are not physically perfectly connected, the microscopic eddy current loss can be reduced, and the high frequency properties of magnetic permeability can be enhanced.

In order to exhibit this effect more effectively, it is preferable that the average interparticle distance of the metal nanoparticles 10a contained in the magnetic particles 10 be preferably from 0.1 nm to 10 nm, and more preferably from 0.1 nm to 5 nm. The interparticle distance as used herein means the distance of the gap between two metal nanoparticles 10a, along a line connecting the center of one metal nanoparticle 10a and the center of another metal nanoparticle 10a. When the surface of the metal nanoparticles 10a is covered by a coating layer, the interparticle distance refers to the distance of the gap between the outermost surface of the surface coating layer of one metal nanoparticle 10a and the outermost surface of the coating layer of another metal nanoparticle 10a.

Thereby, the metal nanoparticles 10a magnetically interact with each other, and behave as particle aggregates (composite magnetic particles) magnetically, so that the magnetic permeability can be increased. Furthermore, since the metal nanoparticles 10a are not physically perfectly connected, the microscopic eddy current loss can be reduced, and the high frequency characteristics of magnetic permeability can be enhanced.

In this specification, such a particle aggregate of the metal nanoparticles 10a is regarded as one magnetic particle 10, but there are occasions in which two or more particle aggregates join together in the process of forming particle aggregates. Even in such cases, when a boundary line is drawn between particle aggregates, and the average particle size of one particle aggregate segregated by this boundary line is from 50 nm to 50 µm, the segregated particle aggregate is acceptable as a particle aggregate, in the case of spherical aggregates. Furthermore, in the case of flat-shaped or rod-shaped particle aggregates, when the average height (in the case of a rod shape, the average diameter) is from 10 nm to 2 µm, and more preferably, when the average height is from 10 nm to 100 nm, and the average aspect ratio is 5 or greater, and more preferably 10 or greater, the segregated particle aggregate is acceptable as a particle aggregate.

Furthermore, there are occasions in which a portion of one particle aggregate is bound to another particle aggregate. In even this case, if the conditions such as described above are satisfied when a boundary line is drawn on one particle aggregate and a portion of another particle aggregate, the particle aggregate is acceptable as a particle aggregate having a morphology of one particle aggregate bound to a portion of another particle aggregate.

Furthermore, there are also occasions in which particle aggregates having a distorted shape other than a plate shape, an oblate ellipsoid, a rod shape, or an ellipsoid of revolution, are obtained. When the ratio of the long dimension and the short dimension, that is, the aspect ratio is 5 or greater, and more preferably 10 or greater, and the short dimension is from 10 nm to 2 µm, and more preferably, the short dimension is from 10 nm to 100 nm, the particle aggregate is acceptable as a particle aggregate having a distorted shape.

Furthermore, when a material other than the metal nanoparticles 10a, which is contained in the particle aggregates, and the material surrounding the particle aggregates are the same, the outer periphery of the particle aggregates is ambiguous and not easily recognizable. Even in such a case, if it can be confirmed by structural observation by TEM or SEM that the metal nanoparticles 10a aggregate and segregate in a certain material, and particle aggregates having an average short dimension of from 10 nm to 2 µm, and an average aspect ratio of 5 or greater are formed, the particle aggregate is acceptable as a particle aggregate. As discussed above, when the distance between the metal nanoparticles 10a contained in the particle aggregates is 10 nm or less, the effect offered by the current modification is enhanced. Therefore, the distance between aggregated and unevenly distributed metal nanoparticles is preferably 10 nm or less.

Furthermore, when a portion of one particle aggregate is bound to another particle aggregate, and also in the case of a particle aggregate having a distorted shape other than a plate shape, an oblate ellipsoid, a rod shape, or an ellipsoid of revolution, if the height and aspect ratio described above are satisfied when a boundary line is drawn, the particle aggregate is acceptable as a particle aggregate. As one of the methods of drawing boundary lines, a method of drawing a boundary line at a site where the average value of the interparticle distance between one metal nanoparticle 10a and another metal nanoparticle 10a present in the vicinity is 10 nm or greater, and preferably 100 nm or greater, may be used.

Meanwhile, this is just one of possible methods after all, and in reality, it is preferable to determine, by structural observation by TEM or SEM to an extent based on common sense, a region in which there are relatively more metal nanoparticles 10a as compared with the surroundings, and to draw a boundary line as one particle aggregate. Furthermore, it is preferable that the magnetic particles 10 have a shape with a large aspect ratio, from the viewpoints of high magnetic permeability and satisfactory high frequency magnetic characteristics.

Flat-shaped and rod-shaped magnetic particles are preferred, and the average height (in the case of a rod shape, the average diameter) is preferably from 10 nm to 2 μm, and even more preferably, the average height (in the case of a rod shape, the average diameter) is from 10 nm to 100 nm. A larger average aspect ratio is more preferred, and an average aspect ratio of 5 or greater is preferred. The average aspect ratio is more preferably 10 or greater. These are appropriate sizes for minimizing the sum of the eddy current loss and the hysteresis loss in the MHz range of 100 kHz or higher.

Furthermore, a higher electrical resistivity of the magnetic particles is more preferred; however, even if the intermediate phase 10b contained in the magnetic particles 10 has higher resistivity, generally as the volume ratio of the metal nanoparticles 10a increases, the electrical resistivity of the magnetic particles 10 decreases. This is because in reality, the metal nanoparticles 10a do not isolate themselves, but partially form a network or aggregate. Such an effect becomes conspicuous as the particle size of the metal nanoparticles 10a is smaller, and the volume ratio is larger.

On the other hand, if the volume ratio of the metal nanoparticles 10a is decreased, the content of the magnetic component contained in the magnetic particles 10 decreases. Therefore, a decrease in the saturation magnetization is caused, and it is not preferable. As such, the electrical resistivity and saturation magnetization of the magnetic particles 10 are in a trade-off relationship to some extent.

Ideally, when the volume proportion of the metal nanoparticles in the composite magnetic particles is from 30 vol % to 80 vol %, more preferably from 40 vol % to 80 vol %, and even more preferably from 50 vol % to 80 vol %, it is preferable if the electrical resistivity of the magnetic particles 10 can be maximized. However, in practice, the electrical resistivity is from 100 μΩ·cm to 100 mΩ·cm.

That is, a preferred range of electrical resistivity in which a balance is achieved between high saturation magnetization and high electrical resistivity is from 100 μΩ·cm to 100 mΩ·cm. Meanwhile, such magnetic particles 10 are capable of inducing in-plane uniaxial anisotropy by means of the magnetic field or strain, which is preferable. As discussed above, in a magnetic material having in-plane uniaxial anisotropy, the anisotropic magnetic field in an easy magnetization plane is preferably from 1 Oe to 500 Oe, and more preferably from 10 Oe to 500 Oe. This is a range necessary to maintain low loss and high magnetic permeability in the MHz range of 100 kHz or higher.

Meanwhile, the space between the magnetic particles 10 which are particle aggregates may be, for example, filled with a resin.

(Eighth Embodiment)

The magnetic material of the current embodiment is the same as the seventh embodiment, except that a composite phase of a metal phase containing at least one magnetic metal selected from the group including Fe, Co and Ni, and a second intermediate phase containing at least one non-magnetic metal selected from Mg, Al, Si, Ca, Zr, Ti, Hf, Zn, Mn, Ba, Sr, Cr, Mo, Ag, Sc, V, Y, Nb, Pb, Cu, In, Sn, and rare earth elements, and any one of oxygen (O), nitrogen (N) and carbon (C), is present between the magnetic particles of the seventh embodiment. Therefore, further descriptions on the matters that overlap with the seventh embodiment will not be repeated.

Figure 10:
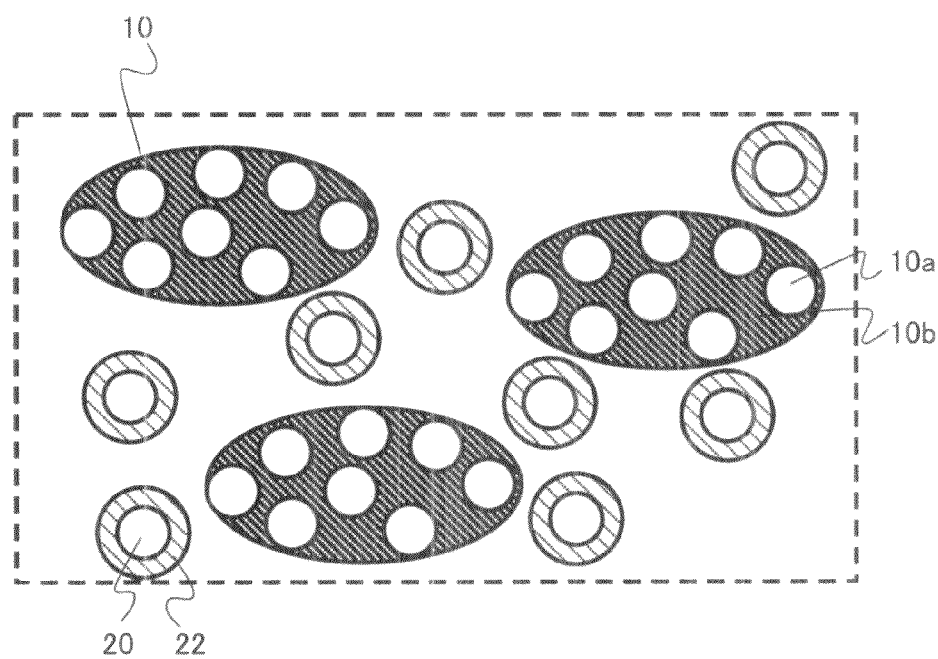
FIG. 10 is a schematic diagram of the magnetic material of an eighth embodiment.

FIG. 10 is a schematic diagram of the magnetic material of the current embodiment. Between magnetic particles which are particle aggregates, there is present a composite phase which is composed of core-shell type magnetic particles containing magnetic metal particles (metal phase) 20 containing at least one magnetic metal selected from the group including Fe, Co and Ni, a coating layer (second intermediate phase) 22 that covers at least a portion of the surfaces of the magnetic metal particles 20. The coating layer (second intermediate phase) 22 is a second intermediate phase containing at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and anyone of oxygen (O), nitrogen (N) and carbon (C).

The characteristics required from the second intermediate phase are the same as those for the intermediate phase according to the seventh embodiment.

The magnetic metal particles (metal phase) 20 are preferably particles having an average particle size of from 5 nm to 50 nm, and among others, particularly, particles having an average particle size of from 5 nm to 30 nm are preferred. When the magnetic material contains a composite phase which includes particles having an average particle size in this range, the magnetic interaction between individual magnetic particles 10 can be effectively enhanced, while electrical resistivity is maintained high. Also, the proportion of the magnetic metal contained in the entirety of the magnetic material can be effectively increased, while electrical resistivity is maintained high. Thereby, the magnetic permeability and saturation magnetization can be effectively enhanced, while the high-frequency magnetic properties of the magnetic material are maintained.

Furthermore, it is preferable that the magnetic metal particles 20 contain at least one magnetic metal selected from the group including Fe, Co and Ni, and that the coating layer 22 contain at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. Thereby, the magnetic interaction between individual magnetic particles 10 can be more effectively enhanced, while electrical resistivity is maintained high. Also, the proportion of the magnetic metal contained in the entirety of the magnetic material can be more effectively increased, while electrical resistivity is maintained high. Thus, it is preferable.

In core-shell type magnetic particles, it is more preferable if the core-shell type magnetic particles are core-shell type magnetic particles in which the magnetic metal particles 20 contain at least one magnetic metal selected from the group including Fe, Co and Ni, and at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and the coating layer 22 contains at least one of the magnetic metals described above and at least one of the non-magnetic metals described above. It is because thereby, the components of the magnetic metal particles 20 and the components of the coating layer 22 have similar compositions in the core-shell type magnetic particles, and therefore, the adhesiveness between the magnetic metal particles 20 and the interface between the magnetic metal particles and the coating layer 22 is increased, so that the thermal stability of the magnetic material is increased.

When the magnetic material adopts a configuration such as described above, the sum of the eddy current loss and the hysteresis loss in the MHz range of 100 kHz or higher can be extremely minimized, and the magnetic material can have high magnetic permeability and high saturation magnetization.

Figure 11:
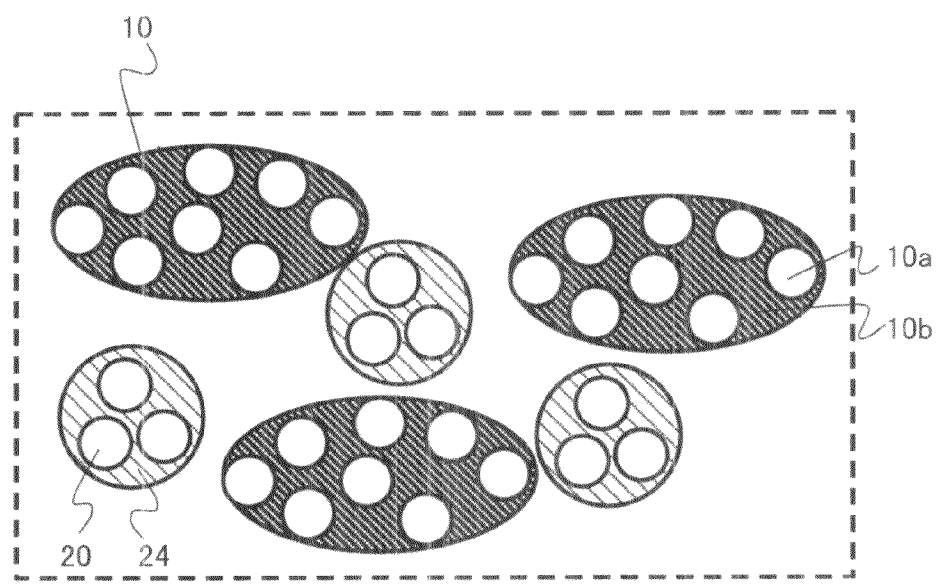
FIG. 11 is a schematic diagram of the magnetic material of a modification of the eighth embodiment.

FIG. 11 is a schematic diagram of a modification of the magnetic material of the current embodiment. As illustrated in FIG. 9, the composite phase is composed of plural magnetic metal particles (metal phase) 20, and an adhesive layer (insulating layer) 24 that fills the space between these plural magnetic metal particles 20.

Even in the current modification, the sum of the eddy current loss and the hysteresis loss in the MHz range of 100 kHz or higher can be extremely minimized, and the magnetic material can have high magnetic permeability and high saturation magnetization.

(Ninth Embodiment)

The method for producing a magnetic material of the current embodiment includes a step of synthesizing plural metal nanoparticles that have an average particle size of from 1 nm to 1 µm and contain at least one magnetic metal selected from the group including Fe, Co and Ni; a step of forming an intermediate phase containing at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and any one of oxygen (O), nitrogen (N) and carbon (C), on at least a portion of the surfaces of the metal nanoparticles; and a step of integrating the metal nanoparticles and the intermediate phase, and thereby forming particle aggregates that have an average short dimension of from 10 nm to 2 µm (more preferably of from 10 nm to 100 nm) and an average aspect ratio of 5 or greater (more preferably of from 10 or greater), and a volume filling ratio of the metal nanoparticles of from 40 vol % to 80 vol %.

The current embodiment relates to a method for producing the magnetic material of the seventh embodiment. Therefore, further descriptions on the matters that overlap with the seventh embodiment will not be repeated.

The method for producing a magnetic material of the current embodiment is a method for producing a magnetic material having magnetic particles, which are particle aggregates including metal nanoparticles that have an average particle size of from 1 nm to 20 nm, and more preferably of from 1 nm to 10 nm and contain at least one magnetic metal selected from the group including Fe, Co and Ni, and an intermediate phase that is present between the metal nanoparticles and contains at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and any one of oxygen (O), nitrogen (N) and carbon (C), the particle aggregates having a morphology with an average short dimension of from 10 nm to 2 µm (more preferably of from 10 nm to 100 nm) and an average aspect ratio of 5 or greater (more preferably of from 10 or greater), and the volume filling ratio of the metal nanoparticles being from 40 vol % to 80 vol % relative to the total volume of the particle aggregates.

Further, the method is a production method appropriate for synthesizing a magnetic material in which the average inter-particle distance between the metal nanoparticles is from 0.1 nm to 5 nm.

That is, the magnetic material is synthesized by a step of synthesizing metal nanoparticles containing at least one magnetic metal selected from the group including Fe, Co and Ni, and a non-magnetic metal; a step of forming an intermediate phase (coating layer) of an oxide on at least a portion of the surfaces of the metal nanoparticles; and a step of subjecting the magnetic particles coated with an oxide, to a composite integration treatment.

According to the current embodiment, first, the process begins with a step of synthesizing metal nanoparticles containing at least one magnetic metal selected from the group including Fe, Co and Ni, and a non-magnetic metal. At this time, the step of synthesizing the metal nanoparticles is not particularly limited, and synthesis is carried out by, for example, a water atomization method, a gas atomization method, a heat plasma method, a CVD method, a laser abrasion method, or an in-liquid dispersion method.

However, when the metal nanoparticles are synthesized, metal nanoparticles having a smaller particle size of from 1 nm to 1 µm are preferred, and 1 nm to 100 nm are more preferred, because two-phase separation of the magnetic metal and the intermediate phase can be easily accelerated in the subsequent step. The metal nanoparticles with average particle size of from 10 nm to 100 nm are much more preferable. For this reason, it is preferable to use a heat plasma method that is capable of performing the synthesis easily and in a large amount. The intermediate phase is, for example, an oxide, a semiconductor, a nitride, a carbide, or a fluoride, but in this specification, an intermediate phase of an oxide will be taken as an example in the following descriptions.

In the case of using a heat plasma method, first, a magnetic metal powder having an average particle size of several micrometers and a non-magnetic metal, which are raw materials, are sprayed together with a carrier gas into a plasma generated in a chamber of a high frequency induction heat plasma apparatus. Thereby, metal nanoparticles containing a magnetic metal can be easily synthesized.

Subsequently, the process proceeds to a step of forming an intermediate phase (coating layer) of an oxide on at least a portion of the metal nanoparticles. In this step, the method of coating with an oxide is not particularly limited, but the process may be carried out by liquid phase coating or a partial oxidation method.

The partial oxidation method is a method of synthesizing metal nanoparticles containing a magnetic metal and a non-magnetic metal, subsequently subjecting the metal nanoparticles to partial oxidation under appropriate oxidation conditions, and thereby precipitating an oxide containing the non-magnetic metal on the surface of the metal nanoparticles to form a coating layer.

This technique is based on causing the precipitation of an oxide through diffusion, and when compared with a liquid phase coating method, the metal nanoparticles and the interface between the metal nanoparticles and the oxide coating layer strongly adhere to each other, so that the thermal stability and oxidation resistance of the metal nanoparticles are enhanced, which is preferable. There are no particular limitations on the conditions for partial oxidation, but it is preferable to oxidize the metal nanoparticles in an oxidative atmosphere of $O_2$, $CO_2$ or the like, at an adjusted oxygen concentration, and at a temperature in the range of room temperature to 1,000° C.

Meanwhile, the present process may be carried out during the step of synthesizing metal nanoparticles. That is, core-shell type metal nanoparticles containing an oxide coating layer containing a non-magnetic metal may be synthesized on the surfaces of the metal nanoparticles, by controlling the process conditions in the middle of the process of synthesizing metal nanoparticles with a heat plasma.

Through the steps described above, core-shell type magnetic metal nanoparticles in which the surfaces of magnetic metal particles are coated with a non-magnetic metal oxide coating layer, can be synthesized. That is, a two-phase separated structure of metals and oxides at a nanoscale level can be realized.

Subsequently, the process proceeds to a step of integrating the metal nanoparticles and the intermediate phase, that is, a step of subjecting metal nanoparticles coated with an oxide, to a composite integration treatment. In this step, metal nanoparticles that are obtained by rapidly cooling the synthesis product are subjected to a composite integration treatment by using a high-power mill apparatus. Thereby, particle aggregates can be obtained relatively easily.

The high-power mill apparatus is not limited in the selection of the type, as long as it is an apparatus capable of applying strong gravitational acceleration, but for example, a high-power planetary mill apparatus which is capable of applying a gravitational acceleration of several ten G's, or the like is preferred. If possible, it is preferable to apply a gravitational acceleration of 50 G or greater, and more preferably 100 G or greater.

Furthermore, when a high-power mill is used, it is preferable to perform the process in an inert gas atmosphere in order to maximally suppress oxidation of the magnetic nanoparticles. Also, if a powder is subjected to a composite integration treatment in a dry mode, the composite integration treatment can be easily carried out; however, the structure is likely to become coarse, and collection of the particles is difficult. Moreover, the shape of particles thus obtainable is also spherical in many cases.

On the other hand, if the composite integration treatment is carried out in a wet mode using a liquid solvent, it is preferable because coarsening of the structure is suppressed, and a flat shape is easily obtained. A more preferred method is to perform a treatment of suppressing the coarsening of the structure, while accelerating composite integration, by carrying out the treatment both in a dry mode and in a wet mode.

Particle aggregates can be easily synthesized by using such a technique; however, depending on the synthesis conditions, making the shape of the particle aggregates into a flat shape with a large aspect ratio is also readily realizable, and it is preferable. When composite particles having a large aspect ratio are produced, shape-induced magnetic anisotropy can be imparted, and by aligning the directions of the axes of easy magnetization into one direction, the magnetic permeability and the high frequency characteristics of magnetic permeability can be enhanced, which is preferable.

Meanwhile, even if the particles undergo slight oxidation, the particles can be reduced by subjecting the particles to a heat treatment in a reducing atmosphere. Furthermore, the step of forming a coating layer of an oxide on at least a portion of the surfaces of the metal nanoparticles may also be carried out in the present step of subjecting metal nanoparticles to a composite integration treatment.

That is, in regard to the present composite integration treatment step, the composite integration treatment can be carried out while forming an oxide, by controlling the treatment conditions, specifically, by controlling the oxygen partial pressure in the atmosphere, or the type of the liquid solvent used at the time of wet mixing. As such, the process of forming an oxide may be carried out after the metal nanoparticles are synthesized, and may also be carried out during the step of synthesizing metal nanoparticles, or may also be carried out during the step of performing a composite integration treatment.

Meanwhile, the method of synthesizing a magnetic material such as described above is not intended to be limited to the methods described above, and the magnetic material can also be synthesized by, for example, a method such as described below. For example, a method of synthesizing a nanogranular structure can be used, that is, a nanogranular structure in which plural magnetic metal nanoparticles are filled in a matrix, by a thin film process or the like, detaching the thin film, and pulverizing the thin film into particle aggregates.

Fist, a magnetic metal, and an oxide, a semiconductor, a carbide, a nitride or a fluoride, which constitutes the intermediate phase containing a non-magnetic metal, are simultaneously formed into a film. Hereinafter, in the current embodiment, an intermediate phase composed of an oxide will be described.

The film-forming method is not particularly limited as long as it is a method of carrying out two-phase separation of metals and oxides at a nanoscale level, but a sputtering method, a vapor deposition method, a physical vapor deposition (PVD) method and the like are preferred. By using such a method, a magnetic thin film of particle aggregates (nanogranular thin film) containing magnetic metal nanoparticles that have an average particle size of from 1 nm to 20 nm, and an oxide that is present between magnetic metal nanoparticles, and contains at least one each of non-magnetic metals and the magnetic metals described above, can be synthesized.

The thickness of the deposited film is a thickness capable of maintaining a nanoscale composite structure, and is not particularly limited. However, in general, if the thickness is increased, the structure tends to be rough, and therefore, a thickness of 1 µm or less is preferred. The magnetic thin film of particle aggregates that has been deposited on a substrate surface is detached from the substrate and collected, and the collected thin film fragments are pulverized. The method of pulverizing the thin film fragments is not particularly limited, but for example, methods of using a rotary ball mill, a vibratory ball mill, a stirring ball mill, a planetary mill, a jet mill, and mortar pulverization may be used.

In this manner, a magnetic material having magnetic particles, which are particle aggregates containing metal nanoparticles that have an average particle size of from 1 nm to 20 nm, and more preferably of from 1 nm to 10 nm and contain at least one magnetic metal selected from the group including Fe, Co and Ni, and an intermediate phase that is present between the metal nanoparticles and contain at least one non-magnetic metal selected from Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and any one of oxygen (O), nitrogen (N) and carbon (C), the particle aggregates having a morphology with an average short dimension of from 10 nm to 2 µm (more preferably of from 10 nm to 100 nm) and an average aspect ratio of 5 or greater (more preferably of from 10 or greater), and the volume filling ratio of the metal nanoparticles being from 40 vol % to 80 vol % relative to the total volume of the particle aggregates, can be produced.

Meanwhile, the particle aggregates are produced to exhibit a morphology having an average short dimension of from 10 nm to 2 µm (more preferably of from 10 run to 100 nm) and an average aspect ratio of 5 or greater (more preferably of from 10 or greater), by appropriately controlling the film-forming conditions or pulverization conditions for the magnetic thin film of particle aggregates. Furthermore, the particle aggregates are produced such that the volume filling ratio of the metal nanoparticles is from 40 vol % to 80 vol % relative to the total volume of the particle aggregates. (Tenth Embodiment)

The device of the current embodiment is a device including one of the magnetic materials described in the above-described embodiments. Therefore, further descriptions on the matters that overlap with the embodiments described above will not be repeated.

The device of the current embodiment is, for example, a high-frequency magnetic component such as an inductor, a choke coil, a filter, or a transformer, an antenna substrate/component, or a an electromagnetic wave absorber.

An application which can best take advantage of the features of the magnetic materials of the embodiments described above is an inductor element for power inductors. The magnetic material can easily exhibit effects when applied to a power inductor to which a high current is applied, at a frequency in the MHz range of 100 kHz or higher, for example, in the 10 MHz band.

Specifications that are required from a magnetic material for power inductors include high magnetic permeability, as well as low magnetic losses (mainly low eddy current loss and low hysteresis loss), and satisfactory direct current superimposition characteristics. In power inductors used at a frequency band of lower than 100 kHz, existing materials such as a silicon steel sheet, a Sendust, an amorphous ribbon, a nanocrystalline ribbon, and MnZn-based ferrite are being used; however, a magnetic material which sufficiently satisfies the specifications required for power inductors used at a frequency band of 100 kHz or higher does not exist.

For example, the metal-based materials described above are inadequate for use at frequencies of 100 kHz or higher because the materials have large eddy current losses at high frequencies. Furthermore, since MnZn ferrite, or NiZn ferrite for coping with high frequency bands have low saturation magnetization, their direct current superimposition characteristics are poor, and the materials are not preferable. That is, there has been no magnetic material hitherto, which can satisfy all of high magnetic permeability, low magnetic losses, and satisfactory direct current superimposition characteristics in the MHz range of 100 kHz or higher, for example, in the 10 MHz band, and there is a strong demand for the development of such a magnetic material.

From such viewpoint, the magnetic materials of the embodiments can be said to be materials that are excellent particularly in high magnetic permeability, low magnetic losses, and satisfactory direct current superimposition characteristics. First, the eddy current loss can be reduced by means of high electrical resistivity; however, the magnetic materials described above in particular contain an oxide, a semiconductor, a carbide, a nitride or a fluoride, which has high electrical resistivity, between magnetic particles or metal nanoparticles. For this reason, electrical resistivity can be increased, and it is preferable.

Furthermore, the hysteresis loss can be reduced by decreasing the coercive force (or magnetic anisotropy) of the magnetic material. In the magnetic materials described above, the magnetic anisotropy of individual magnetic particles is low, and also, the total magnetic anisotropy can be further reduced as individual magnetic metal particles magnetically interact with each other. That is, in the magnetic materials described above, both the eddy current loss and the hysteresis loss can be sufficiently reduced.

Furthermore, in order to realize satisfactory direct current superimposition characteristics, it is important to suppress magnetic saturation, and in order to do so, a material having high saturation magnetization is preferred. Even from this viewpoint, the magnetic materials of the embodiments described above are preferred because the materials can acquire high total saturation magnetization by selecting magnetic metal particles having high saturation magnetization in the interior. Meanwhile, in general, magnetic permeability increases as the saturation magnetization increases, and as magnetic anisotropy decreases. Accordingly, the magnetic materials of the embodiments described above can also have high magnetic permeability.

From the viewpoints described above, the magnetic materials of the embodiments described above can particularly easily exhibit the effects when applied as inductor elements in power inductors to which a high current is applied, at a frequency in the MHz range of 100 kHz or higher, for example, in the 10 MHz band.

Meanwhile, the magnetic materials of the embodiments described above can be used not only as high-permeability components such as inductor elements, but also as electromagnetic wave absorbers, by varying the frequency bands of use. Generally, a magnetic material adopts high $\mu''$ near the ferromagnetic resonance frequency. However, in the magnetic materials of the embodiments described above, since various magnetic losses except for the ferromagnetic resonance loss, for example, the eddy current loss and the domain wall resonance loss, can be suppressed as much as possible, the materials can have small $\mu''$ and large $\mu'$ in a frequency band that is sufficiently lower than the ferromagnetic resonance frequency. That is, the magnetic materials are preferred because just one material can be used in high-permeability components, and also as an electromagnetic wave absorber, simply by varying the frequency band of use.

On the other hand, a material that is developed as an electromagnetic wave absorber is usually designed to maximize $\mu''$ by summing up various losses including the ferromagnetic resonance loss and various magnetic losses (the eddy current loss, the domain wall resonance loss, and the like). Therefore, it is difficult to use a material that has been developed as an electromagnetic wave absorber, in high-permeability components for inductor elements or antenna apparatuses (high $\mu'$ and low $\mu''$) at any of all frequency bands.

A magnetic material may be subjected to various processing treatments so as to be applied to devices such as described above. For example, in the case of a sintered body, the material is subjected to mechanical working such as polishing or grinding, and in the case of a powder, the material is subjected to mixing with a resin such as an epoxy resin or polybutadiene. If necessary, the materials are further subjected to surface treatments.

FIG. 12A, FIG. 12B, FIG. 13A, FIG. 13B, and FIG. 14 are conceptual diagrams of the devices of the current embodiment. When the high-frequency magnetic component is an inductor, a choke coil, a filter, or a transformer, a coiling treatment is achieved.

Figure 12A:
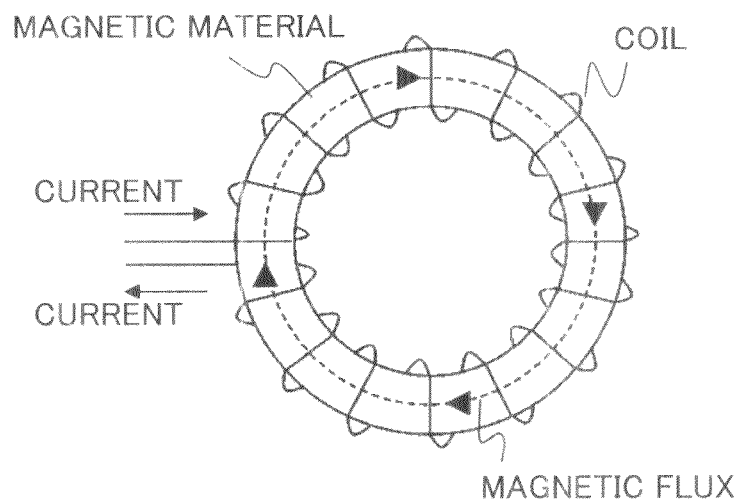
FIG. 12A and FIG. 12B are conceptual diagrams of the device of a tenth embodiment.
Figure 12B:
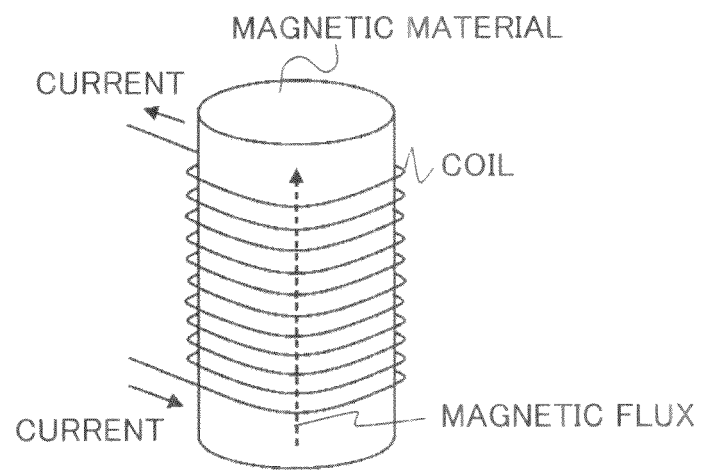

The most fundamental structures include the inductor element shown in FIG. 12A, in which a ring-shaped magnetic material is provided with a coil wound around the material, and the inductor element shown in FIG. 12B, in which a rod-shaped magnetic material is provided with a coil wound around the material.

Figure 13A:
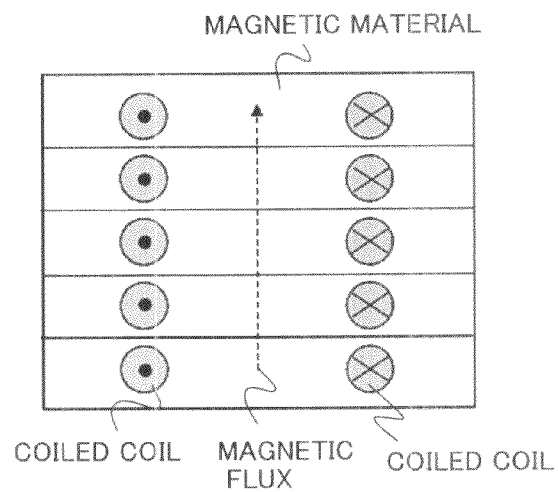
FIG. 13A and FIG. 13B are conceptual diagrams of the inductor element of the tenth embodiment.
Figure 13B:
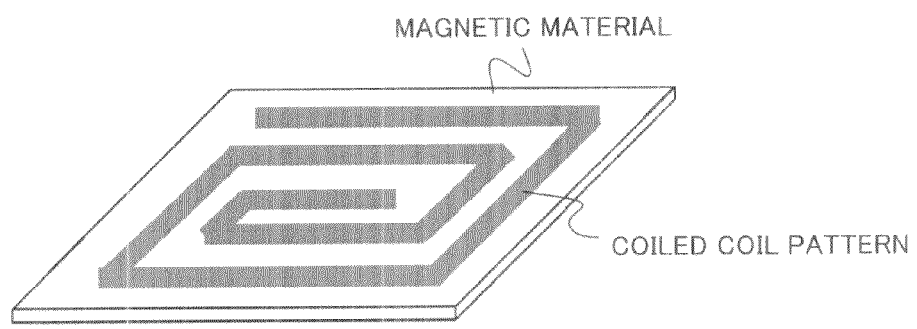

Further examples include the chip inductor element shown in FIG. 13A, in which coils and magnetic materials have been integrated, and the planar inductor element shown in FIG. 13B. In the case of FIG. 13A, the device may be fabricated into a laminate.

Figure 14:
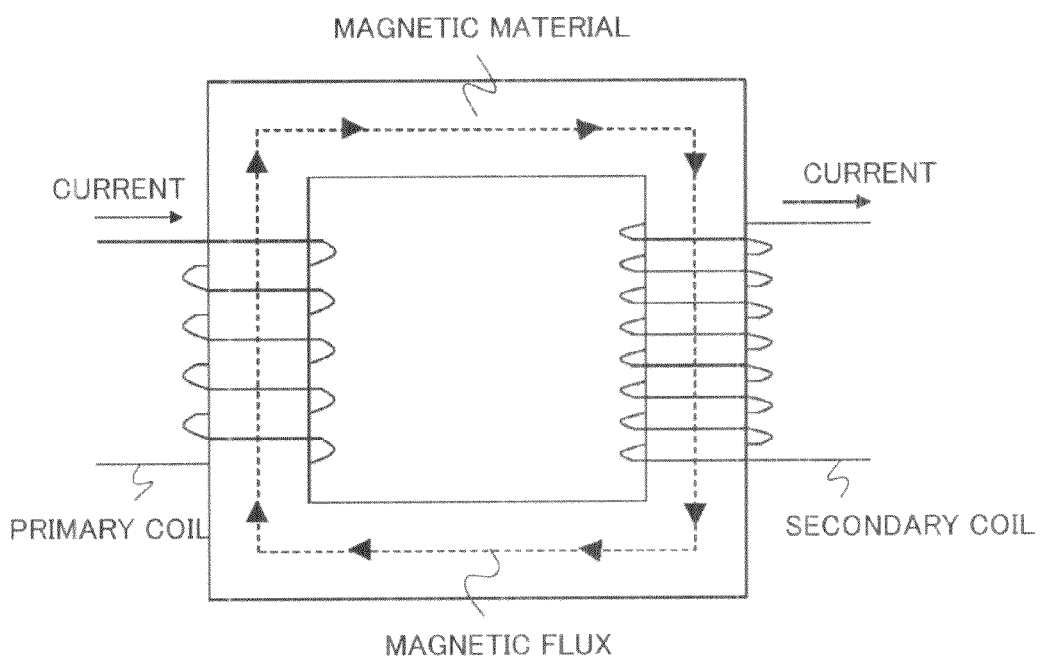
FIG. 14 is a conceptual diagram of the inductor element of the tenth embodiment.
Figure 15:
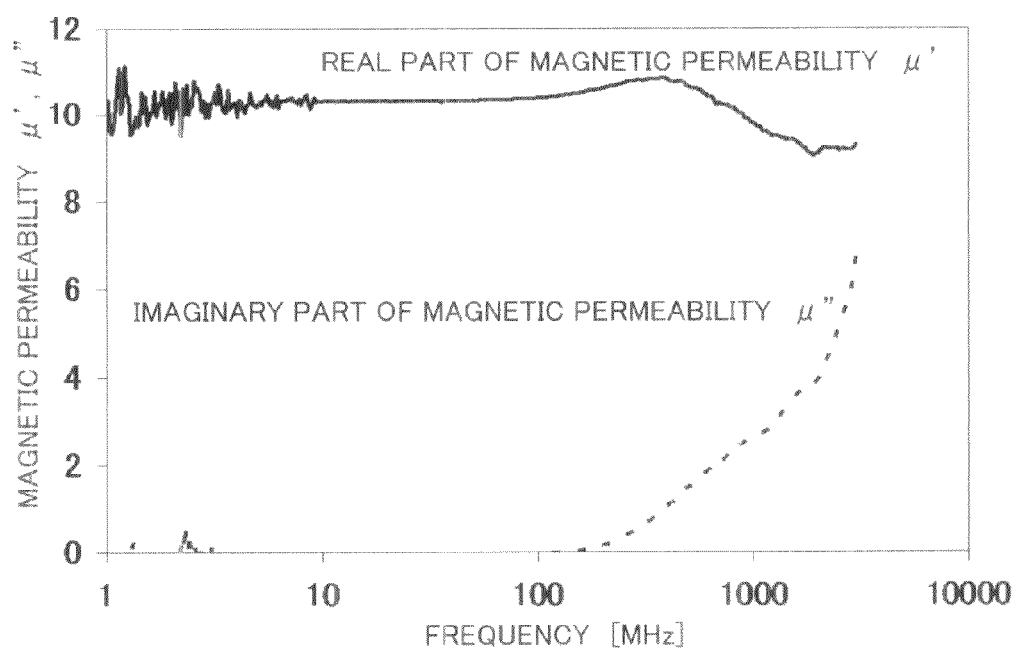
FIG. 15 is a diagram exhibiting the frequency characteristics of magnetic permeabilities ($\mu'$ and $\mu"$) of Example 3.

Furthermore, FIG. 14 shows an inductor element having a transformer structure.

FIG. 12A to FIG. 14 merely illustrate representative structures, and in reality, the structure or dimension may be varied in accordance with the application and required inductor element characteristics.

According to the devices of the current embodiment, devices having excellent characteristics can be realized by using a magnetic material which has a high real part of magnetic permeability ($\mu'$) and a low imaginary part of magnetic permeability ($\mu''$) particularly in the MHz range of 100 kHz or higher, and has high strength, high saturation magnetization, high thermal stability, and high oxidation resistance.

Thus far, embodiments of the present application have been described while making reference to specific examples. The embodiments described above are only for illustrative purposes, and are not intended to limit the present application by any means. Furthermore, the constituent elements of the various embodiments may also be appropriately combined.

In the explanations of the embodiments, descriptions on the parts that are not directly needed in the explanation of the present application in connection with the magnetic material, the method for producing a magnetic material, the inductor element and the like, were not repeated. However, necessary elements that are related to the magnetic material, the method for producing a magnetic material, and the inductor element can be appropriately selected and used.

In addition, all magnetic materials, methods for producing a magnetic material, and inductor elements that include the elements of the present application and can be appropriately designed and modified by a person having ordinary skill in the art, are to be included in the scope of the present application. The scope of the present application is to be defined by the scope of the claims and equivalents thereof.

EXAMPLES

Hereinafter, Examples 1 to 13 of the present application will be described in detail by making a comparison with Comparative Examples 1 to 5. In regard to the magnetic materials obtained by Examples and Comparative Examples described below, the shape, average particle size (or average height), average aspect ratio, and composition of the magnetic particles; the composition of the first oxide; the composition of the second oxide; the composition of the third oxide; and the composition of the eutectic structure are presented in Table 1. Meanwhile, the measurement of the average particle size (or average height) of the magnetic particles is carried out by calculating the average value of plural particles based on a TEM observation or a SEM observation. Meanwhile, the magnetic particles of Example 7 are particle aggregates in which metal nanoparticles are dispersed at a high density, and the average particle size of the metal nanoparticles inside the magnetic particles is determined comprehensively based on a TEM observation, and the crystal grain size determined by XRD (utilizing Scherrer's formula). Also, the composition analysis of microstructures is carried out based on an EDX analysis.

Example 1

First, spherical FeCoAl magnetic particles are synthesized by a water atomization method. Subsequently, a $SiO_2$ coating layer (a first coating layer of a first oxide) is formed on these magnetic particles according to a sol-gel method. Thereafter, the magnetic particles having a $SiO_2$ coating layer formed thereon, and $B_2O_3$ particles (oxide particles of a second oxide) are sufficiently mixed in a ball mill. Thereafter, the mixed particles are subjected to press molding and a heat treatment at 600° C. in a vacuum. Thus, a magnetic material for evaluation is obtained.

The same magnetic material as that illustrated in FIG. 1 of the first embodiment is obtained. In the magnetic material, a first oxide and a second oxide are present in addition to magnetic particles, and an oxide phase having an eutectic structure produced from the first oxide and the second oxide is present between the magnetic particles.

Example 2

An AlFeCo—O oxide, which becomes a third oxide, is formed as a coating layer (second coating layer) on the surfaces of the FeCoAl magnetic particles, by subjecting the magnetic particles of Example 1 to a partial oxidation treatment. The subsequent treatments are the same as those performed in Example 1.

The same magnetic material as the modification illustrated in FIG. 3 of the first embodiment is obtained. In the magnetic material, a first oxide and a second oxide are present, in addition to magnetic particles coated with a third oxide, and an oxide phase having an eutectic structure produced from the first oxide and the second oxide is present between the magnetic particles.

Example 3

A plasma is generated by introducing argon as a gas for plasma generation into a chamber of a high frequency induction heat plasma apparatus at a rate of 40 L/min. An Fe powder having an average particle size of 5 μm, a Co powder having an average particle size of 5 μm, and an Al powder having an average particle size of 3 μm, which are raw materials, are sprayed together with argon (carrier gas) into this plasma in the chamber at a rate of 3 L/min. FeCoAl magnetic particles obtained by rapid cooling are subjected to a flattening treatment using a planetary mill which uses $ZrO_2$ balls and a $ZrO_2$ pot, in an argon (Ar) atmosphere at about 2000 rpm. Thereafter, the flattened powder thus obtained is sufficiently heat treated in a hydrogen ($H_2$) atmosphere, and thus homogenous flat magnetic particles are obtained. Subsequently, the flat magnetic particles thus obtained are subjected to a partial oxidation treatment, and thereby an AlFeCo—O oxide coating layer (second coating layer), which serves as a third oxide, is formed on the surfaces of the FeCoAl magnetic particles. The subsequent treatments are the same as those performed in Example 1.

In the magnetic material, a first oxide and a second oxide are present, in addition to magnetic particles coated with a third oxide, and an oxide phase having an eutectic structure produced from the first oxide and the second oxide is present between the magnetic particles.

Example 4

The production is carried out in the same manner as in Example 3, except that the Co powder used in Example 3 is changed to a Ni powder having an average particle size of 3 μm, and the Al powder is changed to a Si powder having an average particle size of 5 μm. Meanwhile, in the magnetic material, a first oxide and a second oxide are present, in addition to magnetic particles coated with a third oxide, and an oxide phase having an eutectic structure produced from the first oxide and the second oxide is present between the magnetic particles.

Example 5

An AlFeCo—O oxide coating layer is formed on the surfaces of the flat magnetic particles of Example 3, and then a $SiO_2$ coating layer (first oxide) is formed on these magnetic particles according to a sol-gel method. Subsequently, the magnetic particles having a $SiO_2$ coating layer formed thereon and $B_2O_3$ particles (second oxide) are sufficiently mixed in a ball mill. Thereafter, the mixed particles are subjected to press molding and a heat treatment for a long time at 600° C. in a vacuum, and thus the first oxide and the second oxide are completely eutectically melted. Thereby, a magnetic material for evaluation is obtained. Meanwhile, in the magnetic material, magnetic particles coated with a third oxide are present, and an oxide phase having an eutectic structure produced from a first oxide and a second oxide is present between the magnetic particles, but the first oxide and the second oxide are not present.

Example 6

An AlFeCo—O oxide coating layer is formed on the surfaces of the flat magnetic particles produced in Example 3, and then a $SiO_2$ coating layer (first oxide) is formed on these magnetic particles according to a sol-gel method. Subsequently, the magnetic particles having a $SiO_2$ coating layer formed thereon and $B_2O_3$ particles (second oxide) are sufficiently mixed in a ball mill. The subsequent heat treatment is not carried out. These mixed particles are subjected to press molding, and thereby, a magnetic material for evaluation is obtained. Meanwhile, in the magnetic material, a first oxide and a second oxide are present, in addition to magnetic particles coated with a third oxide. An oxide phase having an eutectic structure does not exist.

Example 7

A plasma is generated by introducing argon as a gas for plasma generation into a chamber of a high frequency induction heat plasma apparatus at a rate of 40 L/min. An Fe powder having an average particle size of 5 μm, a Co powder having an average particle size of 5 and an Al powder having an average particle size of 3 μm, which are raw materials, are sprayed together with argon (carrier gas) into this plasma in the chamber at a rate of 3 L/min. FeCoAl magnetic particles obtained by rapid cooling are subjected to a partial oxidation treatment, and thereby FeCoAl magnetic particles coated with Al—Fe—Co—O are obtained. These FeCoAl magnetic particles coated with Al—Fe—Co—O are subjected to a flattening treatment using a planetary mill which uses $ZrO_2$ balls and a $ZrO_2$ pot, in an Ar atmosphere at about 2000 rpm. Thereafter, the flattened powder thus obtained is sufficiently heat treated in a $H_2$ atmosphere at a low temperature of 200° C., and a $SiO_2$ coating layer (first oxide) is formed on these magnetic particles according to a sol-gel method. Subsequently, the magnetic particles having a $SiO_2$ coating layer formed thereon (particle aggregate) and $B_2O_3$ particles (second oxide) are sufficiently mixed in a ball mill. Thereafter, the mixed particles are subjected to press molding and a heat treatment at 600° C. in a vacuum. Thus, a magnetic material for evaluation is obtained.

The magnetic particles are in the form of particle aggregates in which FeNiAl particles having an average particle size of 8 nm (metal nanoparticles) are dispersed at a high density in an AlFeNiO matrix (intermediate phase). Meanwhile, in the magnetic material, a first oxide and a second oxide are present in addition to magnetic particles, and an oxide phase having an eutectic structure produced from the first oxide and the second oxide is present between the magnetic particles.

Example 8

The production is carried out in the same manner as in Example 7, except that the Co powder used in Example 7 is changed to a Ni powder having an average particle size of 3 μm, and the Al powder is changed to a Si powder having an average particle size of 5 μm. The magnetic particles are in the form of particle aggregates in which FeNiSi particles having an average particle size of 8 nm (metal nanoparticles) are dispersed at a high density in a SiFeNiO matrix (intermediate phase). Meanwhile, in the magnetic material, a first oxide and a second oxide are present in addition to magnetic particles, and an oxide phase having an eutectic structure produced from the first oxide and the second oxide is present between the magnetic particles.

Example 9

The production is carried out in the same manner as in Example 7, except that the Co powder used in Example 7 is changed to a Ni powder having an average particle size of 3 μm, the Al powder is changed to a Si powder having an average particle size of 5 μm, and the mixed particles thus obtained are subjected to press molding and a heat treatment for a long time at 600° C. in a vacuum. The magnetic particles are in the form of particle aggregates in which FeNiSi particles having an average particle size of 8 nm (metal nanoparticles) are dispersed at a high density in a SiFeNiO matrix (intermediate phase). Meanwhile, in the magnetic material, magnetic particles are present, and an oxide phase having an eutectic structure produced from a first oxide and a second oxide is present between the magnetic particles, but the first oxide and the second oxide are not present.

Example 10

The production is carried out in the same manner as in Example 7, except that the Co powder used in Example 7 is changed to a Ni powder having an average particle size of 3 μm, the Al powder is changed to a Si powder having an average particle size of 5 μm, and a magnetic material for evaluation is obtained by press molding the mixed particles that have been sufficiently mixed in a ball mill, but without performing a heat treatment. The magnetic particles are in the form of particle aggregates in which FeNiSi particles having an average particle size of 8 nm (metal nanoparticles) are dispersed at a high density in a SiFeNiO matrix (intermediate phase). Meanwhile, in the magnetic material, a first oxide and a second oxide are present in addition to magnetic particles. An oxide phase having an eutectic structure does not exist.

Example 11

First, spherical FeBAl magnetic particles are synthesized by a water atomization method. The subsequent treatments are the same as those used in Example 1. Meanwhile, at the time of molding, the particles are oriented while a magnetic field of 1 T is applied, and press molding is performed. The magnetic particles are in an amorphous state, and are oriented by a magnetic field. Meanwhile, in the magnetic material, a first oxide and a second oxide are present in addition to magnetic particles, and an oxide phase having an eutectic structure produced from the first oxide and the second oxide is present between the magnetic particles.

Example 12

First, spherical CoAl magnetic particles are synthesized by a water atomization method. Subsequently, the magnetic particles are subjected to a partial oxidation treatment, and thereby an AlCo—O oxide, which is a third oxide, is formed on the surfaces of the CoAl magnetic particles. The subsequent treatments are the same as those used in Example 1. The crystal structure of the magnetic particles is a hexagonal structure, and the magnetic particles are oriented by a magnetic field. Meanwhile, at the time of molding, the magnetic particles are oriented while a magnetic field of 1 T is applied, and press molding is performed. Meanwhile, in the magnetic material, a first oxide and a second oxide are present, in addition to magnetic particles coated with a third oxide, and an oxide phase having an eutectic structure produced from the first oxide and the second oxide is present between the magnetic particles.

Example 13

A plasma is generated by introducing argon as a gas for plasma generation into a chamber of a high frequency induction heat plasma apparatus at a rate of 40 L/min. An Fe powder having an average particle size of 5 a Co powder having an average particle size of 5 µm, and an Al powder having an average particle size of 3 µm, which are raw materials, are sprayed together with argon (carrier gas) into this plasma in the chamber at a rate of 3 L/min. FeCoAl magnetic particles obtained by rapid cooling are subjected to a heat treatment to control the particle size, and then to a partial oxidation treatment. Thus, an AlFeCo—O oxide, which is a third oxide, is formed on the surfaces of the FeCoAl magnetic particles. Subsequently, a $SiO_2$ coating layer (first oxide) is formed on the magnetic particles thus obtained, according to a sol-gel method. Thereafter, the magnetic particles having a $SiO_2$ coating layer formed thereon are sufficiently mixed with $B_2O_3$ particles (second oxide) in a ball mill. Subsequently, the mixed particles are subjected to press molding and to a heat treatment at 600° C. in a vacuum, and thereby, a magnetic material for evaluation is obtained. Meanwhile, in the magnetic material, a first oxide and a second oxide are present, in addition to magnetic particles coated with a third oxide, and an oxide phase having an eutectic structure produced from the first oxide and the second oxide is present between the magnetic particles.

Comparative Example 1

A magnetic material for evaluation is obtained by forming a $SiO_2$ coating layer (first oxide) on the spherical FeCoAl magnetic particles synthesized in Example 1 according to a sol-gel method, and subjecting the magnetic particles to press molding and then to a heat treatment at 600° C. in a vacuum. Meanwhile, in the magnetic material, only a first oxide is present in addition to magnetic particles.

Comparative Example 2

A magnetic material for evaluation is obtained by sufficiently mixing the spherical FeCoAl magnetic particles synthesized in Example 1 with $B_2O_3$ particles (second oxide) in a ball mill, and subjecting the magnetic particles to press molding and then to a heat treatment at 600° C. in a vacuum. Meanwhile, in the magnetic material, only a second oxide is present in addition to magnetic particles.

Comparative Example 3

A $SiO_2$ coating layer (first oxide) is formed on the spherical FeCoAl magnetic particles synthesized in Example 1 according to a sol-gel method, and then the magnetic particles having a $SiO_2$ coating layer formed thereon are sufficiently mixed with $B_2O_3$ particles (second oxide) in a ball mill. At this time, the $B_2O_3$ particles are incorporated in a sufficiently small amount as compared with the amount of $SiO_2$, so that the $B_2O_3$ particles would be completely melted with $SiO_2$ in the subsequent heat treatment. Subsequently, the mixed particles thus obtained are subjected to press molding and to a heat treatment at 600° C. in a vacuum, and thereby, a magnetic material for evaluation is obtained. Meanwhile, in the magnetic material, magnetic particles are present, and a first oxide, and an oxide phase having an eutectic structure produced from the first oxide and a second oxide is present between the magnetic particles, but a second oxide is not present.

Comparative Example 4

An AlFeCo—O oxide coating layer (first coating layer) is formed on the surfaces of the flat magnetic particles obtained in Example 3, and then a $SiO_2$ coating layer (first oxide) is formed on these magnetic particles according to a sol-gel method. The magnetic particles are subjected to press molding and then to a heat treatment at 600° C. in a vacuum, and thereby, a magnetic material for evaluation is obtained. Meanwhile, in the magnetic material, only a first oxide is present in addition to magnetic particles coated with a third oxide (first coating layer).

For the materials for evaluation of Examples 1 to 13 and Comparative Examples 1 to 4, the real part of magnetic permeability (µ'), the permeability loss (µ–tan δ=µ"/µ'×100(%)), and change over time in the real part of magnetic permeability (µ") after 100 hours are evaluated by the following methods. The evaluation results are presented in Table 2.

1) Real part of magnetic permeability µ', and permeability loss (µ–tan δ=µ"/µ'×100(%))

The magnetic permeability of a ring-shaped sample is measured using an impedance analyzer. The real part µ' and the imaginary part µ" are measured at two frequencies of 100 kHz and 10 MHz. For spherical particles, the value at 100 kHz is measured, and for flat-shaped particles, the values at 100 kHz and 10 MHz are measured. Furthermore, the permeability loss, µ–tan δ, is calculated by the formula µ"/µ'×100(%).

2) Change Over Time in Real Part of Magnetic Permeability µ' after 100 Hours

A sample for evaluation is heated for 100 hours at 200° C. in the atmosphere, and then the real part of magnetic permeability µ' is measured again. Thus, the change over time (real part of magnetic permeability µ' after heating for 100 H/real part of magnetic permeability µ' before heating) is determined.

TABLE 1

| | Magnetic particles | | | | | | Oxide phase |
| | Shape | Average particle size (Spherical), average height (Flat) (µm) | Average aspect ratio | Composition | First oxide Composition | Second oxide Composition | Third oxide Composition | (eutectic structure) Composition |
|---|---|---|---|---|---|---|---|---|
| Example 1 | Spherical | 25 | ca. 1 | Fe—Co—Al | Si—O | B—O | — | Si—B—O |
| Example 2 | Spherical | 24 | ca. 1 | Fe—Co—Al | Si—O | B—O | Al—FeCo—O | Si—B—O |
| Example 3 | Flat | 0.09 | 110 | Fe—Co—Al | Si—O | B—O | Al—FeCo—O | Si—B—O |
| Example 4 | Flat | 0.07 | 200 | Fe—Ni—Si | Si—O | B—O | Si—FeNi—O | Si—B—O |
| Example 5 | Flat | 0.09 | 110 | Fe—Co—Al | — | — | Al—FeCo—O | Si—B—O |

TABLE 1-continued

| | | Magnetic particles | | | | | | |
|---|---|---|---|---|---|---|---|---|
| | Shape | Average particle size (Spherical), average height (Flat) (μm) | Average aspect ratio | Composition | First oxide Composition | Second oxide Composition | Third oxide Composition | Oxide phase (eutectic structure) Composition |
| Example 6 | Flat | 0.09 | 110 | Fe—Co—Al | Si—O | B—O | Al—FeCo—O | — |
| Example 7 | Flat | 0.08 | 120 | Fe—Ni—Al | Si—O | B—O | — | Si—B—O |
| Example 8 | Flat | 0.07 | 150 | Fe—Ni—Si | Si—O | B—O | — | Si—B—O |
| Example 9 | Flat | 0.07 | 150 | Fe—Ni—Si | — | — | — | Si—B—O |
| Example 10 | Flat | 0.07 | 150 | Fe—Ni—Si | Si—O | B—O | — | — |
| Example 11 | Spherical | 22 | ca. 1 | Fe—B—Al | Si—O | B—O | — | Si—B—O |
| Example 12 | Spherical | 23 | ca. 1 | Co—Al | Si—O | B—O | Al—Co—O | Si—B—O |
| Example 13 | Spherical | 0.1 | ca. 1 | Fe—Co—Al | Si—O | B—O | Al—FeCo—O | Si—B—O |
| Comparative Example 1 | Spherical | 25 | ca. 1 | Fe—Co—Al | Si—O | — | — | — |
| Comparative Example 2 | Spherical | 25 | ca. 1 | Fe—Co—Al | — | B—O | — | — |
| Comparative Example 3 | Spherical | 25 | ca. 1 | Fe—Co—Al | Si—O | — | — | Si—B—O |
| Comparative Example 4 | Flat | 0.09 | 110 | Fe—Co—Al | Si—O | — | Al—FeCo—O | — |

TABLE 2

Characteristics of high frequency magnetic material

| | Real part of magnetic permeability, μ' | | Permeability loss, μ – tanδ (%) | | Proportion of change over time of real part of magnetic permeability μ' after 100 hr at 200° C. | |
|---|---|---|---|---|---|---|
| | 100 kHz | 10 MHz | 100 kHz | 10 MHz | 100 kHz | 10 MHz |
| Example 1 | 10 | — | 2 | — | 0.85 | — |
| Example 2 | 9 | — | 2 | — | 0.89 | — |
| Example 3 | 10 | 10 | <0.1 | <0.1 | 0.88 | 0.88 |
| Example 4 | 13 | 13 | <0.1 | <0.1 | 0.89 | 0.89 |
| Example 5 | 11 | 11 | <0.1 | <0.1 | 0.86 | 0.86 |
| Example 6 | 11 | 11 | <0.1 | <0.1 | 0.84 | 0.84 |
| Example 7 | 10 | 10 | <0.1 | <0.1 | 0.88 | 0.88 |
| Example 8 | 11 | 11 | <0.1 | <0.1 | 0.88 | 0.88 |
| Example 9 | 11 | 11 | <0.1 | <0.1 | 0.87 | 0.87 |
| Example 10 | 11 | 11 | <0.1 | <0.1 | 0.86 | 0.86 |
| Example 11 | 13 | — | 1 | — | 0.84 | — |
| Example 11 | 12 | — | 1 | — | 0.83 | — |
| Example 13 | 5.2 | 5.0 | <0.1 | 0.1 | 0.85 | 0.85 |
| Comparative Example 1 | 9 | — | 5 | — | 0.70 | — |
| Comparative Example 2 | 8 | — | 6 | — | 0.68 | — |
| Comparative Example 3 | 7 | — | 4 | — | 0..73 | — |
| Comparative Example 4 | 8 | 8 | 0.1 | 0.1 | 0.72 | 0.72 |

As is obvious from Table 1, the magnetic material according to Example 1 to Example 13 are such that in the case of spherical particles, the average particle size is from 50 nm to 50 μm, and in the case of flat-shaped particles, the average height is from 10 nm to 100 nm, and the average aspect ratio is 10 or greater.

Furthermore, the magnetic metal contained in the magnetic particles is FeCo in Examples 1, 2, 3, 5, 6 and 13; FeNi in Examples 4, 7, 8, 9, and 10; Fe in Example 11; and Co in Example 12. Furthermore, the non-magnetic metal contained in the magnetic particles is Al in Examples 1 to 3, 5 to 7, and 11 to 13; and Si in Examples 4 and 8 to 10. Furthermore, the combination of the first oxide and the second oxide is a combination of a Si—O oxide and a B—O oxide. In Examples 1 to 4, 7 to 8, and 11 to 13, three oxides such as Si—O of a first oxide, B—O of a second oxide, and Si—B—O of an eutectic structure are present between the magnetic particles, and in Examples 2 to 4 and 12 to 13, a third oxide is further present. In Example 5, two components such as a third oxide AlFeCoO and an eutectic structure of Si—B—O are present between the magnetic particles. In Example 6, three components such as a third oxide AlFeCoO, a first oxide Si—O, and a second oxide B—O are present between the magnetic particles. In Example 9, only an eutectic structure Si—B—O is present between the magnetic particles. In Example 10, two components such as a first oxide Si—O and a second oxide B—O are present between the magnetic particles.

On the other hand, in Comparative Example 1, the magnetic particles are the same as the magnetic particles of Example 1, but only Si—O of a first oxide is present between the magnetic particles. In Comparative Example 2, the magnetic particles are the same as the magnetic particles of Example 1, but only B—O of a second oxide is present between the magnetic particles. In Comparative Example 3, the magnetic particles are the same as the magnetic particles of Example 1, but only two components such as Si—O of a first oxide and Si—B—O of an eutectic structure are present between the magnetic particles. Furthermore, in Comparative Example 4, the magnetic particles are almost the same as the magnetic particles of Examples 3, 5 and 6, but only two components such as Si—O of a first oxide and AlFeCoO of a third oxide are present between the magnetic particles.

Table 2 presents the real part of magnetic permeability (μ'), the permeability loss (μ–tan δ=μ"/μ'×100(%)), and the change over time in the real part of magnetic permeability (μ') after 100 hours at 200° C. As is obvious from Table 2, it can be seen that the magnetic materials related to Example 1 to Example 13 have excellent magnetic properties as compared with the materials of Comparative Examples.

FIG. 13 is a diagram presenting the frequency characteristics of the magnetic permeability (μ' and μ") of Example 3. It can be seen that μ" is almost zero up to 100 MHz (that is, μ" is also almost zero), and μ" steeply rises from near 200 MHz.

That is, it can be seen that the magnetic material has high magnetic permeability and low losses in a high frequency band of from 100 kHz to 100 MHz. Meanwhile, in the case of such a material having a steep initial rise of μ", when the frequency band is selected to be a higher frequency band, for example, when a frequency band of 1 GHz to 10 GHz is selected, the magnetic material can also be used as an electromagnetic wave absorber.

Examples 1, 2 and 11 to 13 have higher magnetic permeability and lower losses, and have smaller changes over time in the real part of magnetic permeability after 100 hours, as compared with Comparative Examples 1 to 3. Furthermore, Examples 3 to 10 have higher magnetic permeability and lower losses, and have smaller changes over time in the real part of magnetic permeability after 100 hours, as compared with Comparative Examples 4 and 5. These materials all include magnetic particles containing at least one magnetic metal selected from the group including Fe, Co and Ni and at least one non-magnetic metal selected from Al and Si; and a Si—O coating layer as a first oxide and B—O particles as a second oxide, which are present between these magnetic particles, or a Si—B—O eutectic structure of the first oxide and the second oxide, or a Si—O coating layer as a first oxide, B—O particles as a second oxide, and a Si—B—O eutectic structure, and the materials can thereby realize excellent characteristics.

That is, when a magnetic material is surrounded by two oxides of an eutectic reaction system, an eutectic structure thereof, or two oxides of an eutectic reaction system and an eutectic structure thereof, a state of being thermally stable and having high oxidation resistance can be maintained. It is speculated that thereby, high magnetic permeability and low losses can be realized, and these characteristics are maintained even after a heat treatment at a high temperature.

Furthermore, it is contemplated that since a material that is even strong in terms of strength is acquired by having an eutectic structure, the occurrence of cracking and damage at the time of heating and cooling is suppressed as much as possible, and accordingly, oxidation of the magnetic particles is also effectively suppressed.

Thus, it is understood that the magnetic materials according to Examples 1 to 13 have high real parts of magnetic permeability (μ') and low imaginary parts of magnetic permeability (μ") in the MHz range of 100 kHz or higher, and have high saturation magnetization, high thermal stability, and high oxidation resistance.

Next, the following Example 14 to Example 22 will be described in comparison with Comparative Example 5. In the magnetic materials obtained by Examples and Comparative Example described below, the shape, average height, average aspect ratio, and electrical resistivity of the magnetic particles; the shape, composition, particle size, filling ratio, and average interparticle distance of the metal nanoparticles; and the composition of the intermediate phase are presented in Table 3. Meanwhile, the measurement of the average height of the magnetic particles is carried out by calculating the average value of plural particles based on a TEM observation and a SEM observation. Meanwhile, the magnetic particles of the Examples are particle aggregates in which metal nanoparticles are dispersed at a high density, and the average particle size of the metal nanoparticles inside the magnetic particles is determined comprehensively based on a TEM observation, and the crystal grain size determined by XRD (utilizing Sherrer's formula). Also, the composition analysis of microstructures is carried out based on an EDX analysis.

Example 14

A plasma is generated by introducing argon as a gas for plasma generation into a chamber of a high frequency induction heat plasma apparatus at a rate of 40 L/min. An Fe powder having an average particle size of 5 μm, a Ni powder having an average particle size of 3 μm, and a Si powder having an average particle size of 5 μm, which are raw materials, are sprayed together with argon (carrier gas) into this plasma in the chamber at a rate of 3 L/min. FeNiSi magnetic particles obtained by rapid cooling are subjected to a partial oxidation treatment, and thus, FeNiSi magnetic particles coated with Si—Fe—Ni—O are obtained. These FeNiSi magnetic particles coated with Si—Fe—Ni—O are subjected to a flattening and integrating treatment by a planetary mill using $ZrO_2$ balls and a $ZrO_2$ pot in an Ar atmosphere at about 2000 rpm. Subsequently, a $H_2$ heat treatment is carried out at a low temperature of 200° C., and the particles thus obtained are molded. Thus, a magnetic material for evaluation is obtained. The same magnetic material as that shown in FIG. 7 of the seventh embodiment is obtained. The magnetic material thus obtainable is composed of flat particle aggregates in which spherical metal nanoparticles are filled at a high density in an oxide matrix (intermediate phase).

Example 15

The production is carried out in the same manner as in Example 14, except that the Si powder used in Example 14 is changed to an Al powder having an average particle size of 3

Example 16

The production is carried out in the same manner as in Example 14, except that the Ni powder used in Example 14 is changed to a Co powder having an average particle size of 5 μm, and the Si powder is changed to an Al powder having an average particle size of 3 μm.

Example 17

The production is carried out in the same manner as in Example 14, except that the Ni powder used in Example 14 is changed to a Co powder having an average particle size of 5 μm.

Example 18

The production is carried out in the same manner as in Example 17, except that the feed ratio of the Ni powder and the Fe powder in Example 17 is adjusted such that the filling ratio of the FeNi magnetic metal nanoparticles finally obtainable is 78 vol %. Meanwhile, the filling ratio of the FeNi magnetic metal nanoparticles finally obtainable in the case of Example 17 is 41 vol %.

Example 19

The production is carried out in the same manner as in Example 17, except that the FeNi magnetic metal nanoparticles finally obtainable by controlling the conditions of the flattening and integrating treatment carried out by a planetary mill using $ZrO_2$ balls and a $ZrO_2$ pot in Example 17, are produced into rod-shaped particles having an aspect ratio of 4.

Example 20

The production is carried out in the same manner as in Example 17, except that B is solved when FeCoSi particles are synthesized in Example 17, and the filling ratio of the magnetic metal particles is adjusted to 50 vol %.

Example 21

The production is carried out in the same manner as in Example 14, except that the powders fed in Example 14 are changed to a Co powder having an average particle size of 5 μm, an Al powder having an average particle size of 3 μm, and a Cr powder having an average particle size of 10 μm, and the hcp-structured CoCrAl magnetic metal nanoparticles finally obtainable by controlling the conditions of the flattening and integrating treatment carried out by a planetary mill using $ZrO_2$ balls and a $ZrO_2$ pot, are produced into rod-shaped particles having an aspect ratio of 10.

Example 22

The production is carried out in the same manner as in Example 14, except that a composite phase in which FeCoAl magnetic metal nanoparticles (metal phase) are dispersed in an Al—FeCo—O matrix (second intermediate phase), is present between the individual flat composite particles of Example 14. This composite phase is synthesized by the following method. First, argon is introduced at a rate of 40 L/min as a gas for plasma generation into a chamber of a high frequency induction heat plasma apparatus to generate a plasma. An Fe powder having an average particle size of 5 μm, a Co powder having an average particle size of 5 μm, and an Al powder having an average particle size of 3 μm, which are raw materials, are sprayed together with argon (carrier gas) into this plasma in the chamber at a rate of 3 L/min. FeCoAl magnetic particles obtained by rapid cooling are subjected to a partial oxidation treatment, and thus, FeCoAl magnetic particles coated with Al—Fe—Co—O are obtained. These FeCoAl magnetic particles coated with Al—Fe—Co—O are subjected to a flattening and integrating treatment by a planetary mill using $ZrO_2$ balls and a $ZrO_2$ pot in an Ar atmosphere at about 2000 rpm. Thereafter, a $H_2$ heat treatment is carried out at a low temperature of 200° C., and thus a composite phase is obtained. This composite phase and the flat particle aggregates synthesized in Example 14 are mixed in a ball mill, the particles thus obtained are molded, and thus a magnetic material for evaluation is obtained.

Example 23

The production is carried out in the same manner as in Example 14, except that core-shell type magnetic particles (composite phase) in which the surfaces of FeCoAl magnetic metal nanoparticles (metal phase) are covered with an Al—FeCo—O oxide coating layer (second intermediate phase), are present between the individual flat particle aggregates of Example 14. The core-shell type magnetic nanoparticles are synthesized by the following method. First, argon is introduced at a rate of 40 L/min as a gas for plasma generation into a chamber of a high frequency induction heat plasma apparatus to generate a plasma. An Fe powder having an average particle size of 5 μm, a Co powder having an average particle size of 5 μm, and an Al powder having an average particle size of 3 μm, which are raw materials, are sprayed together with argon (carrier gas) into this plasma in the chamber at a rate of 3 L/min. Also, at the same time with spraying, acetylene gas as a raw material for carbon coating is introduced together with a carrier gas into the chamber, and thus particles in which the metal nanoparticles are coated with carbon are obtained. These carbon-coated magnetic metal nanoparticles are subjected to a heat treatment at 600° C. under a hydrogen flow at a concentration of 99% at a rate of 500 mL/min, cooled to room temperature, and then taken out in an oxygen-containing atmosphere to oxidize. Thus, core-shell type magnetic particles are obtained. Meanwhile, the coating layer of the core-shell type magnetic particles is formed when the magnetic particles are taken out in an oxygen-containing atmosphere. These core-shell type magnetic particles and the flat particle aggregates synthesized in Example 14 are mixed in a ball mill, the particles thus obtained are molded, and thereby, a magnetic material for evaluation is obtained.

Comparative Example 5

FeCo particles having a particle size of about 5 μm are pulverized by a planetary mill using $ZrO_2$ balls and a $ZrO_2$ pot in an Ar atmosphere at about 2000 rpm. Thus, FeCo flat particles having an average height of 90 nm and an aspect ratio of 10 are synthesized. Subsequently, the particles thus obtained are molded, and thus, a magnetic material for evaluation is obtained.

For the materials for evaluation of Examples 14 to 23 and Comparative Example 5, the real part of magnetic permeability (μ'), the permeability loss (μ–tan δ=μ"/μ'×100(%)), and change over time in the real part of magnetic permeability after 100 hours are evaluated by the following methods. The evaluation results are presented in Table 4.

1) Real part of magnetic permeability μ', and permeability loss (μ–tan δ=μ"/μ'×100(%))

The magnetic permeability of a ring-shaped sample is measured using an impedance analyzer. The real part μ' and the imaginary part μ" are measured at a frequency of 10 MHz. Furthermore, the permeability loss, μ–tan δ, is calculated by the formula μ"/μ'×100(%).

2) Change over time in real part of magnetic permeability μ' after 100 hours

A sample for evaluation is heated for 100 hours at a temperature of 60° C. in the atmosphere, and then the real part of magnetic permeability μ' is measured again. Thus, the change overtime (real part of magnetic permeability μ' after heating for 100 H/real part of magnetic permeability μ' before heating) is determined.

TABLE 3

| | Magnetic particles (particle aggregates) | | | | | | | | | |
|---|---|---|---|---|---|---|---|---|---|---|
| | Configuration | | | | Metal nanoparticles | | | | | |
| | | | | | | | | | Average | |
| | Shape | Average height (μm) | Average aspect ratio | Resistivity (μΩ·cm) | Shape | Composition | Particle size (nm) | Filling ratio (vol %) | interparticle distance (nm) | Intermediate phase Composition |
| Example 14 | Flat | 0.07 | 150 | 500 | Spherical | Fe—Ni—Si | 8 | 52 | 1 | Si—FeNi—O |
| Example 15 | Flat | 0.08 | 120 | 500 | Spherical | Fe—Ni—Al | 8 | 52 | 1 | Al—FeNi—O |

TABLE 3-continued

Magnetic particles (particle aggregates)

| | Configuration | | | | Metal nanoparticles | | | | | |
|---|---|---|---|---|---|---|---|---|---|---|
| | | | | | | | | | Average | |
| | Shape | Average height (μm) | Average aspect ratio | Resistivity (uΩ·cm) | Shape | Composition | Particle size (nm) | Filling ratio (vol %) | interparticle distance (nm) | Intermediate phase Composition |
| Example 16 | Flat | 0.09 | 100 | 1000 | Spherical | Fe—Co—Al | 9 | 41 | 2 | Al—FeCo—O |
| Example 17 | Flat | 0.09 | 110 | 1000 | Spherical | Fe—Co—Si | 9 | 41 | 2 | Si—FeCo—O |
| Example 18 | Flat | 0.09 | 115 | 100 | Spherical | Fe—Co—Si | 9 | 78 | — | Si—FeCo—O |
| Example 19 | Flat | 0.09 | 100 | 2000 | Rod (aspect ratio 4) | Fe—Co—Si | 9 | 41 | — | Si—FeCo—O |
| Example 20 | Flat | 0.08 | 120 | 800 | Spherical | Fe—Co—Si-10% B | 7 | 50 | 1 | Si—FeCo—O |
| Example 21 | Flat | 0.09 | 100 | 3000 | Rod (aspect ratio 10) | Co—Cr—Al | 10 | 41 | — | Al—Cr—Co—O |
| Example 22 | Flat | 0.07 | 150 | 500 | Spherical | Fe—N—iSi | 8 | 52 | 1 | Si—FeNi—O |
| Example 23 | Flat | 0.07 | 150 | 500 | Spherical | Fe—Ni—Si | 8 | 52 | 1 | Si—FeNi—O |
| Comparative Example 5 | Flat | 0.09 | 10 | 10 | — | — | — | — | — | — |

TABLE 4

Characteristics of high frequency magnetic material

| | Real part of magnetic permeability, μ' (10 MHz) | Permeability loss, μ-tanδ (%) (10 MHz) | Proportion of change over time of real part of magnetic permeability μ' (10 MHz) after 100 hr at 60° C. |
|---|---|---|---|
| Example 14 | 11 | <0.1 | 0.92 |
| Example 15 | 11 | <0.1 | 0.92 |
| Example 16 | 9 | <0.1 | 0.95 |
| Example 17 | 9 | <0.1 | 0.95 |
| Example 18 | 14 | <0.1 | 0.89 |
| Example 19 | 12 | <0.1 | 0.97 |
| Example 20 | 12 | <0.1 | 0.93 |
| Example 21 | 10 | <0.1 | 0.98 |
| Example 22 | 15 | <0.1 | 0.94 |
| Example 23 | 14 | <0.1 | 0.96 |
| Comparative Example 5 | 0 | 0.1 | 0.82 |

As is obvious from Table 3, the magnetic materials related to Example 14 to Example 23 are such that flat-shaped particle aggregates in which metal nanoparticles having an average particle size of from 1 nm to 10 nm are filled at a filling ratio of from 40 vol % to 80 vol %, are used as the magnetic particles. Furthermore, these magnetic particles have a shape with an average height of from 10 nm to 100 nm and an average aspect ratio of 10 or greater. The resistivity of the magnetic particles is from 100 μΩ·cm to 100 mΩ·cm.

Furthermore, the magnetic materials of Examples 14 to 17, 20, 22 and 23 have an average interparticle distance of the metal nanoparticles of from 0.1 nm to 5 nm. In Example 19, rod-shaped metal nanoparticles are dispersed inside flat-shaped magnetic particles, and these rod-shaped metal nanoparticles are oriented to stretch across in the plane of the flat-shaped particle aggregates. In Example 21, rod-shaped hcp-structured (hexagonal) Co-based magnetic metal nanoparticles are dispersed inside flat-shaped magnetic particles, and these rod-shaped metal nanoparticles are oriented to stretch across in the plane of the flat-shaped particle aggregates. The compositions of the metal nanoparticles are a FeNiSi system for Examples 14, 22 and 23; a FeNiAl system for Example 15; a FeCoAl system for Example 16; a FeCoSi system for Examples 17, 18 and 19; a CoCrAl system for Example 21; and a system obtained by adding B to FeCoSi for Example 20. Meanwhile, in Example 22, a composite phase in which FeCoAl magnetic metal nanoparticles (metal phase) are dispersed in an Al—FeCo—O matrix (second intermediate phase), is present between the magnetic particles. In Example 23, core-shell type magnetic particles in which the surfaces of FeCoAl magnetic metal nanoparticles (metal phase) are covered with an Al—FeCo—O oxide coating layer (second intermediate phase), are present between the magnetic particles.

On the other hand, Comparative Example 5 is a material having a flattened structure, but a composite phase of a metal and an oxide does not exist, and the material is composed of uniform flat particles formed of FeCo.

Table 4 presents the real part of magnetic permeability (μ'), the permeability loss (μ-tan δ=μ"/μ'×100(%)), and the change over time in the real part of magnetic permeability (μ') after 100 hours at 60° C. As is obvious from Table 4, it can be seen that the magnetic materials related to Example 14 to Example 23 have excellent magnetic characteristics as compared with the material of Comparative Example.

That is, Examples 14 to 23 have higher magnetic permeability and lower losses, and have smaller changes over time in the real part of magnetic permeability after 100 hours, as compared with Comparative Example 5. The materials of Examples 14 to 23 are each composed of flat-shaped particle aggregates containing metal nanoparticles that have an average particle size of from 1 nm to 10 nm and contain at least one magnetic metal selected from the group including Fe, Co and Ni, and contain an oxide (intermediate phase) that is present between the metal nanoparticles and contain at least one non-magnetic metal selected from Al and Si, and at least one of the magnetic metals described above, the particle aggregates having an average short dimension of from 10 nm to 100 nm and an average aspect ratio of 10 or greater, and the volume filling ratio of the metal nanoparticles being from 40 vol % to 80 vol % relative to the total volume of the magnetic particles (particle aggregates).

It is contemplated that when such constitutions are adopted, high magnetic permeability and low losses can be realized, and these properties are maintained even after a heat treatment at a high temperature. Meanwhile, in Examples 22 and 23, as a composite phase in which magnetic metal nanoparticles (metal phase) are dispersed in an oxide matrix (second intermediate phase), or core-shell type magnetic particles in which the surfaces of magnetic metal nanoparticles (metal phase) are covered with an oxide coating layer (second intermediate phase) are present between individual flat particle aggregates (magnetic particles), the magnetic interaction between individual magnetic particles can be effectively increased while electrical resistivity is maintained high, and the proportion of magnetic metal contained in the entire magnetic material can be effectively increased while electrical resistivity is maintained high.

Thereby, the magnetic permeability and saturation magnetization of a magnetic material can be effectively enhanced while the high frequency magnetic loss is maintained low. Furthermore, in Example 23, since the magnetic material contains core-shell type magnetic particles having high thermal stability, the magnetic properties after a heat treatment for 100 h at 60° C. are maintained high.

Thus, it is understood that the magnetic materials related to Examples 14 to 23 have a high real part of magnetic permeability (μ') and a low imaginary part of magnetic permeability (μ") in the MHz range of 100 kHz or higher, and also have high saturation magnetization, high thermal stability, and high oxidation resistance.

While certain embodiments and examples have been described, these embodiments and examples have been presented byway of example only, and are not intended to limit the scope of the inventions. Indeed, the magnetic material, the method for producing a magnetic material, and the inductor element described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A magnetic material, comprising:
    magnetic particles comprising at least one magnetic metal selected from the group consisting of iron (Fe), cobalt (Co) and nickel (Ni), and comprising at least one non-magnetic metal selected from the group consisting of magnesium (Mg), aluminum (Al), silicon (Si), calcium (Ca), zirconium (Zr), titanium (Ti), hafnium (Hf), zinc (Zn), manganese (Mn), a rare earth element, barium (Ba) and strontium (Sr);
    a first coating layer of a first oxide that covers at least a portion of the magnetic particles;
    oxide particles of a second oxide that is present between the magnetic particles, the second oxide forming a eutectic reaction system with the first oxide; and
    an oxide phase that is present between the magnetic particles and has an eutectic structure of the first oxide and the second oxide.

2. The magnetic material according to claim 1, wherein:
    the magnetic particles are particle aggregates having a morphology with an average short dimension of from 10 nm to 2 μm and an average aspect ratio of 5 or greater;
    the particle aggregates have metal nanoparticles having an average particle size of from 1 nm to 20 nm; and
    the metal nanoparticles comprise at least one magnetic metal selected from the group consisting of Fe, Co and Ni.

3. The magnetic material according to claim 2, further comprising an intermediate phase that is present between the metal nanoparticles, wherein the intermediate phase comprises at least one non-magnetic metal selected from the group consisting of magnesium (Mg), aluminum (Al), silicon (Si), calcium (Ca), zirconium (Zr), titanium (Ti), hafnium (Hf), zinc (Zn), manganese (Mn), barium (Ba), strontium (Sr), chromium (Cr), molybdenum (Mo), silver (Ag), gadolinium (Gd), scandium (Sc), vanadium (V), yttrium (Y), niobium (Nb), lead (Pb), copper (Cu), indium (In), tin (Sn), and rare earth elements, the intermediate phase contains anyone of oxygen (O), nitrogen (N) and carbon (C).

4. The magnetic material according to claim 1, further comprising a second coating layer of a third oxide formed between the magnetic particle and the first coating layer, wherein:
    the second coating layer covers at least a portion of the magnetic particles; and
    the third oxide comprises at least one of the non-magnetic metal.

5. The magnetic material according to claim 1, wherein an average aspect ratio of the magnetic particles is 5 or greater.

6. The magnetic material according to claim 1, wherein:
    the magnetic particles comprise at least one additive metal that is different from the non-magnetic metal and is selected from the group consisting of boron (B), silicon (Si), carbon (C), titanium (Ti), zirconium (Zr), hafnium (Hf), niobium (Nb), tantalum (Ta), molybdenum (Mo), chromium (Cr), copper (Cu), and tungsten (W), in an amount of from 0.001 atom to 25 atom % relative to a total amount of the magnetic metal, the non-magnetic metal and the additive metal; and
    at least two among the magnetic metal, the non-magnetic metal and the additive metal form a solid solution with each other.

7. The magnetic material according to claim 1, wherein a crystal structure of the magnetic particles is a hexagonal structure.

8. The magnetic material according to claim 2, wherein:
    the metal nanoparticles comprise at least one additive metal that is different from the non-magnetic metal and is selected from the group consisting of B, Si, C, Ti, Zr, Hf, Nb, Ta, Mo, Cr, Cu and W, in an amount of from 0.001 atom % to 25 atom % relative to a total amount of the magnetic metal, the non-magnetic metal and the additive metal; and
    at least two among the magnetic metal, the non-magnetic metal and the additive metal form a solid solution with each other.

9. The magnetic material according to claim 2, wherein a crystal structure of the metal nanoparticles is a hexagonal structure.

10. The magnetic material according to claim 1, wherein a combination of the first oxide and the second oxide (first oxide-second oxide, or second oxide-first oxide) comprises any one of combinations of $B_2O_3$—$SiO_2$, $B_2O_3$—$Cr_2O_3$, $B_2O_3$—$MoO_3$, $B_2O_3$—$Nb_2O_5$, $B_2O_3$—$Li_2O$, $B_2O_3$—$BaO$, $B_2O_3$—$ZnO$, $B_2O_3$—$La_2O_3$, $B_2O_3$—$P_2O_5$, $B_2O_3$—$Al_2O_3$, $B_2O_3$—$GeO_2$, $B_2O_3$—$WO_3$, $Na_2O$—$SiO_2$, $Na_2O$—$B_2O_3$, $Na_2O$—$P_2O_5$, $Na_2O$—$Nb_2O_5$, $Na_2O$—$WO_3$, $Na_2O$—$MoO_3$, $Na_2O$—$GeO_2$, $Na_2O$—$TiO_2$, $Na_2O$—$As_2O_5$, $Li_2O$—$MoO_3$, $Li_2O$—$SiO_2$, $Li_2O$—$GeO_2$, $Li_2O$—$WO_3$, $Li_2O$—$V_2O_5$, $CaO$—$P_2O_5$, $CaO$—$B_2O_3$, $CaO$—$V_2O_5$, $ZnO$—$V_2O_5$, $BaO$—$V_2O_5$, $BaO$—$WO_3$, $Cr_2O_3$—$V_2O_5$, and $MoO_3$—$WO_3$.

11. The magnetic material according to claim 4, wherein a combination of the first oxide and the third oxide, and a combination of the second oxide and the third oxide, respectively, do not have an eutectic point of 1000° C. or lower.

12. A method for producing a magnetic material, the method comprising:

synthesizing magnetic particles comprising at least one magnetic metal selected from the group consisting of Fe, Co and Ni, and comprising at least one non-magnetic metal selected from the group consisting of Mg, Al, Si, Ca, Zr, Ti, Hf, Zn, Mn, a rare earth element, Ba and Sr;

forming a first coating layer of a first oxide that covers at least a portion of the magnetic particles;

mixing oxide particles of a second oxide with the magnetic particles, the second oxide forming a eutectic reaction system with the first oxide; and subjecting the first coating layer and the oxide particles to eutectic melting and solidification by a heat treatment at or below 1,000° C. and subsequent cooling.

13. A magnetic material, comprising:

magnetic particles comprising at least one magnetic metal selected from the group consisting of Fe, Co and Ni, and comprising at least one non-magnetic metal selected from the group consisting of Mg, Al, Si, Ca, Zr, Ti, Hf, Zn, Mn, a rare earth element, Ba and Sr;

a first coating layer of a first oxide that covers at least a portion of the magnetic particles; and oxide particles of a second oxide that are present between the magnetic particles, the second oxide forming a eutectic reaction system with the first oxide.

14. A method for producing a magnetic material, the method comprising:

synthesizing magnetic particles comprising at least one magnetic metal selected from the group consisting of Fe, Co and Ni, and comprising at least one non-magnetic metal selected from the group consisting of Mg, Al, Si, Ca, Zr, Ti, Hf, Zn, Mn, a rare earth element, Ba and Sr;

forming a first coating layer of a first oxide that covers at least a portion of the magnetic particles; and mixing oxide particles of a second oxide with the magnetic particles, the second oxide forming a eutectic reaction system with the first oxide.

15. A magnetic material, comprising:

magnetic particles comprising at least one magnetic material selected from the group consisting of Fe, Co and Ni, and comprising at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and a rare earth element, and magnetic particles are particle aggregates having a morphology with an average short dimension of from 10 nm to 2 μm and an average aspect ratio of 5 or greater, the particle aggregates have plural metal nanoparticles having an average particle size of from 1 nm to 20 nm and comprise at least one magnetic metal selected from the group consisting of Fe, Co and Ni; and an oxide phase that is present between the magnetic particles and has an eutectic structure formed from a first oxide and a second oxide.

16. The magnetic material according to claim 15, further comprising an intermediate phase that is present between the metal nanoparticles, wherein the intermediate phase comprises at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and a rare earth element, and any one of oxygen (O), nitrogen (N) and carbon (C).

17. An inductor element, comprising the magnetic material according to claim 1.

* * * * *